United States Patent
Edge

(10) Patent No.: US 11,696,122 B2
(45) Date of Patent: Jul. 4, 2023

(54) SYSTEMS AND METHODS FOR UPLINK HIGH EFFICIENCY LOCATION IN A WIRELESS NETWORK

(71) Applicant: QUALCOMM Incorporated, San Diego, CA (US)

(72) Inventor: Stephen William Edge, Escondido, CA (US)

(73) Assignee: QUALCOMM Incorporated, San Diego, CA (US)

(*) Notice: Subject to any disclaimer, the term of this patent is extended or adjusted under 35 U.S.C. 154(b) by 227 days.

(21) Appl. No.: 17/328,353

(22) Filed: May 24, 2021

(65) Prior Publication Data

US 2021/0282006 A1 Sep. 9, 2021

Related U.S. Application Data

(63) Continuation of application No. 15/979,249, filed on May 14, 2018, now Pat. No. 11,019,487.
(Continued)

(51) Int. Cl.
*H04W 64/00* (2009.01)
*H04W 12/02* (2009.01)
(Continued)

(52) U.S. Cl.
CPC ........... *H04W 12/02* (2013.01); *H04W 12/04* (2013.01); *H04W 12/06* (2013.01); *H04W 24/10* (2013.01);
(Continued)

(58) Field of Classification Search
CPC ..... H04W 12/02; H04W 12/04; H04W 12/06; H04W 24/10; H04W 64/003; H04W 72/0473; H04W 74/08; H04L 63/0428
See application file for complete search history.

(56) References Cited

U.S. PATENT DOCUMENTS 11,019,487 B2 5/2021 Edge
2008/0214213 A1 9/2008 Etemad et al.
(Continued)

FOREIGN PATENT DOCUMENTS

CN 104980888 A 10/2015
CN 105430755 A 3/2016
(Continued)

OTHER PUBLICATIONS

Taiwan Search Report—TW107136868—TIPO—dated Aug. 26, 2021.
(Continued)

*Primary Examiner* — Nelson S. Giddins
(74) *Attorney, Agent, or Firm* — Weaver Austin Villeneuve & Sampson LLP

(57) ABSTRACT

Uplink high efficiency location of a user equipment (UE) includes initiating periodic or triggered location in the UE by a location server (LS) in a wireless network. The UE enters an idle state and monitors for triggering events. After detecting an event, the UE transmits an uplink positioning signal (UPS) to a base station, where the UPS encodes UPS data comprising a UE ID, an ID for the LS, an authentication code (AC) and location measurements. UPS transmission occurs in an uplink positioning occasion shared with other UEs. The location measurements may be ciphered but other UPS data is unciphered. The base station obtains additional location measurements and transfers the UPS data and the location measurements to the LS. The LS authenticates the UE ID using the AC, determines the UE location using the location measurements and transfers the location to an external client.

62 Claims, 15 Drawing Sheets

Related U.S. Application Data

(60) Provisional application No. 62/625,841, filed on Feb. 2, 2018, provisional application No. 62/597,380, filed on Dec. 11, 2017.

(51) Int. Cl.

| | | |
|---|---|---|
| *H04W 12/04* | (2021.01) | |
| *H04W 12/06* | (2021.01) | |
| *H04W 24/10* | (2009.01) | |
| *H04W 74/08* | (2009.01) | |
| *H04W 72/044* | (2023.01) | |
| *H04W 52/02* | (2009.01) | |
| *H04W 76/28* | (2018.01) | |
| *H04L 9/40* | (2022.01) | |
| *H04W 12/63* | (2021.01) | |

(52) U.S. Cl.
CPC ....... *H04W 52/0225* (2013.01); *H04W 64/00* (2013.01); *H04W 64/003* (2013.01); *H04W 72/0473* (2013.01); *H04W 74/08* (2013.01); *H04L 63/0428* (2013.01); *H04W 12/63* (2021.01); *H04W 76/28* (2018.02)

(56) References Cited

U.S. PATENT DOCUMENTS

| | | | |
|---|---|---|---|
| 2015/0249527 A1 | 9/2015 | Hwang et al. | |
| 2016/0255529 A1* | 9/2016 | Zhang | H04W 36/22 370/329 |
| 2017/0079006 A1* | 3/2017 | Li | H04L 5/0048 |
| 2017/0303116 A1* | 10/2017 | Liu | H04W 8/26 |
| 2017/0325225 A1 | 11/2017 | Dinan | |
| 2019/0174406 A1 | 6/2019 | Hwang et al. | |
| 2019/0274041 A1 | 9/2019 | Xu et al. | |
| 2019/0281640 A1 | 9/2019 | Lanante et al. | |
| 2019/0320336 A1 | 10/2019 | Takano | |
| 2020/0084677 A1 | 3/2020 | Yiu et al. | |

FOREIGN PATENT DOCUMENTS

| | | |
|---|---|---|
| CN | 105578453 A | 5/2016 |
| WO | WO-2014093400 A1 | 6/2014 |
| WO | WO-2015149581 A1 | 10/2015 |
| WO | WO-2016131165 A1 | 8/2016 |

OTHER PUBLICATIONS

International Preliminary Reporton Patentability—PCT/US2018/053724, The International Bureau of WIPO—Geneva, Switzerland, dated Jun. 25, 2020.

International Search Report and Written Opinion—PCT/US2018/053724—ISA/EPO—dated Jan. 17, 2019.

Nokia et al., "UTDOA Positioning in NB-IoT", 3GPP Draft, 3GPP TSG RAN WG1 Meeting #87, R1-1611305, 3rd Generation Partnership Project (3GPP), Mobile Competence Centre; 650, Route Des Lucioles; F-06921 Sophia-Antipolis Cedex; France, vol. RAN WG1, No. Reno, Nevada, USA; Nov. 14-18, 2016, XP051175286, Retrieved from the Internet: URL:http://www.3gpp.org/ftp/Meetings_3GPP_SYNC/RAN1/Docs/ [retrieved on Nov. 13, 2016], 4 pages.

Qualcomm Incorporated: "Location Services Alternatives for 5G System Architecture and 5G Procedures", 3GPP Draft; S2-170819 (Location Services for 5G System Architecture and Procedures)-V3, 3rd Generation Partnership Project (3GPP), Mobile Competence Centre; 650, Route Des Lucioles; F-06921 Sophia-A, vol. SA WG2, No. Dubrovnik, Croatia; Feb. 13, 2017-Feb. 17, 2017, Feb. 13, 2017 (Feb. 13, 2017), 21 Pages, XP051216940, Retrieved from the Internet: URL: http://www.3gpp.org/ftp/Meetings_3GPP_SYNC/SA2/Docs/ [retrieved on Feb. 13, 2017].

Qualcomm Incorporated: "Location Services for 5G System Procedures", 3GPP Draft; S2-170821 (P-CR FORTS 23.502 for Location Services for 5G System Procedures), 3rd Generation Partnership Project (3GPP), Mobile Competence Centre; 650, Route Des Lucioles; F-06921 Sophi, vol. SA WG2, No. Dubrovnik, Croatia; Feb. 13, 2017-Feb. 17, 2017, Feb. 7, 2017 (Feb. 7, 2017), 12 Pages, XP051228112, Retrieved from the Internet: URL: http://www.3gpp.org/ftp/tsg_sa/WG2_Arch/TSGS2_119_Dubrovnik/Docs/ [retrieved onFeb. 7, 2017].

Samsung: "DCI Contents for NR", 3GPP TSG RAN WG1 Meeting #89, R1-1707995, Hangzhou, China, May 15-19, 2017, May 6, 2017 (May 6, 2017), pp. 1-5.

* cited by examiner

US 11,696,122 B2

SYSTEMS AND METHODS FOR UPLINK HIGH EFFICIENCY LOCATION IN A WIRELESS NETWORK

CLAIM OF PRIORITY UNDER 35 U.S.C. § 119

This application is a Continuation of U.S. Non-Provisional application Ser. No. 15/979,249, filed May 14, 2018, and entitled "SYSTEMS AND METHODS FOR UPLINK HIGH EFFICIENCY LOCATION IN A WIRELESS NETWORK," which claims under 35 USC § 119 the benefit of and priority to U.S. Provisional Application No. 62/597,380, filed Dec. 11, 2017, and entitled "SYSTEMS AND METHODS FOR UPLINK HIGH EFFICIENCY LOCATION IN A WIRELESS NETWORK," and U.S. Provisional No. 62/625,841, filed Feb. 2, 2018, and entitled "SYSTEMS AND METHODS FOR UPLINK HIGH EFFICIENCY LOCATION IN A WIRELESS NETWORK," both of which are assigned to the assignee hereof and are incorporated herein by reference in their entireties.

BACKGROUND

Background Field

The present disclosure relates generally to communication, and more specifically to techniques for supporting location services for user equipments (UEs).

Relevant Background

The Third Generation Partnership Project (3GPP) has defined location solutions, known as Control Plane (CP) location solutions, for a GSM EDGE Radio Access Network (GERAN), a Universal Terrestrial Radio Access Network (UTRAN) and an Evolved Universal Terrestrial Radio Access Network (E-UTRAN). These location solutions are typically resource intensive for both a wireless network and a User Equipment (UE). For example, for each location of a UE, the following is typically required: (a) the UE is assigned a signaling connection in both a Radio Access Network (RAN) and a Core Network (CN) and enters a connected state (e.g. via paging by the network or via a service request from the UE); (b) authentication and ciphering for the UE occur as part of (a); (c) internal network signaling occurs to assign a location server (LS), e.g., an Enhanced Serving Mobile Location Center (E-SMLC) or a Stand Alone SMLC (SAS); (d) signaling, e.g., using a Long Term Evolution (LTE) Positioning Protocol (LPP, is exchanged between the UE and the LS to coordinate and obtain location measurements; (e) the UE obtains location measurements, may compute a location using the location measurements and sends the location measurements and/or the location to the LS; (f) the LS computes a location of the UE from the received location measurements or verifies the received location; (g) the LS transfers the location of the UE to an external client via other network elements, e.g., a Gateway Mobile Location Center (GMLC); (h) the signaling connections and LS assignment are released.

For a UE, such as an Internet of Things (IoT) UE, that is regularly tracked, e.g., at 15 minute to 1 hour intervals, the above-described process is battery intensive. Moreover, for a network supporting millions of UEs and IoT UEs, the above-described process would drain resources. It may therefore be desirable to develop location solutions which reduce the usage of network resources and UE battery consumption.

SUMMARY

In an embodiment, uplink high efficiency location of a user equipment (UE) includes initiating periodic or triggered location in the UE by a location server (LS) in a wireless network. The UE enters an idle state and monitors for triggering events. After detecting an event, the UE transmits an uplink positioning signal (UPS) to a base station, where the UPS encodes UPS data comprising a UE ID, an ID for the LS, an authentication code (AC) and location measurements. UPS transmission occurs in an uplink positioning occasion shared with other UEs. The location measurements may be ciphered but other UPS data is unciphered. The base station obtains additional location measurements and transfers the UPS data and the location measurements to the LS. The LS authenticates the UE ID using the AC, determines the UE location using the location measurements and transfers the location to an external client.

In one implementation, a method performed by a user equipment (UE) for supporting location includes receiving a first message from a network entity (NE) in a wireless network, the first message requesting periodic or triggered location of the UE; entering an idle state with respect to the wireless network; detecting a first location reporting event; selecting a first cell associated with a first base station in the wireless network; determining a first uplink positioning occasion (UPO) for the first cell; and transmitting a first uplink positioning signal (UPS) in the first UPO for the first cell, wherein the first UPS comprises a first UE identity (ID) for the UE.

In one implementation, a user equipment (UE) supporting location includes a wireless transceiver configured to wirelessly communicate with a wireless network; and at least one processor coupled to the wireless transceiver and configured to receive a first message from a network entity (NE) in the wireless network, the first message requesting periodic or triggered location of the UE, enter an idle state with respect to the wireless network, detect a first location reporting event, select a first cell associated with a first base station in the wireless network, determine a first uplink positioning occasion (UPO) for the first cell, and transmit a first uplink positioning signal (UPS) in the first UPO for the first cell, wherein the first UPS comprises a first UE identity (ID) for the UE.

In one implementation, a method of supporting location, performed by a base station in a wireless network includes receiving a first uplink positioning signal (UPS) in a first uplink positioning occasion (UPO) for a cell for the base station, the first UPS transmitted by a user equipment (UE), the first UPS comprising an identity (ID) for the UE and an ID for a network entity (NE) in the wireless network; determining location information for the UE based on the first UPS; and sending a first message to the NE comprising the location information for the UE.

In one implementation, a base station in a wireless network that supports location includes an external interface capable of connecting to a user equipment (UE) and one or more network entities; at least one processor coupled to the external interface and configured to receive a first uplink positioning signal (UPS) in a first uplink positioning occasion (UPO) for a cell for the base station, the first UPS transmitted by a user equipment (UE), the first UPS comprising an identity (ID) for the UE and an ID for a network entity (NE) in the wireless network, determine location information for the UE based on the first UPS, and send a first message to the NE comprising the location information for the UE.

In one implementation, a method performed by a server in a wireless network includes transmitting by the server a request for periodic or triggered location to a user equipment (UE), the request indicating the transmission of uplink positioning signals (UPSs) by the UE in uplink positioning occasion (UPOs) for cells in the wireless network to report location events; receiving a first location report for the UE from a first base station when the UE is not reachable from the server, wherein the first location report comprises first location information, an identity (ID) for the UE, and an authentication code (AC), wherein the ID for the UE is not ciphered, wherein the first location information is based on transmission by the UE of a UPS in a UPO for a cell in the wireless network; and processing the first location report, wherein the processing comprises: identifying the UE using the ID for the UE; authenticating the ID for the UE using the authentication code; determining second location information for the UE based on the first location information; and transmitting the second location information to another entity.

In one implementation, a server in a wireless network supporting location includes an external interface capable of connecting to a user equipment (UE) and an external client directly or through at least one of one or more intermediary networks and one or more network entities; at least one processor coupled to the external interface and configured to cause the external interface to transmit a request for periodic or triggered location to the UE, the request indicating the transmission of uplink positioning signals (UPSs) by the UE in uplink positioning occasion (UPOs) for cells in the wireless network to report location events, receive a first location report for the UE from a first base station when the UE is not reachable from the server, wherein the first location report comprises first location information, an identity (ID) for the UE, and an authentication code (AC), wherein the ID for the UE is not ciphered, wherein the first location information is based on transmission by the UE of a UPS in a UPO for a cell in the wireless network, and process the first location report, wherein the at least one processor is configured to process the first location report by being configured to identify the UE using the ID for the UE, authenticate the ID for the UE using the authentication code, determine second location information for the UE based on the first location information, and cause the external interface to transmit the second location information to another entity.

BRIEF DESCRIPTION OF THE DRAWINGS

An understanding of the nature and advantages of various embodiments may be realized by reference to the following figures.

Like reference numbers and symbols in the various figures indicate like elements, in accordance with certain example implementations. In addition, multiple instances of an element may be indicated by following a first number for the element with a hyphen and a second number. For example, multiple instances of an element 110 may be indicated as 110-1, 110-2, 110-3 etc. When referring to such an element using only the first number, any instance of the element is to be understood (e.g. elements 110 in the previous example would refer to elements 110-1, 110-2 and 110-3).

DETAILED DESCRIPTION

A communication system implementing uplink (UL) high efficiency location of a user equipment (UE), as disclosed herein, may perform one or more of the following: (a) permanently (or semi-permanently) assign a location server (LS) to a UE to avoid the overhead of repeated assignment and release of an LS; (b) support location interaction with a UE only in a Radio Access Network (RAN) and not involve a core network (CN); (c) omit authentication and ciphering in real time; (d) omit direct UE-LS interaction except at the start and possibly end of a series of location event reports from a UE; (e) obtain no downlink (DL) location measurements from a UE or only a small number of DL location measurements to reduce UE resource usage; (f) send an Uplink Positioning Signal (UPS) from the UE to be measured by nearby base stations; and/or (g) perform location computation in batch mode rather than in real time.

Figure 1:
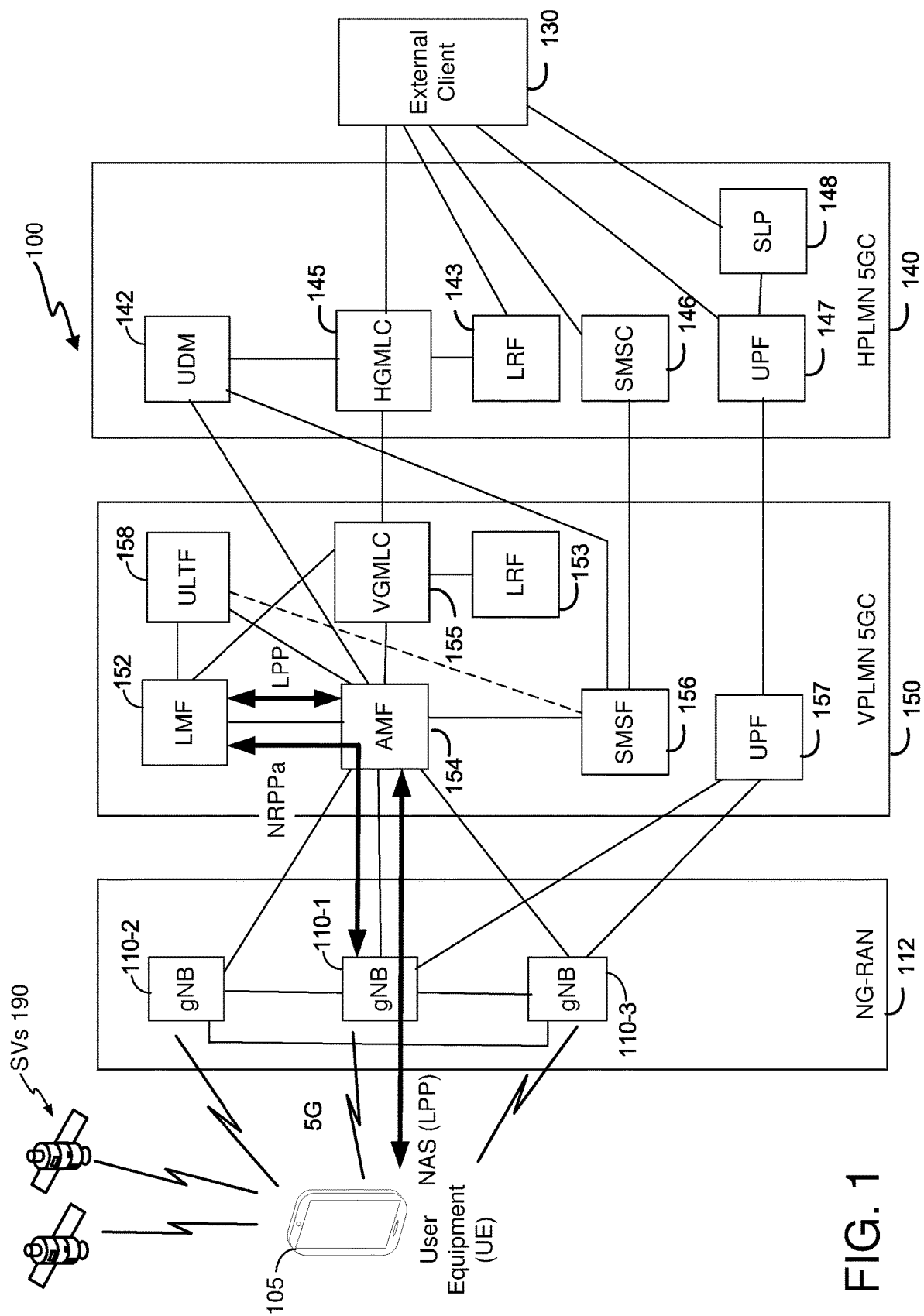
FIG. 1 shows a diagram of a communication system capable of uplink (UL) high efficiency location of a user equipment (UE).

FIG. 1 shows a diagram of a communication system 100, according to an embodiment. The communication system 100 may be configured to implement UL high efficiency location of a UE. Here, the communication system 100 comprises a UE 105, and components of a Fifth Generation (5G) network comprising a visited network Next Generation RAN (NG-RAN) 112, a visited network 5G Core Network (5GC) 150 and a home network 5GC 140. The home network 5GC 140 is for a Home Public Land Mobile Network (HPLMN) for the UE 105 and communicates with the 5GC 150 which is for a Visited Public Land Mobile Network (VPLMN) that communicates with the UE 105. A 5G network may also be referred to as a New Radio (NR) network or as a 5G System (5GS); NG-RAN 112 may be referred to as an NR RAN or a 5G RAN; and 5GC 140 and 150 may be referred to as an NG Core network (NGC). Standardization of an NG-RAN and 5GC is ongoing in 3GPP. Accordingly, NG-RAN 112 and 5GC 140, 150 may conform to current or future standards for 5G support from 3GPP without loss of applicability of the present disclosure. The communication system 100 may further utilize information from satellite vehicles (SVs) 190 for a Global Navigation Satellite System (GNSS) like the Global Positioning System (GPS), GLONASS, Galileo, Beidou, or some other local or regional Satellite Positioning System (SPS) such as IRNSS, EGNOS or WAAS. Additional components of the communication system 100 are described below. The communication system 100 may include additional or alternative components.

It should be noted that FIG. 1 provides only a generalized illustration of various components, any or all of which may be utilized as appropriate, and each of which may be duplicated or omitted as necessary. Specifically, although only one UE 105 is illustrated, it will be understood that many UEs (e.g., hundreds, thousands, millions, etc.) may utilize the communication system 100. Similarly, the communication system 100 may include a larger or smaller number of SVs 190, gNBs 110, external clients 130, and/or other components. The illustrated connections that connect the various components in the communication system 100 include data and signaling connections which may include additional (intermediary) components, direct or indirect physical and/or wireless connections, and/or additional networks. Furthermore, components may be rearranged, combined, separated, substituted, and/or omitted, depending on desired functionality.

While FIG. 1 illustrates a 5G-based network, similar network implementations and configurations may be used for other communication technologies, such as 3G, Long Term Evolution (LTE), IEEE 802.11 WiFi (also referred to as Wi-Fi) etc.

The UE 105, as used herein, may be an electronic device and may be referred to as a device, a mobile device, a wireless device, a mobile terminal, a terminal, a wireless terminal a mobile station (MS), a Secure User Plane Location (SUPL) Enabled Terminal (SET), or by some other name. Moreover, UE 105 may correspond to a cellphone, smartphone, laptop, tablet, PDA, tracking device or some other portable or moveable device. In some cases, a UE 105 may be part of some other entity—e.g. may be a chipset supporting a modem that is integrated into some larger mobile entity such as a vehicle, drone, package, shipment, robotic device etc. Typically, though not necessarily, the UE 105 may support wireless communication using one or more Radio Access Technologies (RATs) such as Global System for Mobile communication (GSM), Code Division Multiple Access (CDMA), Wideband CDMA (WCDMA), LTE, High Rate Packet Data (HRPD), IEEE 802.11 WiFi, Bluetooth® (BT), Worldwide Interoperability for Microwave Access (WiMAX), 5G new radio (NR) (e.g., using the NG-RAN 112 and 5GC 140, 150), etc. The UE 105 may also support wireless communication using a Wireless Local Area Network (WLAN) which may connect to other networks (e.g. the Internet) using a Digital Subscriber Line (DSL) or packet cable for example. The use of one or more of these RATs may allow the UE 105 to communicate with an external client 130 (via elements of 5GC 140, 150 not shown in FIG. 1, or possibly via a Gateway Mobile Location Center (GMLC) 145 or 155) and/or allow the external client 130 to receive location information regarding the UE 105 (e.g., via the GMLC 145 or 155).

The UE 105 may include a single entity or may include multiple entities such as in a personal area network where a user may employ audio, video and/or data I/O devices and/or body sensors and a separate wireline or wireless modem. An estimate of a location of the UE 105 may be referred to as a location, location estimate, location fix, fix, position, position estimate or position fix, and may be geodetic, thus providing location coordinates for the UE 105 (e.g., latitude and longitude) which may or may not include an altitude component (e.g., height above sea level, height above or depth below ground level, floor level or basement level). Alternatively, a location of the UE 105 may be expressed as a civic location (e.g., as a postal address or the designation of some point or small area in a building such as a particular room or floor). A location of the UE 105 may also be expressed as an area or volume (defined either geodetically or in civic form) within which the UE 105 is expected to be located with some probability or confidence level (e.g., 67%, 95%, etc.) A location of the UE 105 may further be a relative location comprising, for example, a distance and direction or relative X, Y (and Z) coordinates defined relative to some origin at a known location which may be defined geodetically, in civic terms, or by reference to a point, area, or volume indicated on a map, floor plan or building plan. In the description contained herein, the use of the term location may comprise any of these variants unless indicated otherwise. When computing the location of a UE, it is common to solve for local x, y, and possibly z coordinates and then, if needed, convert the local coordinates into absolute ones (e.g. for latitude, longitude and altitude above or below mean sea level).

Base stations (BSs) in the NG-RAN 112 shown in FIG. 1 comprise NR NodeBs, also referred to as gNBs, 110-1, 110-2 and 110-3 (collectively and generically referred to herein as gNBs 110). Pairs of gNBs 110 in NG-RAN 112 may be connected to one another—e.g. directly as shown in FIG. 1 or indirectly via other gNBs 110. Access to the 5G network is provided to UE 105 via wireless communication between the UE 105 and one or more of the gNBs 110, which may provide wireless communications access to the 5GC 150 on behalf of the UE 105 using 5G (e.g. NR). In FIG. 1, the serving gNB for UE 105 is assumed to be gNB 110-1, although other gNBs (e.g. gNB 110-2 and/or gNB 110-3) may act as a serving gNB if UE 105 moves to another location or may act as a secondary gNB to provide additional throughout and bandwidth to UE 105. Some gNBs 110 in FIG. 1 (e.g. gNB 110-2 or gNB 110-3) may be configured to function as positioning-only beacons which may transmit signals (e.g. a Positioning Reference Signal (PRS)) to assist positioning of UE 105 but may not receive signals from UE 105 or from other UEs.

As noted, while FIG. 1 depicts nodes configured to communicate according to 5G communication protocols, nodes configured to communicate according to other communication protocols, such as, for example, LTE protocol, may be used. Such nodes, configured to communicate using different protocols, may be controlled, at least in part, by the 5GC 150. Thus, the NG-RAN 112 may include any combination of gNBs, evolved Node Bs (eNBs) supporting LTE access, or other types of base stations or access points. As an example, NG-RAN 112 may include one or more next generation eNBs (ng-eNBs) which provide LTE wireless access to UE 105 and which may connect to gNBs 110 in NG-RAN 112 and/or to entities in 5GC 150 such as an Access and Mobility Management Function (AMF) 154 and a User Plane Function (UPF) 157.

The gNBs 110 can communicate with the AMF 154, which, for positioning functionality, communicates with a Location Management Function (LMF) 152. The AMF 154 may support mobility of the UE 105, including cell change and handover and may participate in supporting a signaling connection to the UE 105 and possibly helping establish and release Protocol Data Unit (PDU) sessions for UE 105. Other functions of AMF 154 may include: termination of a control plane (CP) interface from NG-RAN 112; termination of Non-Access Stratum (NAS) signaling connections from UEs such as UE 105, NAS ciphering and integrity protection; registration management; connection management; reachability management; mobility management; transport of Short Message Service (SMS) messages between UE 105 and SMS Function (SMSF) 156; access authentication and authorization.

The LMF 152 may support positioning of the UE 105 when UE 105 accesses the NG-RAN 112 and may support position procedures/methods such as Assisted GNSS (A-GNSS), Observed Time Difference of Arrival (OTDOA), Real Time Kinematics (RTK), Precise Point Positioning (PPP), Differential GNSS (DGNSS), Enhanced Cell ID (ECID), angle of departure (AOD), Wireless Local Area Network (WLAN) positioning, and/or other position methods. The LMF 152 may also process location services requests for the UE 105, e.g., received from the AMF 154 or from the Visited GMLC (VGMLC) 155. In some embodiments, a node/system that implements the LMF 152 may additionally or alternatively implement other types of location-support modules, such as an Enhanced Serving Mobile Location Center (E-SMLC) or a Secure User Plane Location (SUPL) Location Platform (SLP). It will be noted that in some embodiments, at least part of the positioning functionality (including derivation of UE 105's location) may be performed at the UE 105 (e.g., using signal measurements obtained by UE 105 for signals transmitted by wireless nodes such as gNBs 110, and assistance data provided to the UE 105, e.g. by LMF 152). The LMF 152 may be referred to by other names such as a Location Manager (LM), Location Function (LF), commercial LMF (CLMF) or value added LMF (VLMF).

The VGMLC 155 may support a location request for the UE 105 received from an external client 130 or from a Home GMLC (HGMLC) 145 and may forward such a location request to the AMF 154 for forwarding by the AMF 154 to the LMF 152 or may forward the location request directly to the LMF 152. A location response from the LMF 152 (e.g. containing a location estimate for the UE 105) may be similarly returned to VGMLC 155 either directly or via the AMF 154 and the VGMLC 155 may then return the location response (e.g., containing the location estimate) to the external client 130 or to HGMLC 145. The VGMLC 155 is shown connected to both the AMF 154 and LMF 152, but only one of these connections may be supported by 5GC 150 in some implementations.

A Location Retrieval Function (LRF) 153 may be connected to the VGMLC 155 and an LRF 143 may be connected to the HGMLC 145, as defined in 3GPP Technical Specification (TS) 23.271. LRFs 153 and 143 may perform the same or similar functions to VGMLC 155 and HGMLC 145, respectively, with respect to receiving and responding to a location request from an external client 130 that corresponds to a Public Safety Answering Point (PSAP) supporting an emergency call from UE 105.

The SMS Function (SMSF) 156 may support transport of SMS messages to and from UE 105 and may include support for SMS transport over NAS, SMS subscription checking, and relaying of an SMS message between the UE 105 and an SMS Gateway Mobile Services Switching Center (SMS-GMSC) or SMS Center (SMSC) 146 in the HPLMN 140.

As further illustrated in FIG. 1, the LMF 152 and the gNBs 110 may communicate using a New Radio Position Protocol A (which may be referred to as NPPa or NRPPa). NRPPa may be defined in 3GPP TS 38.455 and may be the same as, similar to, or an extension of the LTE Positioning Protocol A (LPPa) defined in 3GPP Technical Specification (TS) 36.455, with NRPPa messages being transferred between the gNBs 110 and the LMF 152 via the AMF 154. As further illustrated in FIG. 1, LMF 152 and UE 105 may communicate using the LTE Positioning Protocol (LPP) defined in 3GPP TS 36.355, where LPP messages are transferred inside NAS transport messages between the UE 105 and the AMF 154 via a serving gNB 110-1 for UE 105, and where AMF 154 relays the LPP messages to and from LMF 152. For example, LPP messages may be transferred between the LMF 152 and the AMF 154 using a transport protocol (e.g. a transport protocol based on IP) and may be transferred between the AMF 154 and the UE 105 using a 5G Non-Access Stratum (NAS) protocol. The LPP protocol may be used to support positioning of UE 105 using UE assisted and/or UE based position methods such as A-GNSS, RTK, OTDOA, ECID and/or WLAN positioning. The NRPPa protocol may be used to support positioning of UE 105 using network based position methods such as ECID (e.g. when used with measurements obtained by a gNB 110 of signals transmitted by UE 105) and/or may be used by LMF 152 to obtain location related information from gNBs 110.

For example, location related information provided by the gNBs 110 to the LMF 152 using NRPPa may include timing and configuration information for PRS transmission from gNBs 110 and/or location coordinates of the gNBs 110. The LMF 152 can then provide some or all of this location related information to the UE 105 as assistance data in an LPP message via the NG-RAN 112 and the 5GC 150.

An LPP message sent from the LMF 152 to the UE 105 may instruct the UE 105 to do any of a variety of things, depending on desired functionality. For example, the LPP message could contain an instruction for the UE 105 to obtain location measurements for GNSS (or A-GNSS), WLAN, and/or OTDOA (or some other position method). In the case of OTDOA, the LPP message may instruct the UE 105 to obtain one or more location measurements (e.g. Reference Signal Time Difference (RSTD) measurements) of PRS signals transmitted within particular cells supported by particular gNBs 110 (or supported by one or more ng-eNBs or eNBs). The UE 105 may send the location measurements back to the LMF 152 in an LPP message (e.g. inside a 5G NAS message) via the serving gNB 110-1 and the AMF 154.

In some embodiments, LPP may be augmented by or replaced by an NR positioning protocol (NPP or NRPP) which supports position methods such as OTDOA and E-CID for NR radio access. For example, an LPP message may contain an embedded NPP message or may be replaced by an NPP message.

VPLMN 5GC 150 may also contain an uplink (UL) transport function (ULTF) 158 which may support UL high efficiency location for UE 105 as described later herein. ULTF 158 may be connected to one or more AMFs in 5GC 150 (e.g. AMF 154), to LMF 152 and/or to SMSF 156. In some implementations, ULTF 158 may be connected to one or more gNBs 110 (and/or to one or more ng-eNBs) in NG-RAN 112. In some embodiments, ULTF 158 may be combined with another entry such as with LMF 152, SMSF 156 or AMF 154. ULTF 158 may be referred to by other names such as an UL relay function, an UL management function, an UL transport function or a small data transport function.

As illustrated, HPLMN 140 includes a Unified Data Management (UDM) 142 and a Home GMLC (HGMLC) 145 that may be connected to the VGMLC 155 (e.g., via the Internet), as well as a User Plane Function (UPF) 147 that may be connected to a UPF 157 in the VPLMN 5GC 150. The UDM 142 is analogous to a Home Subscriber Server (HSS) for LTE access, and if desired, the UDM 142 may be combined with an HSS. The UDM 142 is a central database that contains user-related and subscription related information for UE 105 and may perform the following functions: UE authentication, UE identification, access authorization, registration and mobility management, subscription management and SMS management. The UPF 147 may support voice and data bearers for UE 105 and may enable UE 105 voice and data access to other networks such as the Internet. UPF 147 functions may include: external PDU session point of interconnect to a Data Network, packet (e.g. Internet Protocol (IP)) routing and forwarding, packet inspection and user plane part of policy rule enforcement, Quality of Service (QoS) handling for user plane, downlink packet buffering and downlink data notification triggering.

HPLMN 140 further includes an SMS Center (SMSC) 146 which may support SMS transfer to and from UE 105 and may act as a central store and forward center for all SMS messages sent to or sent from UE 105. SMSC 146 may use one or more SMS gateways (not shown in FIG. 1) to access other entities such as external client 130 and SMSF 156.

The UPF 147 may be connected to a location server (LS), such as a SUPL Location Platform (SLP) 148. The SLP 148 may support the SUPL user plane (UP) location solution defined by the Open Mobile Alliance (OMA) and may support location services for UE 105 based on subscription information for UE 105 stored in SLP 148. The SLP 148 may be a home SLP (H-SLP) for UE 105. In some embodiments of communication system 100, a Discovered SLP (D-SLP) or Emergency SLP (E-SLP) (not shown in FIG. 1), in or accessible from VPLMN 5GC 150 (e.g. connected to UPF 157), may be used to locate UE 105 using the SUPL UP solution. SLP 148 and LMF 152 in communication system 100 are both examples of an LS that may employ the LPP and/or LPP/NPP protocols for positioning of UE 105.

In a CP location solution, such as the 3GPP CP location solution defined in 3GPP TS 23.271 and TS 36.305, signaling (e.g. including LPP, LPP/NPP and other messages) to support location of UE 105 may be transferred between participating entities (e.g. VGMLC 155, gNB 110, LMF 152 and UE 105) using signaling interfaces and protocols for VPLMN 5GC 150 and HPLMN 5GC 140. In contrast, in a UP location solution such as SUPL, signaling (e.g. such as SUPL messages carrying embedded LPP and/or LPP/NPP messages) to support location of UE 105 may be transferred between participating entities (e.g. UE 105 and SLP 148) using data bearers (e.g. using the Internet Protocol (IP)).

The HGMLC 145 may be connected to UDM 142 for UE 105. HGMLC 145 may provide location access to UE 105 on behalf of external clients such as external client 130. One or more of HGMLC 145, SMSC 146, UPF 147, LRF 143 and SLP 148 may be connected to external client 130, e.g., through another network, such as the Internet. In some cases, a Requesting GMLC (RGMLC) located in another PLMN (not shown in FIG. 1) may be connected to HGMLC 145 (e.g., via the Internet) in order to provide location access to UE 105 on behalf of external clients connected to the RGMLC. The RGMLC, HGMLC 145 and VGMLC 155 may support location access to UE 105 using the 3GPP CP solution defined in 3GPP TS 23.271 and in 3GPP TS 23.501 and 3GPP TS 23.502.

It should be understood that while a VPLMN 150 and a separate HPLMN 140 are illustrated in FIG. 1, both PLMNs (networks) may be the same PLMN. In that case, (i) SLP 148, SMSC 146 and UDM 142 may be in the same 5GC as AMF 154, ULTF 158 and LMF 152, (ii) 5GC 150 and 5GC 140 may be the same 5GC, (iii) VGMLC 155 and HGMLC 145 may be the same GMLC, (iv) LRF 143 and LRF 153 may be the same LRF, and (v) UPF 157 and UPF 147 may be the same UPF.

As noted, while the communication system 100 is described in relation to 5G technology, the communication system 100 may be implemented to support other communication technologies, such as GSM, WCDMA, LTE, WiFi, etc., that are used for supporting and interacting with mobile devices such as the UE 105 (e.g., to implement voice, data, positioning, and other functionalities). In some such embodiments, the 5GC 150 may be configured to control other RANs, such as the Evolved Universal Terrestrial Radio Access Network (E-UTRAN) comprising one or more evolved Node Bs (eNBs) in place of the gNBs 110 and/or one or more WLANs comprising WiFi access points. In some embodiments, both the NG-RAN 112 and the 5GC 150 may be replaced by other RANs and other core networks. For example, in an Evolved Packet System (EPS) defined by 3GPP to support LTE access: the UE 105 may access the EPS rather than the NG-RAN 112 and 5GC 150; the NG-RAN 112 may be replaced by an E-UTRAN containing eNBs in place of the gNBs 110; and the 5GC 140, 150 may be replaced by an Evolved Packet Core (EPC) comprising a Mobility Management Entity (MME) in place of the AMF 154, an Enhanced Serving Mobile Location Center (E-SMLC) in place of the LMF 152 and a GMLC that may be similar or identical to the VGMLC 155. In such an EPS, the E-SMLC may use LPPa in place of NRPPa to send and receive location information to and from the eNBs in the E-UTRAN and may use LPP to support positioning of UE 105. In addition, in some implementations, base stations (e.g. similar to or based on a gNB 110, ng-eNB or eNB) may function as positioning only beacons and transmit signals (e.g. PRS) to assist positioning of a UE 105 but not receive signals.

Figure 2:
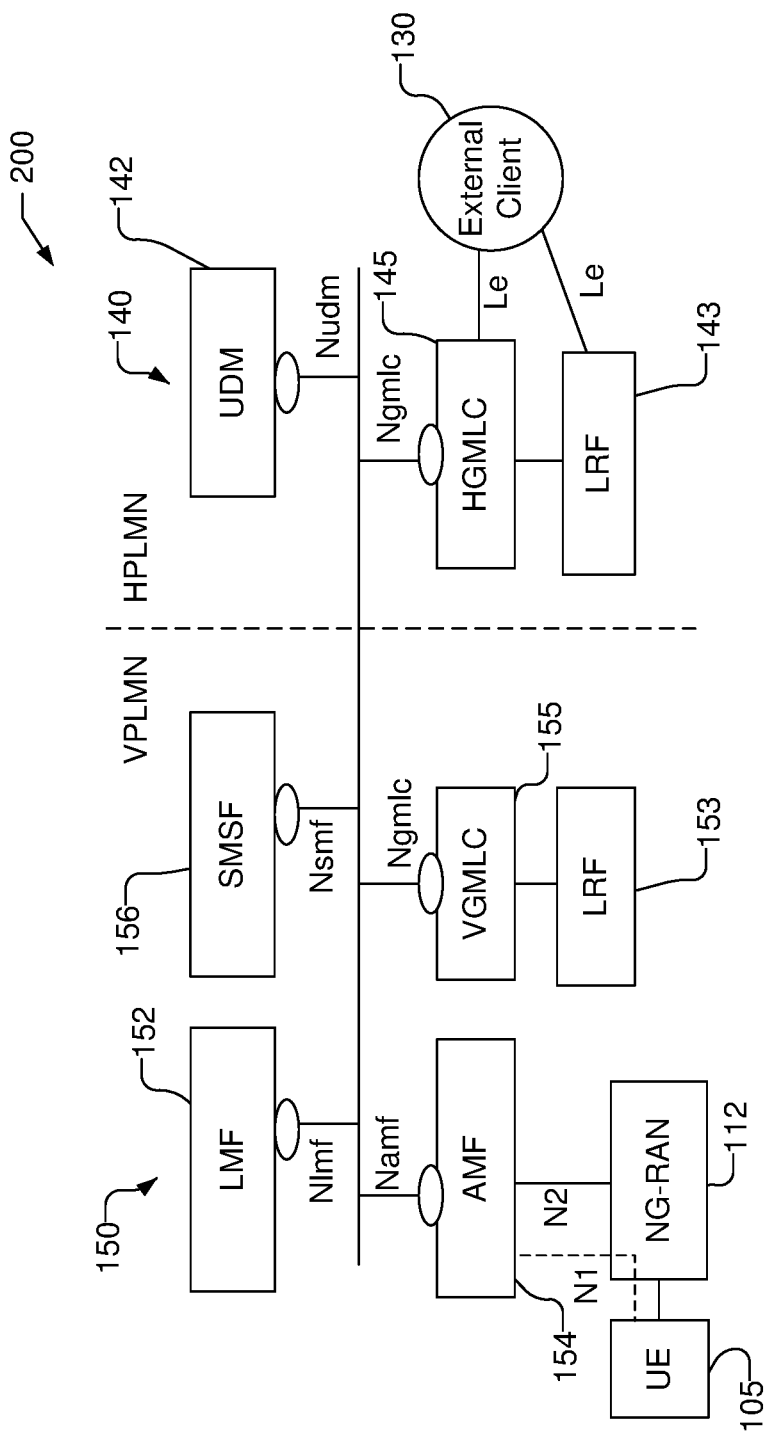
FIG. 2 shows an architecture for UL high efficiency location of a UE using a service based interface (SBI) representation.

FIG. 2 shows an architecture 200 for location services and UE 105 information transfer for roaming scenarios using a service based interface (SBI) representation. Here, N1 is the Reference point for transport of location related signaling (e.g. LPP messages) between UE 105 and LMF 152 via AMF 154, N2 is the Reference point to support location related signaling (e.g. transport of NRPPa messages) between AMF 154 and NG-RAN 112. Le is the reference point for Location Services (LCS) between HGMLC 145 or LRF 153 and External Client 130, as defined in 3GPP TS 23.271. The following SBIs are shown in FIG. 2. Ngmlc is the SBI exhibited by VGMLC 155 and HGMLC 145. Nlmf is the SBI exhibited by LMF 152. Namf is the SBI exhibited by AMF 154. Nudm is the SBI exhibited by the UDM 142. Nsmsf is the SBI exhibited by the SMSF 156. The SBIs shown in FIG. 2 may be as defined in 3GPP TS 23.502.

UL high efficiency location of a UE 105 may operate as follows in communication system 100 for the case of location based on the occurrence of periodic or triggered events detected by the UE 105. In a first stage, a periodic or triggered location session is initiated in a target UE 105 by an LS such as LMF 152 or SLP 148. In a second stage, UE 105 may enter an idle state during which it monitors the periodic or triggering event. After detecting an event, UE 105 may obtain downlink (DL) location measurements and determines (e.g. selects) a nearby cell and associated serving gNB 110. For example, the DL location measurements may be one or more of an identity (ID) (also referred to here as an identification for the determined cell, a Reference Signal Time Difference (RSTD), a Receive-Transmit (Rx-Tx) time difference, an Angle of Arrival (AOA), a Round Trip signal propagation Time (RTT), an Angle of Departure (AOD), a Received Signal Strength Indication (RSSI), a Reference Signal Received Power (RSRP), a Reference Signal Received Quality (RSRQ), a pseudorange for a GNSS, a code phase for a GNSS, a carrier phase for a GNSS, a measurement for a WLAN access point (AP), etc. In one embodiment, UE 105 obtains no DL location measurements—e.g. in order to reduce delay, reduce battery consumption, reduce UE 105 cost and complexity, or if UE 105 does not contain the resources to obtain DL location measurements. UE 105 then transmits an uplink positioning signal (UPS) in an available uplink positioning occasion (UPO). The UPS may encode information such as a UE ID for UE 105, an authentication code and DL location measurements or these may be sent separately. The NG-RAN 112 operator may assign a set of orthogonal UPSs to each gNB 110 with each gNB 110 receiving different orthogonal UPSs to other nearby gNBs 110. An orthogonal UPS may be assigned temporarily to a UE 105 (e.g. by a gNB 110 to which this orthogonal UPS was assigned) to enable non-interfering transmission of the UPS by the UE 105, or may be randomly selected by a UE 105 on a contention basis. Each gNB 110 may be aware of the UPSs assigned to other nearby gNBs 110 (e.g. via configuration by an Operations & Maintenance (O&M) server) and may attempt to acquire and measure all UPSs being transmitted by nearby UEs during each UPO. The gNBs 110 may optionally compute or verify a UE location (e.g. for UE 105). The gNBs 110 may each batch and transmit the received (or computed) location information to an indicated LS. The LS may compute or verify the UE 105 location. The LS may then send the UE 105 location to an external client 130. Thus, for each location, there may be only a small amount of signaling between the UE 105 and a gNB 110. Moreover, a gNB 110 may transmit the location information for UE 105 to the LS using a single message, which may include information from multiple UEs. Accordingly, resource usage by UE 105, gNBs 110 and the LS is reduced compared to conventional techniques.

The term "periodic or triggered location" as used herein may also be referred to as "periodic and triggered location" and refers to obtaining location for a UE 105 following a periodic event or a triggered event such as a UE entering or leaving a defined geographic area.

Examples of UL high efficiency location of a UE 105 are described next. It is noted that use of LMF 152 to support location of UE 105 is typically assumed. However, in an alternative embodiment, use of a different location server from LMF 152 such as an SLP (e.g. SLP 148) or an E-SMLC is possible. Further, some examples assume use of NR radio access by UE 105 to support UL high efficiency location. However, in other embodiments, other types of radio access may be used by UE 105 such as LTE or IEEE 802.11 WiFi. In these cases, use of a gNB 110 may be replaced by a different base station or access point for the radio access used by UE 105—e.g. with a gNB 110 being replaced by an eNB or ng-eNB in the case of LTE radio access by UE 105 or by a Non-3GPP Interworking Function (N3IWF) as described in 3GPP TS 23.501 in the case of IEEE 802.11 WiFi access by UE 105.

PSIB, UPOs and UPS

Figure 3:
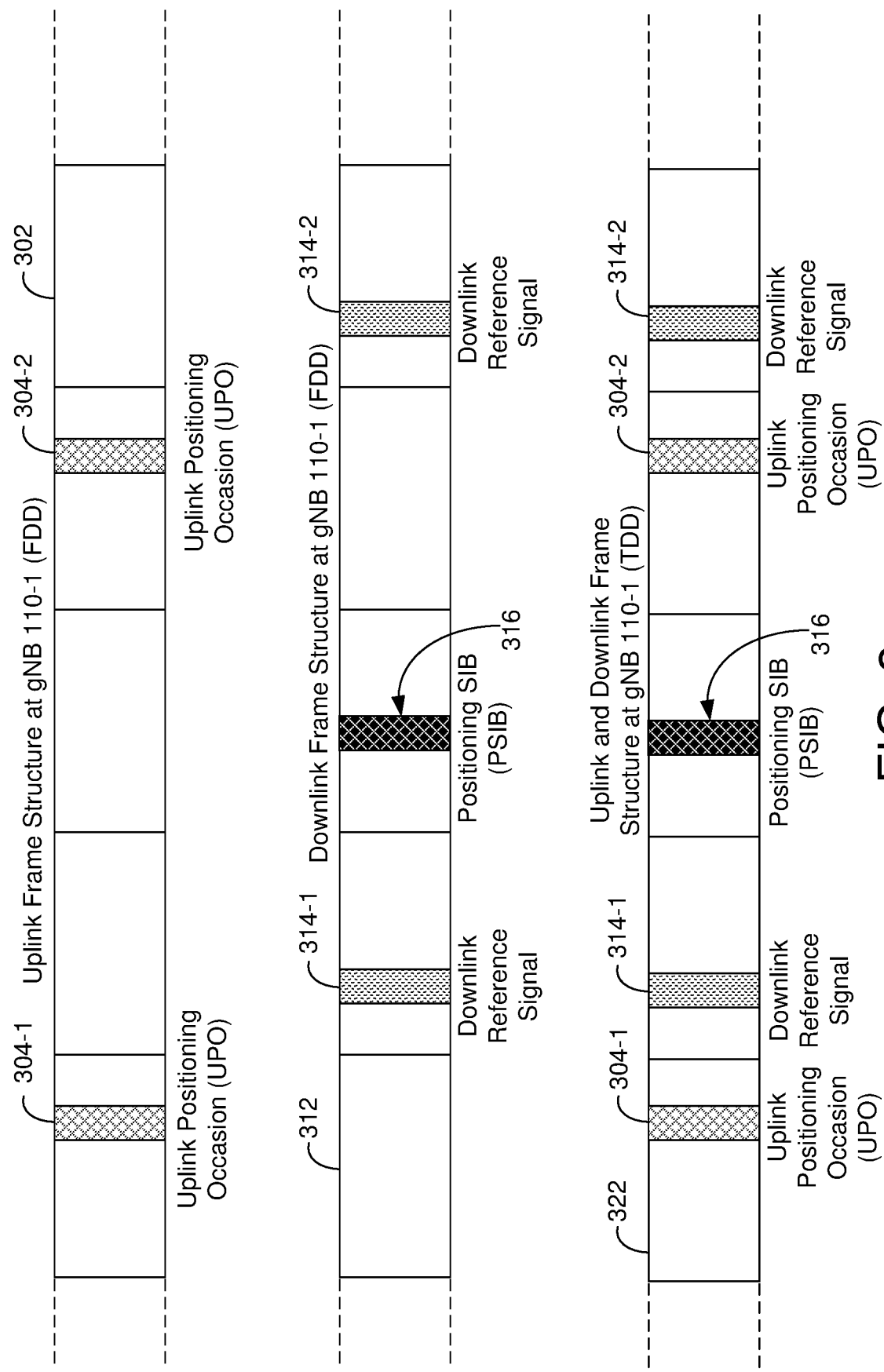
FIG. 3 shows an example of a framing structure at a gNB according to an embodiment.

FIG. 3 show an example UL frame structure 302 and an example DL frame structure 312 for 5G NR reception and transmission, respectively, at a gNB 110-1 to support uplink high efficiency location with Frequency Division Duplexing (FDD) mode. In the case of Time Division Duplexing (TDD) mode, the uplink frame structure 302 and the downlink frame structure 312 may be combined into a common (uplink and downlink) frame structure 322. In FIG. 3, time is represented horizontally with time increasing from left to right. In order to control UL transmission from a UE 105 (e.g. to provide UPO and UPS parameters to a UE 105), gNB 110-1 and other participating gNBs 110 can broadcast a downlink positioning SIB (PSIB) 316—which could be a new SIB (or SIBs) and/or an extension to existing SIBs. Thus, in some examples, PSIB 316 may comprise one or more existing SIBs and may not be dedicated exclusively to positioning or may be a new SIB dedicated exclusively to positioning.

The UPOs 304-1 and 304-2 in FIG. 3 are examples of two consecutive UPOs 304 at gNB 110-1. UPOs 304 may occur at fixed periodic intervals (e.g. equal to 100 milliseconds (ms) to 5 seconds) or may be dynamically scheduled (e.g. based on a level of demand from UEs), may have equal or unequal durations (e.g. of 1-10 ms each) and may comprise one or several consecutive NR subframes. During each UPO 304 for gNB 110-1, normal UL transmission (e.g. of signaling and data and excluding UPS) from UEs served by or camped on the gNB 110-1, and downlink transmission from gNB 110-1 in the case of TDD mode, may be suspended or otherwise prevented or inhibited by the gNB 110-1 in bandwidth allocated to UPS transmission. Instead, one or more UEs served by or camped on the gNB 110-1 may each transmit a UPS during a UPO 304 within a portion of bandwidth allocated to UPS transmission. The UPSs transmitted by different UEs served by or camped on the gNB 110-1 may be orthogonal (e.g. via use of different orthogonal code sequences and/or different frequency shifts) which may reduce interference between the UPS transmissions and may more easily allow acquisition and measurement of the UPS signals by the gNB 110-1. The UPOs for gNBs 110 may also be synchronized (e.g. synchronized with the UPOs 304 for gNB 110-1) to occur at almost the same time (e.g. to within around 0.05-0.5 ms) to reduce interference between UPS transmissions from UEs served by or camped on participating gNBs 110 during the same UPO and to enable all participating gNBs 110 to know when to measure UPS transmissions (at the same times). Such approximate synchronization can be achieved in several ways (e.g. using the Precision Time Protocol defined by IEEE) and may not require a GNSS receiver in each gNB 110.

The uplink (UPS) transmissions made by a UE 105 in a UPO 304 may not require the assignment of a signaling link or signaling channel to the UE 105 by the gNB 110-1 and can therefore be efficient in terms of interaction between a UE 105 and gNBs 110.

UPOs 304 can be defined similarly to downlink positioning occasions (e.g. positioning occasions defined for LTE wireless access based on a PRS) and may be based on defining a starting radio frame or starting subframe, a periodicity, a number of consecutive subframes and a bandwidth. Hyperframe numbering may also be employed to define when UPOs 304 occur over a long time period. In one aspect, a UE 105 may transmit a UPS in any UPO 304 (e.g. similar to use of a Random Access Channel (RACH)), whereby statistical variation may ensure that only a small number of UEs 105 will transmit in the same UPO 304 and thereby avoid too much interference. For a wide bandwidth (WB) UE 105, the duration of each UPO 304 may be 1-5 ms and occur every 1-30 seconds. For a narrow bandwidth (NB) Internet of Things (IoT) UE 105, the duration could be longer (e.g., 10-50 ms when FDD mode is used) to enable a UE 105 to send some DL location measurements and a measurable UPS. A network (e.g. NG-RAN 112) may employ separate NB and WB UPOs 304 or combine these into common UPOs 304. A network may also dynamically adjust UPO 304 parameters (e.g. periodicity, number of consecutive subframes and bandwidth) to more suitably match and support varying numbers of UEs and varying location accuracy requirements.

In one aspect, each UE 105 may be assigned particular UPOs 304 (e.g. one particular UPO 304 every hour) to reduce interference and congestion (though this may add to complexity). Assignment and reassignment of UPOs 304 may then be performed when a UE 105 is in connected state by a location server (e.g. LMF 152), a network node (e.g. AMF 154) or by a serving gNB 110. For example, this may occur when or just after a UE 105 performs a registration or re-registration with VPLMN 5GC 150 or HPLMN 5GC 140 or may be performed on demand from an external client 130.

A UPS (transmitted by a UE 105 during a UPO 304) can have an associated code sequence, bandwidth, carrier frequency, duration, number of consecutive subframes, and (possibly) a frequency shift (e.g. a set of distinct LTE or NR resource elements). In some aspects, a UPS may use frequency hopping—e.g. where consecutive subframes of a UPS are transmitted using different frequencies (e.g. different sets of LTE or NR resource blocks). The UPS may be acquired and measured by one or more nearby gNBs 110 (or dedicated positioning beacons). The UPS (transmitted by UE 105) may also encode data, referred to herein as "UPS data", containing a UE ID for UE 105 and, optionally, one or more DL location measurements obtained by UE 105. To support different levels of signal to noise ratio (S/N) (e.g. for a UE 105 near a gNB 110 versus at a cell edge), two or more types of encoding of UPS data (referred to herein as an "encoding type") may be supported with different associated levels of data compression. An encoding type may also be referred to as an "encoding method" or "encoding scheme" and may define how bits of data are mapped to symbols (e.g. symbols for Orthogonal Frequency Division Multiplexing (OFDM)), chips or other physical level elements or attributes for (e.g.) one or more wireless channels or subcarriers. For example, an encoding type may support relatively high data compression (e.g. 1 bit per Hz) to enable more UPS data to be included in a UPS transmission, which may require high S/N (e.g. S/N>0 dB) at a receiving gNB 110 in order to correctly decode the UPS data. Alternatively, an encoding type may support lower data compression (e.g. less than 0.1 bit per Hz) which may enable less UPS data to be included in a UPS transmission, but may allow a receiving gNB 110 to correctly decode the UPS data with a lower S/N level (e.g. S/N<−10 dB). A UE 105 may decide which encoding type to use and/or a transmission power based on measurements of RSRP and/or RSRQ for a particular selected cell for a nearby gNB 110—e.g. with a higher RSRP and/or higher RSRQ measurement being associated with use of an encoding type with higher data compression and/or use of lower transmit power. Each UPS code sequence may also be associated with one specific UPS data encoding type to enable a receiving gNB 110 to know in advance how to decode the received UPS data encoded within this code sequence. With such known UPS data encoding, a known fixed initial preamble (e.g. comprising a known bit sequence) may be included in the UPS data to enable gNBs 110 to acquire a UPS transmission, obtain the timing needed for the decoding and/or make a measurement of the UPS such as an UL Time Of Arrival (TOA) or UL Receive-Transmit time (Rx-Tx) measurement.

In one aspect, UEs 105 transmitting in the same UPO 304 and in the same local area (e.g. same cell coverage area) transmit using orthogonal UPSs. Orthogonal UPSs may be supported using different frequency shifts and/or different orthogonal code sequences. Orthogonal code sequences may be predefined sequences of Radio Frequency (RF) signal elements (e.g. symbols or chips) based, for example, on Gold codes, Kasami codes, Zadoff-Chu sequences, etc., as is well known in the art. A frequency shift may be applicable when a UPS comprises a subset of an available RF carrier frequency. UPS transmissions with different frequency shifts may then comprise different non-overlapping portions of RF carrier frequency at each instant of time, which may avoid interference due to non-overlapping frequencies. For example, in the case of OFDM wireless transmission, which may be applicable to UPSs for 5G NR, an available RF bandwidth may be divided in the frequency domain into uniformly spaced orthogonal subcarriers (e.g. using 15 KHz subcarrier spacing). Subcarriers may be grouped into a group of (e.g. 12) consecutive subcarriers which may be referred to as a resource block. A resource block may comprise a number of resource elements which may each correspond to one OFDM symbol within one subcarrier. A subframe for a first UPS transmission may then comprise a subset of S (e.g. S=2, 3, 4 or 6) resource elements for each symbol occurrence in a resource block. A subframe for a second UPS transmission with a different frequency shift than the first UPS transmission may comprise a different subset of S resource elements for each symbol occurrence in the resource block (e.g. where the S resource elements for the second UPS transmission are all different from the S resource elements for the first UPS transmission). Although the S resource elements for the first and second UPS transmissions may each change from one symbol occurrence to the next in the same resource block, in order to provide frequency diversity and make use of the full bandwidth of the resource block, the resource elements may remain non-overlapping at each symbol occurrence, thereby avoiding mutual interference.

When a UPS encodes UPS data (e.g. comprising a UE ID and DL location measurements), UPS code sequence lengths may be reduced (e.g. to the number of symbols used to encode each data bit) in order to allow encoding of more UPS data, For example, a UPS may employ a pair of orthogonal code sequences, S0 and S1, with S0 encoding a zero data bit value and S1 encoding a one data bit value. A UPS transmission during a UPO 304 may then comprise a code sequence comprising alternating instances of S0 and S1. For example, to encode UPS data that includes a binary value of 10011101, the code sequence <S1, S0, S0, S1, S1, S1, S0, S1> may be transmitted. However, such an encoding method may require shorter code sequence lengths (than when no UPS data is encoded), which may result in a smaller number of available orthogonal UPS code sequences. Alternatively, a UPS may employ a pair of orthogonal code sequences, S0* and S1*, with S0* encoding a zero data bit value and S1* encoding a one data bit value, but where each code sequence is defined to fill an entire subframe (e.g. of duration one ms). A UE 105 may then alternate between different portions of the two code sequences during UPS transmission in a UPO 304 to encode UPS data, For example, if the code sequence S0* includes a sequence of portions s00, s01, s02, s03, s04, s05, s06, s07, and if the code sequence S1* similarly includes a sequence of portions s10, s11, s12, s13, s14, s15, s16, s17, then the code sequence <s10, s01, s02, s13, s14, s15, s06, s17> may be transmitted to encode a binary value of 10011101. However, the alternation between portions of the two code sequences may impair their orthogonality and increase interference.

In order to reduce collisions between UEs, which may occur when two nearby UEs transmit in the same UPO 304 using an identical UPS, the number of UEs, which share a common set of code sequences on a random contention basis in the same local area, may need to be significantly less than the number of code sequences in the common set, to reduce the chance of two UEs selecting the same UPS. This may mean that a spectral efficiency for UPOs will be significantly lower than for other UL channels where UEs can be assigned orthogonal signaling bandwidth by gNBs 110. An evaluation further down herein suggests that spectral efficiency may at best be around 25-33% of that for normal UL transmission.

To support different levels of location accuracy (e.g. with a location error of between 20 and 1000 meters), UEs can be assigned (e.g. by an LS such as LMF 152) an accuracy level and/or more detailed parameters such as a preferred number and quality of DL location measurements and/or a required bandwidth for UPS transmission.

GNBs 110 may also broadcast a downlink reference signal 314 (e.g. as shown in FIG. 3 for two consecutive DL reference signals 314-1 and 314-2), which may be a PRS or other reference signal such as a tracking reference signal (TRS). A UE 105 may measure the downlink reference signal 314 for one or more nearby gNBs 110 and may include the resulting location measurements as part of (e.g., encoded within) a UPS transmission sent during one or more UPOs 304.

Figure 4:
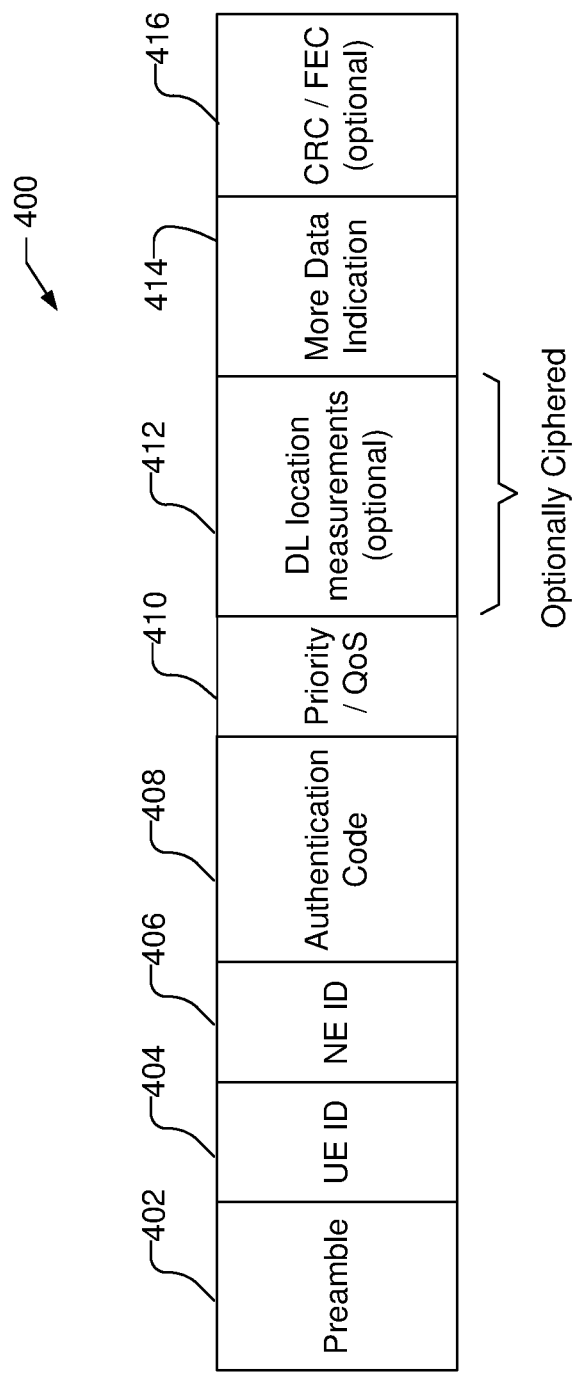
FIG. 4 shows an example of UE Transmission Content according to an embodiment.

FIG. 4 shows exemplary content for UPS data 400. In addition to a preamble 402 (e.g. containing a fixed known sequence of bits), the UPS data 400 may include: (i) a unique UE ID 404 to identify the UE 105; (ii) a Network Entity (NE) ID 406 to identify a server (e.g. LMF 152) or other recipient entity in 5GC 150 or NG-RAN 112 (e.g. AMF 154, ULTF 158 or a gNB 110); (iii) an authentication code 408 to authenticate the UE ID 404; (iv) an indication of a Priority and/or a Quality of Service (QoS) 410; (v) optional DL location measurements 412 which may be optionally ciphered; (vi) a more data indication 414 indicating whether UE 105 has more DL measurements to send that did not fit into the UPS data 400); and (vii) an optional Cyclic Redundancy Check (CRC) or Forward Error Correction (FEC) bits 416 to enable error detection or correction for UPS data 400. For a low data compression in UPS data 400, no DL location measurements 412 or only one or two DL location measurements 412 may be included.

UL and DL Location Measurements

In an extreme aspect, a UE 105 obtains and sends no DL location measurements 412 and gNBs 110 instead obtain UL location measurements for received UPS signals such as a TOA, Rx-Tx time, AOA and/or RSSI. This aspect may minimize UE 105 resource usage but may requires synchronized gNBs 110 in order to locate a UE 105—e.g. using Uplink Time Difference of Arrival (U-TDOA) based on TOA measurements.

In another aspect, a UE 105 measures RSTDs between pairs of nearby gNBs 110 and an Rx-Tx for a temporary serving gNB 110. For example, each gNB 110 can indicate cells for which RSTD measurements are requested or allowed (and optionally provide cell acquisition assistance data) in PSIB broadcasts. Other nearby gNBs 110, in addition to a temporary serving gNB 110-1 for a UE 105, may measure an Rx-Tx time difference for a UPS transmission from UE 105. This may enable RTT values to be obtained (e.g. by a temporary serving gNB 110-1 for UE 105 or by LMF 152) between a UE 105 and a number of gNBs 110, enabling UE 105 location by multilateration. GNBs 110 can also measure AOA for a UPS transmission received from UE 105 and UE 105 can measure AOA or AOD for signals (e.g. a DL reference signal 314) received from each gNB 110.

To estimate UPS data size, assume that a UE 105 obtains the following DL location measurements for each of a number of cells:

RSTD/Rx-Tx measurement=16 bits
RSTD Quality=10 bits
Physical Cell ID=10 bits
Number of measured cells=8
Total size=36 octets Assuming a 10 octet preamble 402, a 5 octet UE ID 404, a 2 octet NE ID 406, a 5 octet authentication code 408, and a 5 octet CRS/FEC 416, would imply a total UPS data size of 63 octets prior to encoding. This size would reduce to 45 octets with DL location measurements 412 for only 4 cells.

UE IDs and UE ID Authentication

The UE ID 404 in FIG. 4 preferably hides the true UE 105 identity to preserve UE 105 privacy and may be a local ID assigned by an LS (e.g. LMF 152) and provided to UE 105 by the LS. The LS may use the UE ID 404 to identify UE 105 (e.g. when receiving location information for UE 105 from UE 105 and/or from a gNB 110). The UE ID 404 should be unique among all UEs being located by the LS during the same time period. In order to avoid tracking of UE 105 by an unauthorized entity from one location event to another, the UE ID 404 should also change between successive UPS transmissions from UE 105. To enable this, an LS may provide a set of randomly chosen and unique UE IDs 404 to UE 105—e.g. when requesting a periodic or triggered location as described further down for FIG. 5. UE 105 may then use one UE ID 404 at a time from this set in UPS transmission (but possibly ignoring retransmission of a UPS where the same UE ID 404 may be reused). The size of the UE ID 404 can be estimated from the maximum number of UEs for which location will be supported by an LS during the same period. As an example, assuming an LS may support location of up to 100 million UEs simultaneously and provides each UE with an average of 100 UE IDs for any periodic or triggered location request, the UE ID 404 size would need to allow 10 billion unique UE IDs and would therefore need to comprise at least 34 bits. If the NE ID 406 is included as part of each UE ID 404 (e.g. using additional bits at the beginning or end of a UE ID 404) and is not provided as a separate parameter, the size of a UE ID 404 would increase by the number of bits needed for the NE ID 406. Once a UE ID 404 has been used by a target UE 105 to transmit a UPS, it can be assigned by the LS to another UE.

In one variant, an LS (e.g. LMF 152) might assign a single UE ID 404 to UE 105 for a first UPS transmission and extra information to enable UE 105 to derive other UE IDs based on UE ID 404 for subsequent UPS transmissions—e.g. similar to a frequency hopping sequence. For example, the extra information may indicate arithmetic or logical binary operations, and/or ciphering based operations, which UE 105 may perform to a previous UE ID 404 in order to derive a subsequent UE ID 404. The extra information may consume less signaling bits than sending a set of different UE IDs to UE 105 and may therefore reducing signaling to UE 105. However, the derived UE IDs are preferably difficult to infer from a previous UE ID by some outside entity in order to protect UE 105 privacy, and preferably avoid collision with the UE IDs derived by other UEs that are also supporting UL high efficiency location.

In another variant, an LS may permit UE 105 to use each UE ID 404 for more than one UPS transmission in order to reduce the total number of UE IDs that need to be sent to UE 105. For example, UE 105 may be permitted to use the same UE ID 404 in many or all UPS transmissions. In one example of this variant, LMF 152 sends a single UE ID 404 to UE 105 to be included in all UPSs transmitted by UE 105. However, any authentication code 408 included by UE 105 for a repeated use of the same UE ID 404 may be different to an authentication code 408 included for a previous use of the same UE ID 404 in order to prevent spoofing by another entity of UPS transmissions from UE 105. While this variant may enable some limited tracking of UE 105, it may still preclude tracking of UE 105 by an unauthorized entity over a long duration and/or over a large geographic area.

The authentication code 408 allows an LS (e.g. LMF 152) to authenticate the UE ID 404. Authentication codes could be randomly assigned by LMF 152 and sent to the UE 105 along with the UE IDs (e.g. with a different authentication code 408 being assigned for each different UE ID 404). Alternatively, the UE ID 404 could include the authentication code 408 by being randomly chosen from a large UE ID space (e.g. 96 bits in the case of a 34 bit UE ID). As another alternative, an LS may assign and send an indication of a ciphering key to UE 105. The indication of the ciphering key may enable UE 105 to determine a ciphering key. For example, the indication of the ciphering key may comprise the ciphering key, may indicate a ciphering key previously provided to (e.g. using a NAS protocol) or configured in UE 105, or may comprise information enabling UE 105 to determine a ciphering key (e.g. based on a ciphering key previously provided to or configured in UE 105). UE 105 may then use the determined ciphering key to generate the authentication code 408 using a hashing and ciphering operation on the UE ID 404 and possibly other information available to the UE 105 and LS such as the DL location measurements 412, the identity of a gNB 110 selected by UE 105, the identity of the temporary serving cell and/or a time of day.

In one embodiment, a gNB 110-1 may include a random value RV in a downlink broadcast to UEs, and may periodically change the value of RV which is broadcast. The downlink broadcast may occur in a SIB (e.g. in the PSIB). For example, the value of RV may include or comprise a date and time and/or may include a pseudo-random number generated by gNB 110-1. The UE 105 may then generate the authentication code 408 based on the determined ciphering key, the value of RV and possibly one or more of the UE ID 404, the NE ID 406, the DL location measurements 412 and/or other information such as an identity of gNB 110-1 or of a serving cell for gNB 110-1. UE 105 may also include the value of RV that was used to generate the authentication code 408 as part of UPS data 400 (e.g. as a separate field for the authentication code 408). For example, in cases where gNB 110-1 broadcasts the RV in a SIB and where the value of RV has just changed from an old to a new value, including the value of the RV in UPS data 400 by UE 105 may enable a gNB 110 to verify whether UE 105 used the old or the new value of RV to generate the authentication code 408, which may be needed when the authentication code 408 is verified (e.g. by LMF 152). By sending an unpredictable RV value to UE 105, a gNB 110-1 can avoid an attacker (e.g. another UE spoofing input from UE 105) from being able to determine an authentication code in advance, which may avoid or reduce any incidence of spoofing. In a variant, a gNB 110-1 may send the RV to UE 105 as part of information intended only for UE 105 (e.g. in a PSIB as described later for stage 9 in FIG. 6), which may enable the gNB 110-1 to know in advance which RV was used by UE 105 to generate the authentication code 408.

Priority and QoS

The indication of a priority and/or QoS 410 in UPS data 400 in FIG. 4 may be optional and, when included, may indicate a required priority, maximum transfer time and/or reliability of transfer to an LS (e.g. LMF 152) and/or to external client 130. For example, if a high priority or a QoS with a low maximum transfer time is indicated (e.g. such as a few seconds), a gNB 110 may transfer the information received from UE 105 in UPS data 400, and location measurements obtained by the gNB 110 for UPS data 400, to an LS (e.g. LMF 152) as soon as possible and may not store the information and transfer this at a later time. Conversely, if a high priority or low maximum transfer time is not indicated (e.g. a low priority is indicated or the priority and/or QoS indication 410 is not included), a gNB 110 may store the received information and any location measurements obtained by the gNB 110 and transfer the information at a later time to an LS (e.g. LMF 152) along with information for other UEs. The transfer of information to an LS (e.g. LMF 152) in the same message (or in the same set of messages) for a number of UEs may increase the efficiency of signaling (e.g. by reducing the number of separate messages sent by a gNB 110 to an LS), but may increase the transfer time and the associated delay in sending the location information to external client 130. In addition, if the priority and/or QoS indication 410 indicates high priority (or high reliability), a gNB 110 that is congested may retain and transfer information for a UE 105 that is received or measured for UPS data 400. However, if the indication of priority and/or QoS 410 does not indicate high priority (e.g. indicates low priority or is not included), a gNB 110 may ignore or discard UPS data 400 received from UE 105 (e.g. if the gNB 110 is congested) and may thereby not transfer any information to an LS (e.g. LMF 152), which may result in no location information for UE 105 being sent to an external client 130.

UPS Collision and Orthogonality

UPSs transmitted by UEs 105 in the same local area and for the same UPO may be orthogonal to avoid or reduce interference and enable gNBs 110 to measure and decode the content of the encoded UPS data. Four different methods of enabling orthogonal UPSs are possible. These are referred to herein as methods M1, M2, M3 and M4.

In the first method M1, a network may provide a set of available UPS codes (also referred to as code sequences), an available UPS bandwidth and available UPS frequency shifts that, in combination, define a set of orthogonal UPSs. The UPS codes may be partitioned among different gNBs 110 (to reduce interference) and may be provided to UEs 105 (e.g. along with an available UPS bandwidth and available UPS frequency shifts) by each gNB 110 using the PSIB together with an associated data encoding type for each UPS code. A UE 105 could then randomly determine a UPS code and a UPS frequency shift from among the set of available UPS codes and available UPS frequency shifts for a gNB 110 for each new UPS transmission. When two or more data encoding types are available, the UE 105 could first determine a data encoding type (e.g. based on an RSRP and/or RSRQ measurement for a nearby gNB 110) and then randomly determine one UPS code (and one UPS frequency shift) that were provided by a gNB 110 for this encoding type. A problem with this method is that collisions between different UEs could be likely. For example, even when a network supports a much larger number of orthogonal UPSs than the number of UEs transmitting a UPS in the same UPO and in the same local area, some collisions could still be likely. Furthermore, by assigning a large number of orthogonal UPSs, gNBs 110 would need to search over a larger number of orthogonal UPSs to find and acquire the UPS signals being transmitted by UEs for each UPO.

In the second method M2, a number of narrow UL frequency bands (e.g. 200 KHz per band) may be assigned by a network each associated with a different orthogonal UPS. UEs 105 may initially transmit a known common signal in one randomly chosen frequency band and listen to hear whether any other UEs are also transmitting in the same frequency band. The method of transmission and listening may be to listen initially and then alternate between transmitting and listening. If a UE 105 hears another UE transmitting in the same frequency band, the UE 105 can randomly select another frequency band and repeat the process. A UE 105 that has not heard another UE transmitting in a frequency band over several iterations of listening and transmitting might not initially change frequency upon hearing another UE transmit based on an assumption that the other UE may only have just started using the particular frequency band. After a short period, UEs 105 which appear to have acquired a frequency band may map the frequency band to the associated UPS and use this for transmission. The initial "listen and transmit" procedure might occur within an initial portion of a UPO (e.g. the first 25% of UPO duration), though it would reduce the remaining portion of the UPO available for UPS transmission. This method may only support a small number of UEs per UPO since the number of separate UL frequency bands would be limited. Also, a UE 105 might not detect a collision from another UE (e.g. on the opposite side of a target gNB 110) in a situation where the two UEs will still collide.

In the third method M3, a UE 105 may transmit a temporary ID comprising a short random code (e.g. 10-16 bits) in a common Random Access Channel (RACH) together with an indication that this is a request for UPS transmission. Collisions of random codes can be reduced or resolved by using a random code space much larger than the number of UEs likely to transmit nearby to one another at the same time and/or by repeating a transmission in the common RACH channel if not initially successful. A gNB 110-1 may then assign an available UPO and a unique UPS to a UE 105 for which a RACH transmission is received and can further assign a data encoding type, a transmission power level (e.g. based on the signal strength of the received RACH transmission) and a timing advance (TA) value (e.g. based on a time of arrival of the RACH transmission). The assignments for UE 105, and the assignments for all other UEs for which a RACH transmission is received by gNB 110-1 at around the same time, can then be broadcast to these UEs by gNB 110-1 using the PSIB. If the gNB 110-1 can determine an AOA for UE 105, the assignment can also be directionally broadcast to UE 105 to reduce the chance of some other UE obtaining the assignment by mistake. Method M3 may be similar to an UL signaling channel assignment and may involve a 2-step process though may be more efficient than allocating an UL signaling channel to a UE 105.

In the fourth method M4, a UE 105 may employ method M1 for initial UPS transmission. A UPS that can be received, decoded and optionally measured by at least one gNB 110 is then acknowledged (e.g. using the UE ID) by this gNB 110 using the PSIB. For example, if the UPS data for a particular UPS transmitted by UE 105 indicates a particular gNB 110 or a visible cell ID for a particular gNB 110, this gNB 110 (and not other gNBs 110) may acknowledge receipt of the UPS by including the UE ID received in the UPS data in information broadcast to UE 105 (and to other UEs) in the next PSIB transmission. (The indication of the particular gNB 110 or the visible cell ID for the particular gNB 110 may be accomplished explicitly by including an extra gNB 110 ID or extra cell ID within the UPS data, or may be accomplished implicitly using the UPS code sequence and/or UPS frequency shift for the UPS transmission in the case that each cell or each gNB 110 is allocated a different set of UPS code sequences and/or a different set of UPS frequency shifts to other nearby cells or nearby gNBs 110, respectively.) When an acknowledgment is not received, a UE 105 may be required to retransmit the UPS in a later UPO (e.g. the next UPO). The maximum number of retransmissions may be fixed or may depend on a UE 105 priority or location accuracy. For example, a low priority UE 105 may not retransmit at all, whereas a higher priority UE 105 may retransmit several times before giving up (e.g. when no acknowledgment is received). In an aspect, a gNB 110 may acknowledge a UPS received from a UE 105, e.g. by including a UE ID for UE 105 in the PSIB, and may also indicate in the PSIB that retransmission by UE 105 is required or that transmission of a second UPS by UE 105 is required containing additional DL location measurements. This aspect may be used to increase the accuracy of a location estimate for UE 105—e.g. if the gNB 110 was not able to obtain accurate UL location measurements for UE 105 when the first UPS transmitted by UE 105 was received.

For each of the methods M1-M4, the PSIB may be used to broadcast additional information to UEs regarding congestion. For example, when many UEs are competing for available UPS code sequences and/or available UPS frequency shifts, collisions between UEs may occur more frequently. This may be detected by a gNB 110 by detecting a higher level of interference (e.g. lower S/N) for UPSs received in a UPO. A gNB 110 may then throttle UPS transmission from UEs by indicating in a PSIB whether UEs are allowed to transmit an initial UPS and/or retransmit a UPS. A gNB 110 may also indicate in a PSIB a minimum interval of time that a UE 105 must wait before retransmitting a UPS or transmitting a new UPS. These indications may be related to the priority of a UE (e.g. the Priority/QoS 410) such that lower priority UEs are throttled more than higher priority UEs (e.g. such as by disallowing retransmission for lower priority UEs and/or by indicating a longer time interval between successive UPS transmissions for lower priority UEs).

Exemplary Signaling Flows

Figure 5:
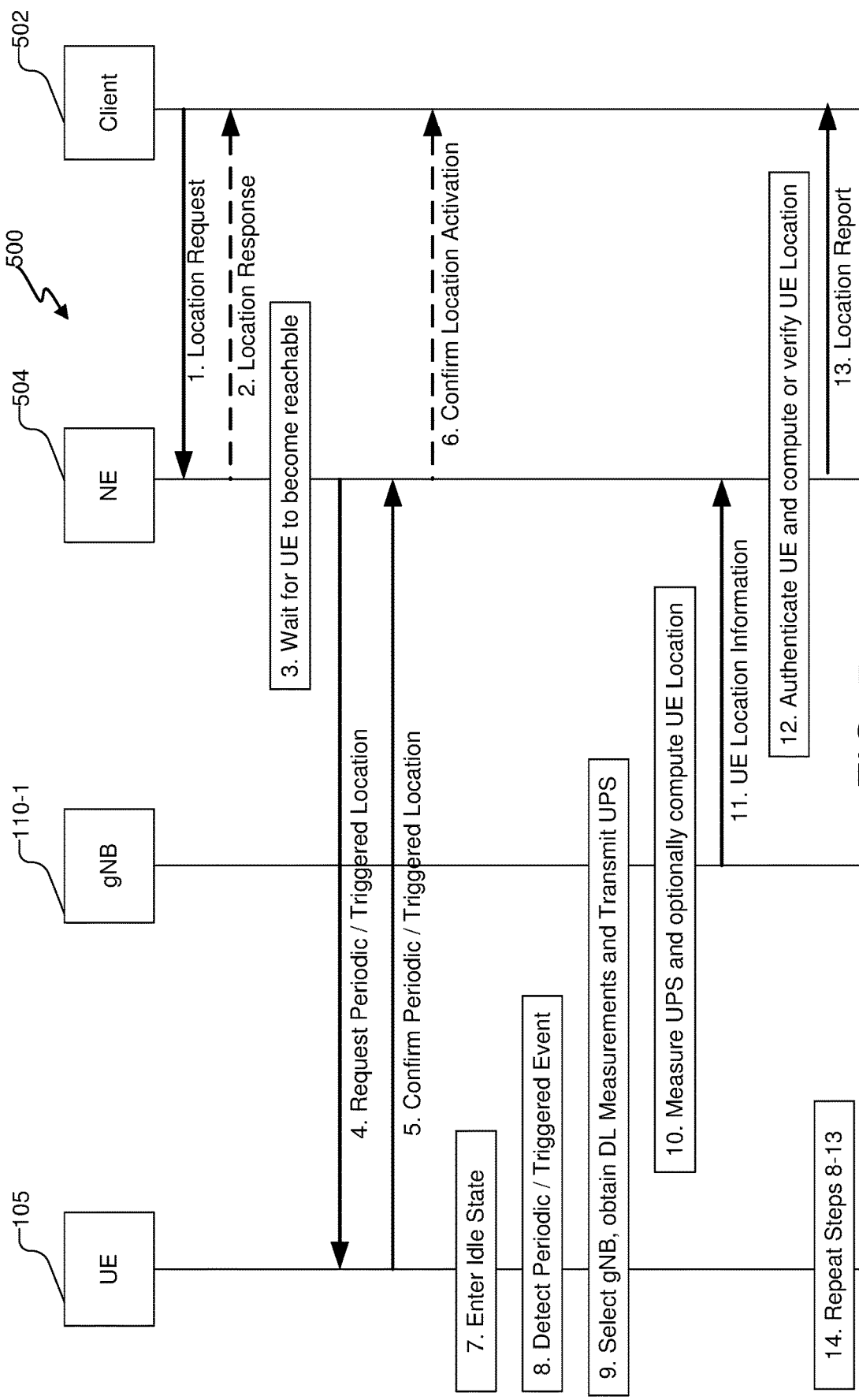
FIGS. 5-9 show signaling flows that illustrate UL high efficiency location for a user equipment (UE) for a 5G network.

FIG. 5 shows a signaling flow 500 illustrating the use of UL high efficiency location of UE 105 in more detail for the 5G VPLMN of FIGS. 1 and 2 (comprising NG-RAN 112 and 5GC 150).

At stage 1 in FIG. 5, a Client 502 sends a message to a Network Entity (NE) 504 in NG-RAN 112 or 5GC 150 to request periodic or triggered location of UE 105. Examples of location triggering may include the UE 105 moving by more than a threshold distance; UE 105 entering a new cell or new network tracking area; UE 105 entering, leaving or remaining within a defined geographic area; or UE 105 exceeding a certain velocity. More than one type of location event trigger may also be requested. For example, Client 502 may request location event reports (also referred to herein as location reports and as event reports) for UE 105 at fixed periodic intervals and when certain location trigger events occur such as UE 105 moving by more than a threshold distance from a previous location of UE 105 or UE 105 entering or leaving a defined geographic area. The request at stage 1 may also include an indication of a priority and/or Quality of Service (QoS), such as a required location accuracy, required maximum response time and/or required reliability.

In signaling flow 500, Client 502 may be External Client 130, an entity in VPLMN 5GC 150 (e.g. AMF 154, LMF 152 or VGMLC 155) or an entity in HPLMN 5GC 140 (e.g. HGMLC 145). NE 504 may be LMF 152, AMF 154, ULTF 158, a serving gNB 110 for UE 105 (e.g. gNB 110-1) or a location determining function (e.g. a location server) in NG-RAN 112 (not shown in FIG. 1). The message requesting periodic or triggered location at stage 1 may be sent via one or more intermediate entities (e.g. AMF 154, VGMLC 155 and/or HGMLC 145). In an aspect, the message requesting periodic or triggered location of UE 105 at stage 1 may be an NRPPa message (e.g. when Client 502 corresponds to LMF 152 and NE 504 corresponds to a gNB 110 or a location server in NG-RAN 112) or a message for a Next Generation Application Protocol (NG-AP or NGAP) (e.g. when Client 502 corresponds to AMF 154 and NE 504 corresponds to a gNB 110).

At stage 2 in signaling flow 500, NE 504 may confirm acceptance of the request. Stage 2 may be optional and may not occur in all embodiments.

At stage 3, NE 504 waits for the target UE 105 to become reachable, e.g., no longer in an extended Discontinuous Reception (eDRX) mode or Power Saving Mode (PSM). This may involve being notified of UE 105 reachability through a transmission (e.g. a request for a signaling connection) from UE 105 or by a notification from a serving AMF 154 or a serving gNB 110 for UE 105 (e.g. using an event exposure notify service operation in the case of AMF 154 as defined in 3GPP TS 23.502).

At stage 4, NE 504 sends a message to the (now reachable) target UE 105 (e.g. via serving AMF 154, serving gNB 110-1 and/or ULTF 158) to request periodic or triggered location of UE 105. In an aspect, the message may be an LPP or NPP message (e.g. when NE 504 corresponds to LMF 152), a Radio Resource Control (RRC) message (e.g. when NE 504 corresponds to a gNB 110 or a location server in NG-RAN 112) or a NAS message or Supplementary Services (SS) message (e.g. when NE 504 corresponds to AMF 154). NE 504 includes sufficient information in the message sent at stage 4 to enable UE 105 to perform subsequent stages 8 and 9. The message may instruct UE 105 to perform UPS transmission at stage 9 and may include the types of location information the UE 105 needs to obtain at stage 9 (e.g. such as particular DL location measurements for OTDOA, A-GNSS, RTK, WLAN and/or ECID position methods), an identity (ID) for NE 504, a set of one or more UE IDs for the UE 105, any QoS and/or priority indication received at stage 1, details of the periodic or triggered location request, an indication of a ciphering key and/or authentication related information. The message sent at stage 4 may be ciphered and not readable by unauthorized entities. In some embodiments, the ID for NE 504 sent at stage 4 may be part of the UE ID (or part of each UE ID) and may not be a separate parameter. It is noted that the term identity (ID) as used herein may also be referred to as an identifier or identification.

At stage 5, UE 105 returns a response message to NE 504 (e.g. via gNB 110-1 and/or AMF 154) confirming acceptance of the request. The response message may be for the same protocol as the request message sent at stage 4.

At stage 6, NE 504 may confirm activation of periodic or triggered location in the target UE 105 to Client 502. Stage 6 may be optional and may not occur in all embodiments.

At stage 7, UE 105 enters an idle state (e.g. eDRX or PSM) in which there is no signaling connection between UE 105 and NG-RAN 112 and/or 5GC 150.

At stage 8, UE 105 periodically monitors for the requested periodic or triggered location event(s) and determines when an event has occurred. After an event is detected by UE 105 at stage 8, UE 105 proceeds to stage 9.

At stage 9, UE 105 obtains any requested location information (e.g. visible cell IDs and/or DL location measurements), selects a suitable nearby cell and associated gNB 110, and transmits a UPS as described more fully below for FIG. 6. In this example, the selected gNB 110 is assumed to be gNB 110-1 but could be another gNB 110 different from gNB 110-1. Minimally, the nearby cell and associated gNB 110 selected by UE 105 at stage 9 serve as the location information and UE 105 obtains no additional DL location measurements at stage 9 and may include no DL location measurements as part of the UPS data transmitted at stage 9. UE 105 includes a UE ID (from the set of one or more UE IDs received at stage 4) and the NE 504 ID (e.g. if the NE 504 ID is not part of the UE ID) as received at stage 4, as part of UPS data encoded within the UPS transmitted at stage 9. UE 105 may also include authentication information for the UE ID, an indication of priority and/or QoS (e.g. as received at stage 4), and any DL location measurements obtained at stage 9 as part of the UPS data transmitted at stage 9. The UPS data transmitted at stage 9 may be as described for FIG. 4.

At stage 10, gNB 110-1 and/or other gNBs 110 (not shown in FIG. 5) may obtain UL location measurements for the UPS transmitted at stage 9 such as an UL TOA, UL Rx-Tx, RSSI, RSRP, RSRQ and/or AOA. GNB 110-1 and/or other gNBs 110 may also decode the UPS data contained in the UPS transmitted by UE 105 at stage 9 and may obtain the UE ID, the NE 504 ID and any authentication information and/or DL location measurements contained in the UPS data (e.g. as exemplified in FIG. 4). GNB 110-1 and/or other gNBs 110 may optionally compute a location for UE 105 from any UL location measurements obtained at stage 10 and/or from any DL location measurements obtained from the UPS data at stage 10. In some embodiments, gNB 110-1 and/or other gNBs 110 may exchange UL location measurements obtained at stage 10 for UE 105 (e.g. when two or more gNBs 110 obtain UL location measurements for the UPS transmitted by UE 105 at stage 9), in order to increase the number of independent UL location measurements available to a gNB 110 (e.g. gNB 110-1), which may enable the computation of a more accurate location for UE 105 at stage 10 by a gNB 110 (e.g. gNB 110-1).

At stage 11, gNB 110-1, and any other gNBs 110 which receive, decode and measure the UPS at stage 10, send any received DL location measurements, any obtained UL location measurements and/or any location estimate for UE 105 computed or verified at stage 10, along with other information obtained for UE 105 from the UPS data received and decoded at stage 10, to NE 504 as indicated by the NE 504 ID (or the UE ID) obtained at stage 10. The gNB 110-1 and/or other gNBs 110 may send (e.g. batch within the same message(s)) location information received from multiple UEs to NE 504 to reduce signaling, for example if this is not disallowed by an indication of priority and/or QoS received at stage 9. Alternatively, gNB 110-1 and/or other gNBs 110 may send the received, measured and/or computed location information for UE 105 to NE 504 as quickly as possible (e.g. in dedicated messages) if a high priority or low QoS delay was indicated at stage 9. GNB 110-1 and/or other gNBs 110 may send the location information directly to NE 504 if gNB 110-1 and/or the other gNBs 110, respectively, are connected to NE 504 (e.g. via a VPLMN intranet) or may send the location information to NE 504 via one or more intermediate entities, such as AMF 154 and/or ULTF 158. In an embodiment, the location information and other information for UE 105 sent by gNB 110-1 and/or other gNBs 110 to NE 504 at stage 11 may be sent as part of an LPPa or NRPPa message (or messages). In one embodiment, gNB 110-1 may be NE 504 when NE 504 is gNB 110-1. In this embodiment, stage 11 may not occur.

At stage 12, NE 504 may verify that the location information received at stage 11 is for UE 105 using the UE ID which may form part of the received location information. NE 504 may also authenticate the received UE ID using any received authentication information for the UE ID. NE 504 may also wait to receive location information for UE 105 from other gNBs 110 in one or more repetitions of stage 11 for one or more other gNBs 110. For example, NE 504 may wait for a threshold period of time (e.g. 5-10 seconds) after receiving location information for UE 105 from one gNB 110 at stage 11, during which time, location information may be received by NE 504 for UE 105 from one or more other gNBs 110. NE 504 may then combine the location information for UE 105 received from gNB 110-1 and/or other gNBs 110 at stage 11 and either compute or verify a location estimate for UE 105 from the combined location information (e.g. which may include DL location measurements obtained by UE 105 at stage 9 and/or UL location measurements obtained by gNB 110-1 and/or other gNBs 110 at stage 10).

As part of stage 12, NE 504 may process location information received at stage 11 for UE 105 based on any included indication of priority and/or QoS. For example, the location information for UE 105 may be processed by NE 504 ahead of location information received by NE 504 for another UE, which has a lower priority or a higher QoS maximum delay than UE 105, even when the location information for the other UE is received by NE 504 before the location information for UE 105. As another example, a threshold period of time during which NE 504 waits to receive location information for UE 105 from other gNBs 110, after receiving location information for UE 105 from one gNB 110 at stage 11, may be reduced if a priority and/or QoS indication received at stage 11 for UE 105 indicates low delay. Alternatively, the threshold period of time may be increased if the priority and/or QoS indicates high location accuracy for UE 105.

At stage 13, NE 504 forwards the UE 105 location estimate and/or an event report to Client 502. Optionally (not shown in FIG. 5), NE 504 may later send updated information to UE 105 regarding the periodic or triggered location session after the UE 105 becomes reachable. For example, the updated information may change the periodic or triggered location requirements, may terminate the periodic or triggered location session or may provide additional information to the UE 105 for the periodic or triggered location session such as additional UE IDs for reporting of location events.

At stage 14. UE 105 initiates a repetition of stages 8-13 for further periodic or trigger events and may cease when a maximum duration or maximum number of event reports has been reached.

Figure 6:
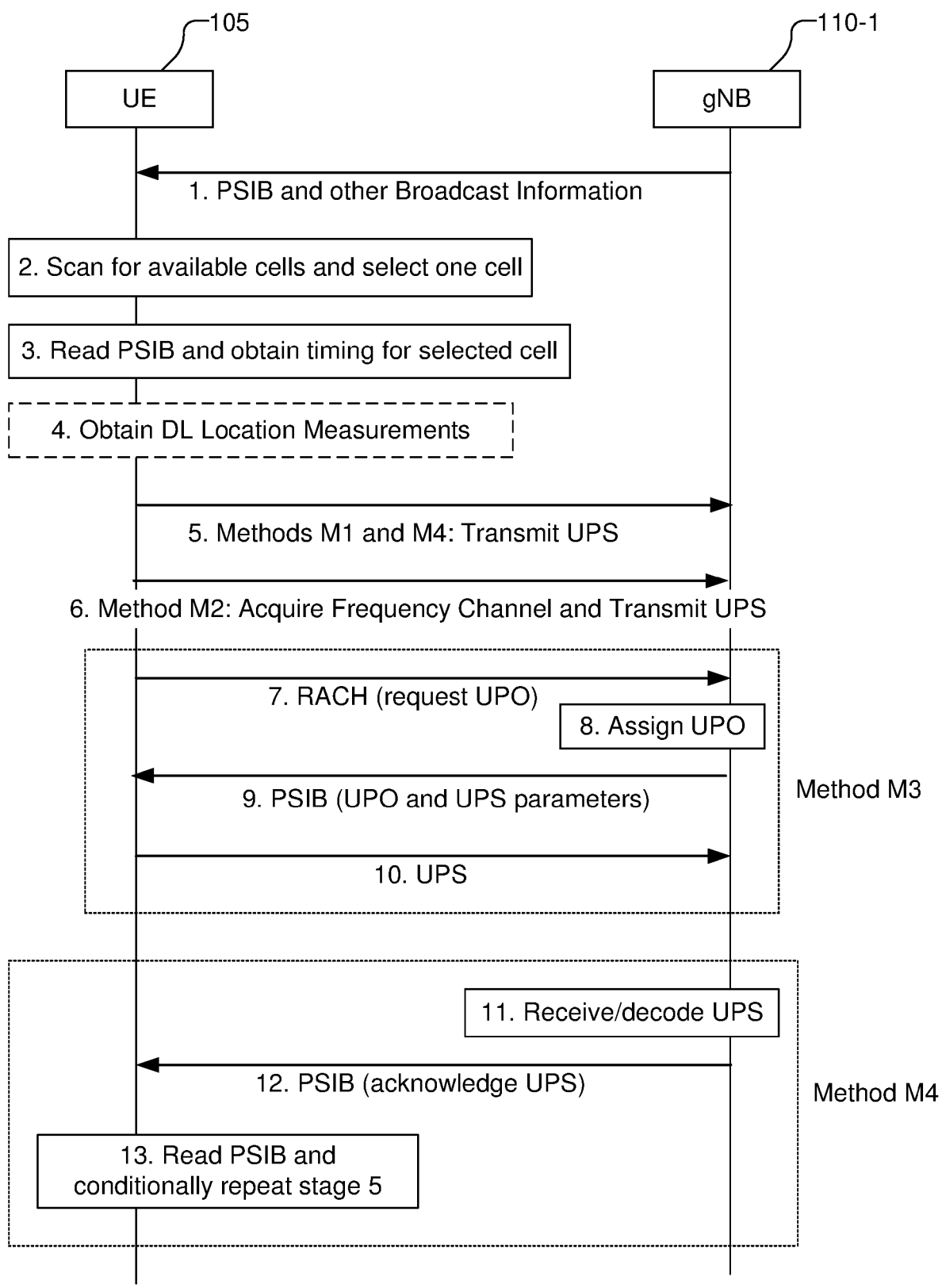

FIG. 6 shows more details of stage 9 in FIG. 5 for one example embodiment.

At stage 1 in FIG. 6, which may be an ongoing continuous or repetitive stage, gNB 110-1 broadcasts a PSIB and other information in one or more cells for gNB 110-1. The PSIB may indicate UPS parameters for methods M1, M2 and M4 and an association of narrow UL frequency bands with particular orthogonal UPS signals for method M2. Other information broadcast at stage 1 may include an identity for each cell for gNB 110-1, timing information for each cell and information on when a PSIB will be broadcast and/or when available UPOs are scheduled. In more detail, UPS parameters broadcast at stage 1 (e.g. in the PSIB) may include an allowed or required carrier frequency, bandwidth, frequency shift(s), code sequence(s), power level(s), frequency hopping sequence(s), and/or encoding types for UPS data. UPO parameters broadcast at stage 1 (e.g. in the PSIB) may include the scheduling of UPOs such as an initial time offset of a first UPO in a sequence of system or radio frames, a periodicity of UPOs, a duration of each UPO, and/or a number of consecutive subframes for each UPO. As described previously, the PSIB may comprise one or more SIBs.

At stage 2 in FIG. 6, UE 105 scans for available cells and selects one cell (e.g. a cell with a highest transmit power or satisfying some other criteria). In this example, the selected cell belongs to gNB 110-1.

At stage 3, UE 105 obtains timing for the selected cell and obtains information from a PSIB (e.g. which may comprise one or more SIBs) broadcast by gNB 110-1 in the selected cell. The information from the PSIB may include UPS and UPO parameters for methods M1, M2 and M4 and an association of narrow UL frequency bands with particular orthogonal UPS signals for method M2. UPS and UPO parameters obtained by UE 105 at stage 3 may be as described above for stage 1. As part of stage 3, UE 105 determines the next available UPO (or a next available set of UPOs) for the selected cell for methods M1, M2 and M4.

At stage 4, UE 105 obtains any DL location measurements requested at stage 4 of FIG. 5 (e.g. the ID for the selected cell, IDs for other visible cells, DL location measurements for nearby cells and possibly nearby WLAN APs, Bluetooth (BT) APs and/or GNSS SVs). UE 105 may obtain assistance data (AD) for such location measurements (e.g. AD for OTDOA RSTD measurements or AD for GNSS pseudorange measurements) from assistance data broadcast by a nearby gNB 110 such as gNB 110-1. Minimally, the cell and/or the associated gNB 110-1 selected by UE 105 at stage 1 serves as the DL location measurement(s).

At stage 5 which may only occur for methods M1 and M4, UE 105 determines UPS data as described in association with FIG. 4 and transmits a UPS encoding the UPS data in a next available UPO determined at stage 3. The transmitted UPS may use a carrier frequency, bandwidth, frequency shift, code sequence, duration, number of consecutive subframes, frequency hopping sequence, and/or encoding type for the UPS data that were indicated as required or allowed in the PSIB information obtained at stage 3. For example, when the PSIB information indicates a plurality of allowed frequency shifts and/or a plurality of allowed code sequences, UE 105 may randomly select one frequency shift and/or one code sequence from each plurality, respectively. The transmission power level used for the UPS transmission and/or the encoding type for the UPS data may be based at least in part on an RSSI, RSRP and/or RSRQ measurement by UE 105 for the cell selected at stage 2. For example, UE 105 may use a higher transmission power level and/or an encoding type with lower data compression when UE 105 measures a lower RSSI, RSRP and/or RSRQ for the cell selected at stage 2. The UPS data may be as described for FIG. 4 and may include some or all of the DL location measurements obtained at stage 4.

At stage 6 which may only occur for method M2, UE 105 attempts to acquire a narrow UL frequency channel and if successful maps this to a corresponding UPS as described previously for method M2. UE 105 then transmits the UPS in a next available UPO determined at stage 3 as described for stage 5 except that the parameters for the UPS (e.g. carrier frequency, bandwidth, frequency shift, code sequence and/or encoding type for UPS data) may be determined according to the acquired narrow UL frequency channel and may not need to be determined by UE 105 as described for stage 5.

Stages 7 to 10 may only occur for method M3. At stage 7, UE 105 sends a RACH request to gNB 110-1 within the selected cell to request a UPO for transmission of a UPS. The RACH request may include a temporary ID for UE 105 and an indication that the RACH request if requesting transmission of a UPS.

At stage 8, based on the RACH request received at stage 7, gNB 110-1 assigns a UPO to UE 105 and determines UPS parameters for UPS transmission by UE 105. The UPS parameters may include a transmission power level, carrier frequency, bandwidth, frequency shift, duration, number of consecutive subframes, frequency hopping sequence, code sequence and/or an encoding type for UPS data. The transmission power level and/or the encoding type for UPS data may be determined by gNB 110-1 based at least in part on an RSSI, RSRP and/or RSRQ measurement obtained by gNB 110-1 for the RACH request received at stage 7. For example, gNB 110-1 may determine a higher transmission power level and/or an encoding type with lower data compression when gNB 110-1 measures a lower RSSI, RSRP and/or RSRQ for the RACH request.

At stage 9, gNB 110-1 broadcasts a PSIB (e.g. which may be part of PSIB transmission for stage 1). GNB 110-1 may include in the PSIB transmitted at stage 9 the temporary ID for UE 105 received in the RACH request at stage 7, an indication of the UPO assigned at stage 8 and the UPS parameters determined at stage 8.

At stage 10, UE 105 receives and decodes the PSIB transmitted at stage 9. If the PSIB indicates that a UPO is assigned, UE 105 determines a UPO as being the assigned UPO and transmits a UPS at stage 10 in the assigned UPO. The transmitted UPS may include UPS data and may use a power level, carrier frequency, bandwidth, frequency shift, duration, number of consecutive subframes, frequency hopping sequence, code sequence and/or encoding type for the UPS data that were indicated by the PSIB parameters included in the PSIB received at stage 10. The UPS data may be as described for FIG. 4 and may include some or all of the DL location measurements obtained at stage 4.

Stages 11-13 may occur only for method M4. At stage 11, gNB 110-1 receives the UPS transmitted at stage 5 and decodes the UPS data encoded in the UPS.

At stage 12, gNB 110-1 may broadcast a PSIB in the selected cell and includes in the PSIB an acknowledgement of the received UPS and the UE ID received in the UPS data decoded at stage 11. The PSIB broadcast at stage 12 may be part of PSIB broadcast as described for stage 1. The acknowledgment may indicate whether UE 105 needs to retransmit the UPS, transmit an additional UPS (e.g. containing additional DL location measurements) or does not need to transmit or retransmit a UPS. In the case of a request for transmission or retransmission, the request may in some embodiments indicate an assigned UPO and/or UPS parameters to be used by UE 105 for the transmitted or retransmitted UPS, e.g. as described for stage 8.

At stage 13, UE 105 receives and decodes the PSIB broadcast at stage 12. The receiving and decoding may allow for some delay in acknowledgment from gNB 110-1 and may therefore occupy a small interval of time (e.g. a few seconds). If the PSIB received and decoded at stage 13 requests a retransmission of the UPS or requests transmission of another UPS (e.g. containing DL location measurements that were not included in the UPS data sent at stage 5), UE 105 retransmits the UPS or transmits a new UPS, in each case respectively, as described for stage 5 but using any UPO and UPS parameters provided in the PSIB broadcast at stage 12. UE 105 may also retransmit the UPS as at stage 5 if stage 12 does not occur (i.e. if there is no acknowledgment of the UPS transmitted at stage 5) and if a maximum number of UPS retransmissions is not yet attained.

In one variant of the procedure shown in FIGS. 5 and 6, referred to herein as a "codeword based reporting", Client 502 may request periodic or triggered location of UE 105 at stage 1 in FIG. 5 according to trigger criteria not visible to NE 504. For example, Client 502 may include a codeword in the location request sent at stage 1 in FIG. 5, which is subsequently sent to UE 105 by NE 504 as part of the request for periodic or triggered location sent at stage 4 of FIG. 5. The codeword may be meaningful to UE 105 (e.g. may be configured in advance in UE 105) and may indicate a particular type of triggered and/or periodic event to be detected by UE 105 at stage 8 in FIG. 5 and reported at stage 9 in FIG. 5. The particular type of triggered and/or periodic event may not be known to NE 504, although some other aspects of the periodic or triggered location may be provided by Client 502 to NE 504 such as a required QoS for a location estimate for UE 105, a maximum duration of location reporting and/or a maximum number of location reports. An advantage of indicating the particular type of event to be reported only to UE 105 and not to NE 504 or other elements in 5GC 140 and 5GC 150 (e.g. VGMLC 155 and HGMLC 145) is that new types of event trigger can be defined and supported that require impacts only to Client 502 and UE 105 and not to elements in 5GC 140 or 5GC 150. For example, the impacts to UE 105 may be downloaded via a data transfer to UE 105 (e.g. as part of an App) and may later be changed by another download. This may enable greater flexibility in triggered and periodic location reporting. Examples of new types of triggering events that could be supported using this variant include: (i) events based on a time of day or day of week (e.g. such a reporting a location of UE 105 at particular times of day and/or particular days in a week); (ii) events based on a current location of UE 105 such as reporting a location of UE 105 at frequent intervals (e.g. every 5 minutes) when UE 105 is in an area of interest versus reporting a location of UE 105 less frequently (e.g. every 2 hours) when UE 105 is not in an area of interest; and (iii) events based on a current movement of UE 105 such as reporting a location of UE 105 frequently (e.g. every 10 minutes) when UE 105 is moving and not reporting a location of UE 105 when UE 105 is stationary. The codeword that is provided by Client 502 at stage 1 in FIG. 5 for this variant, and that is transferred to UE 105 at stage 4 in FIG. 5, may be encoded in different ways such as using a single value, multiple values, a bit string, an octet string, a character string, an integer, a character etc. Moreover, in some embodiments, the codeword may be absent and instead the presence of a periodic or triggered location request itself may indicate a particular type of triggered or periodic location reporting (e.g. based in part on a current time of day, day of week or current location of UE 105).

UPS Collision Probability

For methods M1 and M4, the number and probability of UPS collisions for UE 105 can be estimated as follows.

Let N=Number of available orthogonal UPSs
  n=Number of UEs transmitting (or retransmitting) a UPS in the same UPO and same local area
  E=Expected Number of UEs with UPS collisions per UPO
  P(r)=Probability that a UE 105 collides with other UEs in each of r separate UPS transmissions by UE 105
  B=bandwidth efficiency (assuming it is possible to use all N UPSs when there is no collision)

Then $E=n(1-(1-1/N)^{n-1})$ (1)

$P(r)=(1-(1-1/N)^{n-1})^r$ (2)

$B=(n-E)/N$ (3)

Tables 1 and 2 show examples of the values of E, P(r) and B as determined from equations (1), (2) and (3), respectively, for n=20 (e.g. representative of a wideband UE 105) and n=100 (e.g. representative of a narrowband IoT UE 105 or for radio access using millimeter wave). The values of E, B and P(1) in Tables 1 and 2 may be applicable to both methods M1 and M2. However, the values of P(r) in Tables 1 and 2 for r>1 may only apply to method M4, as method M4 supports retransmission of a UPS by a UE 105 following a collision but method 1 does not.

TABLE 1

Expected Collisions for n = 20 UEs

| N | E | B % | P(1) % | P(2) % | P(3) % | P(4) % | P(5) % |
|---|---|---|---|---|---|---|---|
| 20 | 12.5 | 38 | 62.3 | 38.8 | 24.1 | 15.0 | 9.4 |
| 40 | 7.6 | 31 | 38.2 | 14.6 | 5.6 | 2.1 | 0.8 |
| 60 | 5.5 | 24 | 27.3 | 7.5 | 2.0 | 0.6 | 0.2 |
| 80 | 4.3 | 20 | 21.3 | 4.5 | 1.0 | 0.2 | 0.0 |
| 100 | 3.5 | 17 | 17.4 | 3.0 | 0.5 | 0.1 | 0.0 |
| 150 | 2.4 | 12 | 11.9 | 1.4 | 0.2 | 0.0 | 0.0 |
| 200 | 1.8 | 9 | 9.1 | 0.8 | 0.1 | 0.0 | 0.0 |

TABLE 2

Expected Collisions for n = 100 UEs

| N | E | B % | P(1) % | P(2) % | P(3) % | P(4) % | P(5) % |
|---|---|---|---|---|---|---|---|
| 100 | 63.0 | 37 | 63.0 | 39.7 | 25.0 | 15.8 | 9.9 |
| 200 | 39.1 | 30 | 39.1 | 15.3 | 6.0 | 2.3 | 0.9 |
| 300 | 28.1 | 24 | 28.1 | 7.9 | 2.2 | 0.6 | 0.2 |
| 400 | 21.9 | 20 | 21.9 | 4.8 | 1.1 | 0.2 | 0.1 |
| 500 | 18.0 | 16 | 18.0 | 3.2 | 0.6 | 0.1 | 0.0 |
| 750 | 12.4 | 12 | 12.4 | 1.5 | 0.2 | 0.0 | 0.0 |
| 1000 | 9.4 | 9 | 9.4 | 0.9 | 0.1 | 0/0 | 0.0 |

For method M4, Tables 1 and 2 show that if 99% reliability of successful UPS transmission is required with no more than 3 UPS transmissions per UE, then the best case bandwidth utilization is around 20% (which occurs for N=80 in Table 1 and N=400 in Table 2 as shown by the associated values of P(3)). However, if up to 4 UPS transmissions is acceptable, the best case bandwidth utilization increases to around 25% (which occurs for N slightly less than 60 in Table 1 and slightly less than 300 in Table 2 in association with the values of P(4)). However, if up to 5 transmissions can be tolerated, the best case bandwidth utilization increases to around 30% (for N equal to 40 in Table 1 and 200 in Table 2 in association with the values for P(5)).

Method M4 can thus work but may not be very efficient. Instead, method M3 could be more efficient to allocate orthogonal UPSs in advance and avoid collisions.

Another more efficient method to avoid collisions and enable improved location accuracy would be to combine methods M1, M3 and M4 into a single method M5. With method M5, a UE 105 would perform an initial UPS transmission based on control parameters received in the PSIB. If instructed in the PSIB, selected UEs 105 would then perform one or more additional UPS transmissions based on subsequent content in the PSIB. In this case, the PSIB would be used to both acknowledge previous UPS transmissions and, in some cases, to instruct a UE 105 to perform an additional UPS transmission. The additional UPS transmission could be instructed when a previous UPS transmission was received but where additional UPS transmission was needed for additional accuracy or to send additional DL location measurements. In a variant, the subsequent UL transmission might comprise a normal UL message (not a UPS) containing DL location measurements.

In more detail, the PSIB broadcast for a gNB 110-1 could contain one or more of the following for method M5: (i) common configuration parameters for UPOs and UPSs supported by gNB 110-1; (ii) UPS configuration parameters (e.g. bandwidth, code sequence, power level) for contention based UPS transmission and retransmission (e.g. as evaluated for Tables 1 and 2) where collisions may occur; (iii) UE IDs being acknowledged by gNB 110-1 for successful UPS transmissions by UEs in a previous UPO (or UPOs) where additional UPS retransmission is needed from these UEs using dedicated collision-free UPS assignments plus associated UPS parameters for these collision-free UPS assignments; (iv) UE IDs being acknowledged by gNB 110-1 for successful UPS transmissions by UEs for a previous UPO (or UPOs) where additional UPS transmission is needed by these UEs using random contention based UPS selection by the UEs where collisions may occur; and (v) UE IDs being acknowledged by gNB 110-1 for successful UPS transmissions by UEs for a previous UPO (or UPOs) where no further transmission from the UEs is needed.

Common configuration parameters in (i) can include requirements for retransmitting, an assigned UPS bandwidth (BW) for each UE priority level, a maximum number of transmissions and so on. UPS configuration parameters in (ii) for contention based UPS selection by UEs can include UPS signals (e.g. available UPS code sequences and/or frequency shifts) available to UEs for an initial UPS transmission and certain UPS retransmissions—with collisions then possible. UEs being acknowledged in (iii) would be required to retransmit a UPS but would be assigned dedicated orthogonal (and thus collision free) UPS signals for the retransmission. UEs being acknowledged in (iv) would be required to retransmit the UPS but would be required to use the shared UPS signals on a contention basis (with collisions then possible). UEs being acknowledged in (v) would not need to transmit or retransmit. UEs not acknowledged would either retransmit or not according to the common default parameters. For example, low priority UEs might not retransmit whereas higher priority UEs might retransmit one or more times.

The acknowledgments in (iii), (iv) and (v) above could be used also to page UEs for some network service (e.g. DL data delivery) though this would add overhead and may not be part of positioning.

A location estimate for a UE 105 may be determined by an LMF 152, as at stage 12 in FIG. 5, or by a gNB 110-1, as at stage 10 in FIG. 5, from any DL location measurements provided by a UE 105 in UPS data, as at stage 9 in FIG. 5, and any uplink location measurements obtained by a gNB 110-1, as at stage 10 of FIG. 5. Location methods can include GNSS, OTDOA, ECID (e.g. AOA, RTT), WLAN, BT and U-TDOA. In the case of RTT, UE 105 may measure a Receive-Transmit (Rx-Tx) time difference for a selected gNB 110-1, e.g. at stage 9 in FIG. 5, and the gNB 110-1 may measure a similar Rx-Tx difference for UE 105, e.g. at stage 10 in FIG. 5. The RTT may then be obtained by gNB 110-1 (e.g. as the sum of the two Rx-Tx measurements). While a gNB 110-1 could determine the UE 105 location, as at stage 10 in FIG. 5, LMF 152 may typically determine the UE 105 location, as at stage 12 in FIG. 5, since LMF 152 may have more location related information available than gNB 110-1 (e.g. such as base station almanac data for many gNBs 110 that may include the locations and transmission characteristics of the gNBs 110, and data for WLAN APs and GNSSs, etc. which may not be available to a gNB 110-1). LMF 152 may thus be primarily a processing engine which computes the locations of all UEs being positioned in the same timeframe and provides the locations to external clients such as external client 130.

The signaling shown in FIGS. 5 and 6 may minimize signaling overhead by only requiring transmission of one or several UPS signals from UE 105 for each location event detected by UE 105, and only transferring location information and identity related information for target UE 105 to LMF 152 (and not other information) for each location event for UE 105. In a user plane location solution such as SUPL, extensive signaling can be needed for each separate UE 105 location to set up a transport connection between UE 105 and a SUPL SLP such as SLP 148, mutually authenticate the UE 105 and SLP and transfer the location measurements. This may normally occur using the Transmission Control Protocol and IP (TCP/IP) and may further require the assignment of IP signaling bearers by VPLMN 5GC 150 and/or transfer of TCP/IP packets through VPLMN 5GC 150 using NAS control plane transport of TCP/IP. The procedure shown in FIGS. 5 and 6 may therefore be more efficient in terms of VPLMN and UE 105 resources.

A similar comparison may apply to Over The Top (OTT) location of UE 105 by an OTT location server (LS) external to VPLMN 5GC 150 and HPLMN 5GC 140 where TCP/IP or other data transport could need to be established to transfer location measurements from UE 105 to the OTT LS (e.g. via the Internet). In addition, the OTT LS may not normally possess as much information (e.g. base station almanac data) as LMF 152 regarding gNBs 110 in NG-RAN 112 such as gNB 110 timing, location and other information needed for such position methods as OTDOA and ECID. Therefore, OTT LS location may be more resource intensive and less reliable and accurate than location by LMF 152 as exemplified in FIGS. 5 and 6.

A network operator could use these advantages to provide commercial location support for IoT UEs (and other UEs) that is superior in both resource use and accuracy/reliability to other solutions such as SUPL and OTT location. For example, the reduced battery consumption of the techniques described here may more than compensate for any VPLMN or HPLMN billing charges to a user of UE 105 to obtain location support.

System Capacity

A capacity of a system (e.g. communication systems 100) to support uplink high efficiency location may be estimated from a needed UPS data size and an available bandwidth as follows.

Let D=size of UPS data in octets prior to encoding in a UPS

C=average data compression level for encoding of UPS data in bits/Hz over all UEs (e.g. equivalent to the spectral efficiency for UPS transmission)

F=Fraction of UPO bandwidth effectively utilized after allowing for loss due to non-assignment of available bandwidth and collisions M=expected UPS coverage in terms of the number of gNBs expected to measure and decode each UPS transmitted by any UE N=number of participating UEs per gNB T=average time between successive location event reports from each UE in seconds t=time interval between consecutive UPOs in seconds B=total available bandwidth for UPS transmission per UPO in MHz (per frequency band when b>1)

p=duration of each UPO in ms b=number of separate frequency bands (e.g. separate NBs) assigned to each UPO Then $N \leq 1000 p\ b\ C\ F\ T\ B/8D\ M\ t$ (4)

Three examples of the value of N determined using inequality (4) are shown below.

Example 1: D=50, C=0.2, M=5, F=0.25, T=3600, t=1, B=20, b=1, p=5, gives N≤9000

Example 2: D=75, C=0.1, M=10, F=0.25, T=3600, t=1, B=20, b=1, p=5, gives N≤1500

Example 3: D=50, C=0.1, M=5, F=0.25 T=3600, t=5, B=0.2, b=50, p=30, gives N≤67500

Example 1 may support high capacity (a larger number of UEs) but the lower UPS data size, higher data compression and reduced number of gNBs 110 would reduce location accuracy. Example 2 may support lower capacity (fewer UEs) but the higher UPS data size, lower data compression and higher number of gNBs 110 would allow higher location accuracy. Example 3 may support a large number of narrowband IoT UEs. A network could possibly support all 3 examples to enable a large number of normal UEs and IoT UEs with reduced location accuracy and a smaller number of normal UEs with higher location accuracy. UEs could also be transitioned between low and high location accuracy—e.g. dependent on their current location and/or time of day—whenever a UE enters connected state.

Extrapolating to a whole network containing 10,000 gNBs 110 and where subscribed UEs only engage in positioning for 30% of total time, implies that example 1 could support up to 300 million UEs, example 2 could support up to 50 million UEs and example 3 could support up to 2.25 billion UEs. This type of capacity may be higher than would be possible using a traditional CP or UP location solution.

As an example of intermittent location support, some UEs may be configured to activate periodic or triggered location only at certain times. For example, a pet or child monitor may be programmed to track location only during the hours of 9 am to 6 pm on weekdays.

Use of an Uplink Transfer Function (ULTF)

Figure 7:
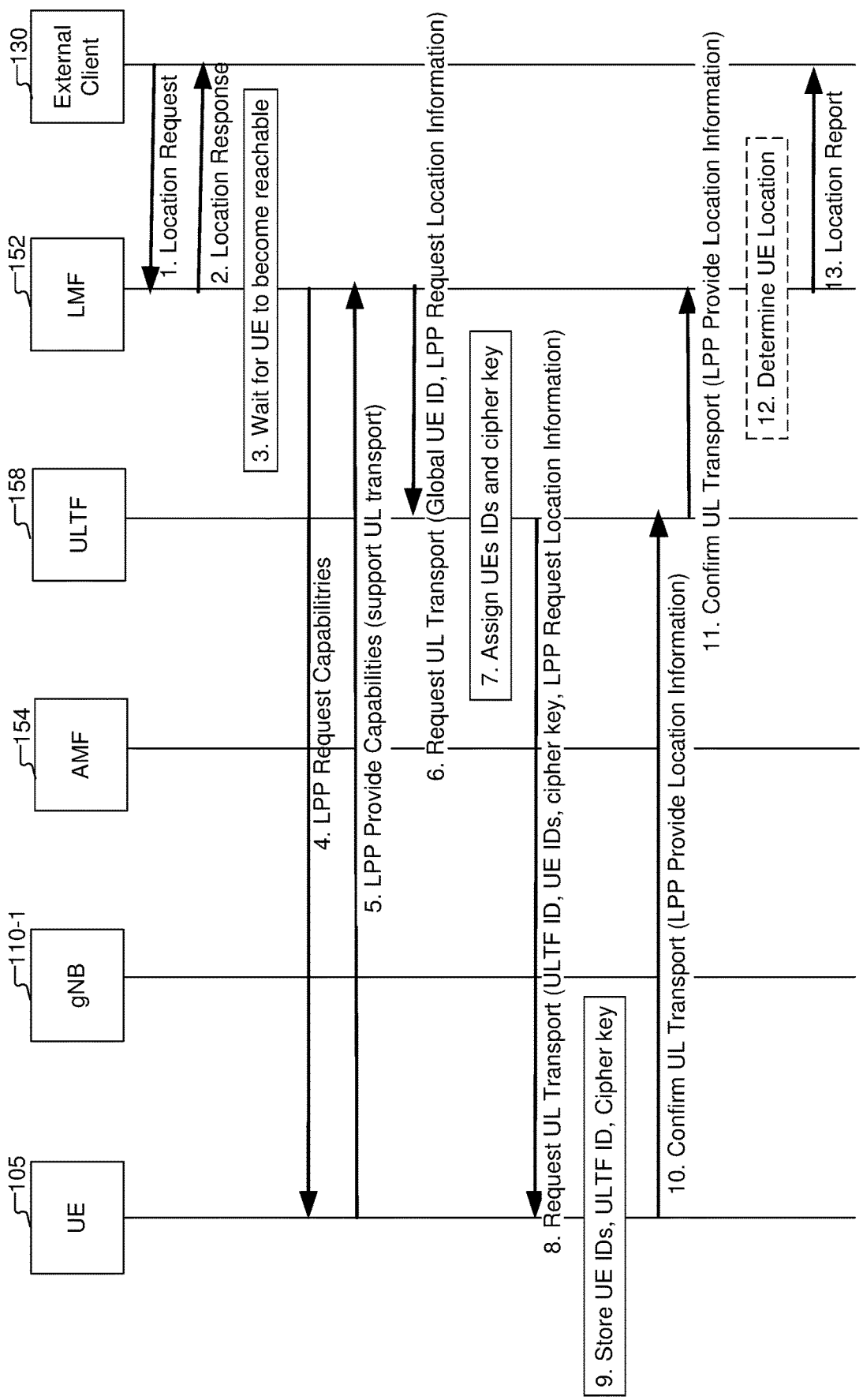
Figure 8:
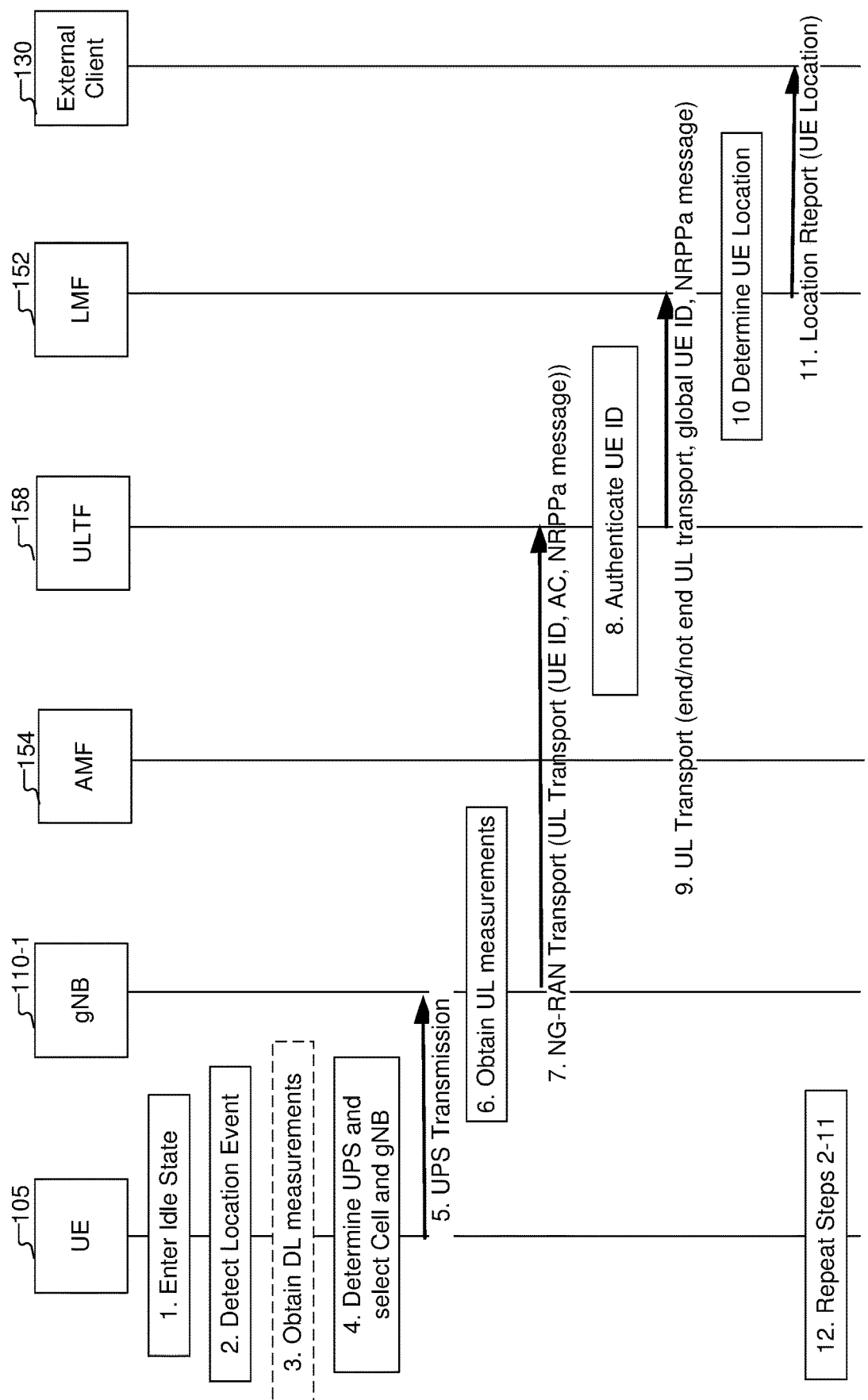
Figure 9:
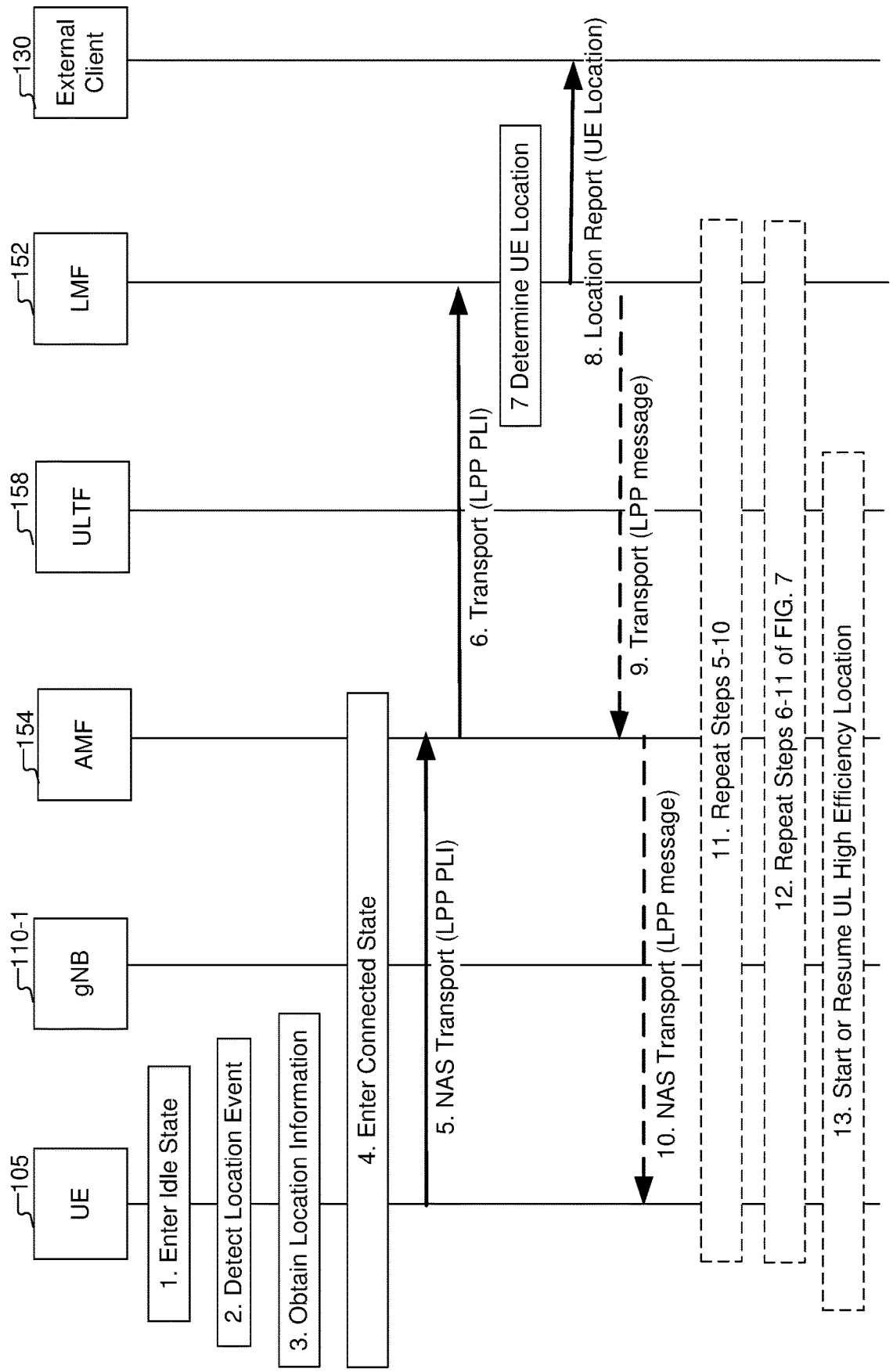

FIGS. 7-9 show signaling flows exemplifying UL high efficiency location that are similar to the signaling flows shown in FIGS. 5 and 6 but in which some of the functions previously performed by LMF 152 are performed by a separate UL Transport Function (ULTF) 158. Allocation of some functions previously performed by LMF 152 to ULTF 158 may enable support of UL transport of information for other applications such as Short Message Service (SMS) transfer or small data transfer. It is noted that while LPP messages are shown as being transferred between UE 105 and LMF 152 in FIGS. 7-9, messages for another DL positioning protocol could be transferred instead or in addition such as an NPP protocol.

FIG. 7 shows a signaling flow for initiation of UL high efficiency location of UE 105 by LMF 152 that is similar to stages 1-6 of FIG. 5 but makes use of ULTF 158 to support some functions previously performed by LMF 152.

At stage 1 in FIG. 7, external client 130 sends a request for periodic or triggered location of target UE 105 to LMF 152 (e.g. via VGMLC 155 and/or HGMLC 145) and may include an indication of a priority and/or a QoS. Stage 1 may correspond to stage 1 in FIG. 5.

At stage 2, LMF 152 confirms acceptance of the request.

At stage 3, LMF 152 waits for target UE 105 to become reachable, e.g., no longer in extended Discontinuous Reception (eDRX) mode or Power Saving Mode (PSM). This may involve being notified of UE 105 reachability by serving AMF 154.

At stage 4, LMF 152 sends an LPP Request Capabilities message to UE 105 via the serving AMF 154 and serving gNB 110-1 to request the positioning capabilities of UE 105.

At stage 5, UE 105 returns an LPP Provide Capabilities message to LMF 152 comprising the positioning capabilities of UE 105. UE 105 may include its capability to support UL high efficiency location (e.g. for transmission of a UPS while UE 105 is in idle state).

At stage 6, based on the indication of support for UL high efficiency location received from UE 105 at stage 5 or based on other knowledge or expectation of support of UL high efficiency location by UE 105, LMF 152 sends a Request UL Transport message to ULTF 158. It is noted that the Request UL Transport message and other messages referred to later for FIGS. 7-9 may be referred to by other names, although the functions ascribed to these messages as described herein may remain the same.

The Request UL Transport message sent at stage 6 may include a global identity of UE 105 (e.g. a Subscription Permanent Identifier (SUPI)), the identity or address of serving AMF 154, an indication of how many location event reports are needed from UE 105 using UPS transmission, an indication of a priority and/or QoS, and an LPP Request Location Information (RLI) message. The LPP RLI message may include a request for periodic or triggered location from UE 105. may indicate the type(s) of periodic or triggered event reporting needed (or may include a codeword for codeword based reporting), and/or may include criteria (referred to herein as "UL high efficiency location criteria") for sending a location event report using a UPS transmission (e.g. as described later for FIG. 8) versus using NAS transport with a signaling connection (e.g. as described later for FIG. 9). As an example, the UL high efficiency location criteria may indicate that UE 105 shall send all location event reports by transmitting UPS signals for UL high efficiency location until the supply of UE IDs provided at stage 8 (as described later) is exhausted, whereupon UE 105 shall send the next location event report(s) using a signaling connection and NAS transport as described later for FIG. 9. As another example, the UL high efficiency location criteria may indicate that UE 105 shall send certain location event reports (e.g. periodic location event reports or event reports triggered according to codeword based reporting) by transmitting UPS signals for UL high efficiency location and shall send certain other location event reports (e.g. triggered location event reports for an area event or UE motion event) using a signaling connection and NAS transport as in FIG. 9. As another example, the UL high efficiency location criteria could indicate a maximum period of time or a maximum number of location event reports for which UE 105 is allowed to send location event reports by transmitting UPS signals for UL high efficiency location and after which UE 105 shall send a location event report to LMF 152 using a signaling connection and NAS transport.

At stage 7, ULTF 158 assigns a set of one or more UE IDs to UE 105 that are unique among all UE IDs currently in use by ULTF 158. The number of UE IDs in the set of one or more UE IDs may be based on (e.g. may be equal to or less than) the number of location event reports needed from UE 105 using UPS transmission for UL high efficiency location that was indicated by LMF 152 at stage 6. ULTF 158 may also determine (e.g. may assign) a ciphering key. ULTF 158 also stores the assigned UE IDs, the ciphering key, the global UE ID and an ID for LMF 152. In an embodiment, each UE ID in the set of one or more UE IDs assigned to UE 105 at stage 7 includes an ID for ULTF 158 (e.g. using additional bits at the beginning or end of each UE ID).

At stage 8, ULTF 158 sends a Request UL Transport message to UE 105 (e.g. via the serving AMF 154 and serving gNB 110-1) to request use of UL high efficiency location by UE 105 via UPS transmission by UE 105 (as described later for FIG. 8). The Request UL Transport message may include an ULTF ID for ULTF 158 (e.g. if not part of each UE ID), the set of one or more UE IDs, an indication of the ciphering key determined at stage 7, an indication of a priority and/or QoS (e.g. if received at stage 6), an indication or identity of LMF 152 (e.g. which may be needed by UE 105 to perform the procedure in FIG. 9), and the LPP RLI received at stage 6.

At stage 9, UE 105 verifies that UE 105 can support the request for periodic or triggered location contained in the LPP RLI received at stage 8 by transmitting UPS signals for UL high efficiency location. If so, UE 105 stores the ULTF ID, the set of UE IDs and the indication of the ciphering key received at stage 8. In some embodiments, UE 105 may store the ciphering key rather than the indication of the ciphering key at stage 9—e.g. if UE 105 determines the ciphering key at stage 9 based on the indication of the ciphering key.

At stage 10, and in response to the Request UL Transport message received at stage 8, UE 105 returns a Confirm UL Transport message to ULTF 158 (e.g. via the serving gNB 110-1 and serving AMF 154) to confirm that UE 105 can support the request for UL high efficiency location received at stage 8. The message may include an LPP Provide Location Information (PLI) message which may include a confirmation that UE 105 can support the triggered or periodic location requested in the LPP RLI message received at stage 8. The LPP PLI may include location information obtained by UE 105 at the current time (e.g. measurements of RSTD, Rx-Tx, GNSS pseudoranges, WLAN APs or a location estimate).

At stage 11, ULTF 158 sends an Confirm UL Transport message to LMF 152 to confirm that the request for UL high efficiency location received from LMF 152 at stage 6 can be supported. The message includes the LPP PLI message received at stage 10.

At stage 12, LMF 152 may determine a location estimate for UE 105 if the LPP PLI received at stage 11 includes location information.

At stage 13, LMF 152 sends a location report to external client 130 (e.g. via VGMLC 155 and/or HGMLC 145) to confirm that triggered or periodic location is now activated in UE 105.

FIG. 8 shows a signaling flow exemplifying how UE 105 may return periodic or triggered location event reports by transmitting UPS signals for UL high efficiency location after this has been requested from and confirmed by UE 105 as described previously for FIG. 7.

Stage 1 of FIG. 8 may occur sometime after stage 10 of FIG. 7 (e.g. a few seconds or a few minutes afterwards). At stage 1, UE 105 enters an idle state in which there is no signaling connection from UE 105 to either NG-RAN 112 or VPLMN 5GC 150.

At stage 2, and while in idle state, UE 105 monitors for the occurrence of a periodic or triggered event associated with location reporting as requested in the LPP RLI received at stage 8 in FIG. 7. When UE 105 detects a periodic or triggered location event at stage 2, UE 105 proceeds to stage 3.

At stage 3, UE 105 optionally obtains DL location measurements (e.g. if requested at stage 8 of FIG. 7 and as described for stage 9 of FIG. 5 and stage 4 of FIG. 6.).

At stage 4, UE 105 determines to transmit a UPS signal for UL high efficiency transport as opposed to providing location information using a signaling connection and NAS transport. For example, the determination to use UL high efficiency location may be based on the UL high efficiency location criteria received at stage 8 in FIG. 7. UE 105 then selects a nearby cell and gNB 110 for NG-RAN 112 (e.g. a cell for NG-RAN 112 with highest signal strength at the location of UE 105), which in this example is gNB 110-1.

At stage 5, UE 105 transmits a UPS to gNB 110-1. The transmission may be as described for FIG. 6 and may be supported using any of the methods M1-M5 described previously in association with FIG. 6, e.g. to determine a UPO for the UPS transmission and to determine UPS parameters. The UPS transmitted at stage 5 may contain (e.g. may encode) UPS data as described for FIG. 4. Thus, for example, the UPS data may include the ULTF ID if received at stage 8 in FIG. 7 (e.g. if not part of a UE ID), one of the UE IDs received by UE 105 at stage 8 in FIG. 7, authentication information which may comprise an authentication code (AC) which may be an octet string or bit string, any DL location measurements obtained at stage 3, an indication of a priority and/or QoS (e.g. if received at stage 8 of FIG. 7), a preamble, an FEC/CRC and/or a more data indication. The ULTF ID may correspond to the NE ID 406 described for FIG. 4 and the other contents of the UPS data may correspond to like named parameters for the UPS data 400 described for FIG. 4. The UPS data may also include an indication of the location event detected by UE 105 at stage 2. UE 105 may cipher part of the UPS data (e.g. any DL location measurements) using the ciphering key indicated at stage 8 in FIG. 7 and may include an indication of ciphering in the UPS data. Optionally, UE 105 may transmit more than one UPS at stage 5 (not shown in FIG. 8) if required or allowed by any of methods M1-M5 used at stage 5 (e.g. such as for a retransmission of the UPS when a collision occurs for a previous UPS transmission) or if required to send more DL location measurements.

At stage 6, gNB 110-1 optionally obtains one or more UL location measurements for the UPS transmitted at stage 5—e.g. measurements of RTT, Rx-Tx, RSSI, TOA and/or AOA. Minimally, gNB 110-1 records the cell associated with the UPS transmission at stage 5 or simply records its own identity which may provide minimum location information for UE 105. Optionally, one or more other gNBs 110 nearby to UE 105 also obtain UL location measurements for the UPS transmitted by UE 105 at stage 5 (not shown in FIG. 8). Optionally, these other gNBs 110 may send any obtained UL location measurements to gNB 110-1 (not shown in FIG. 8). GNB 110-1 also decodes any UPS data contained in the UPS signal. Optionally, gNB 110-1 may compute a location for UE 105 at stage 6 using any DL location measurements received in the UPS transmitted by UE at stage 5 (e.g. if the DL location measurements are not ciphered by UE 105), any UL location measurements obtained by gNB 110-1 at stage 6 and/or any UL location measurements for the UPS transmitted by UE 105 at stage 5 that are received from other gNBs 110 at stage 6.

At stage 7, gNB 110-1 sends an NG-RAN Transport message to ULTF 158 containing an UL Transport message. The UL Transport message includes information from the UPS data received at stage 5 (e.g. DL location measurements obtained by UE 105 at stage 3, the UE ID, the AC, and/or an indication of a priority and/or QoS), any UL location measurements obtained by gNB 110-1 at stage 6 (and/or received from other gNBs 110 at stage 6) and/or any location estimate for UE 105 computed by gNB 110-1 at stage 6. In an aspect, all of the location related information for UE 105 (e.g. the DL location measurements, the UL location measurements and/or the location estimate) may be included by gNB 110-1 in an NRPPa message which may be included as part of the NG-RAN Transport message, and/or as part of the UL Transport message, sent to ULTF 158 at stage 7. GNB 110-1 may identify ULTF 158 from the ULTF ID or UE ID (e.g. if the UE ID includes the ULTF ID) received as part of the UPS data at stage 6. GNB 110-1 may send the NG-RAN Transport message to ULTF 158 either directly if gNB 110-1 can access ULTF 158 directly (e.g. via an operator IP intranet) or via an AMF such as AMF 154. If more than one UPS signal was received from UE 105 at stage 6 that is not part of retransmission (e.g. when UE 105 includes a more data indication in a previous UPS transmission), gNB 110-1 may combine the UPS data from the different UPS transmissions and may send some or all of the combined data to ULTF 158 at stage 6 in the NG-RAN Transport message and/or the UL Transport message.

GNB 110-1 may send the NG-RAN Transport message to ULTF 158 with reduced delay at stage 7 if a high priority or QoS with low maximum delay was indicated at stage 5. Alternatively, in order to reduce a number of separate signaling messages, gNB 110-1 may send data for two or more UEs to ULTF 158 using the same NG-RAN Transport message (e.g. if not disallowed by any priority and/or QoS indication received at stage 5). When other gNBs 110 obtain UL location measurements at stage 6 for the UPS transmission from UE 105, each of the other gNBs 110 may send an NG-RAN Transport message to ULTF 158 containing an UL Transport message containing some or all of the information from the UPS data in the UPS transmission (e.g. DL location measurements obtained by UE 105 at stage 3, the UE ID and the AC) and any UL location measurements obtained by the gNB 110 at stage 6. In order to reduce signaling, each of the other gNBs 110 may send an NG-RAN Transport message to ULTF 158 containing an UL Transport message which contains only the UE ID, AC and any UL location measurements obtained by the gNB 110 (e.g. and which may exclude any DL location measurements obtained by UE 105 at stage 3 since the DL location measurements can be sent by gNB 110-1 at stage 7 and do not need to be sent by other gNBs 110).

At stage 8, ULTF 158 may process each UL Transport message received in an NG-RAN Transport message at stage 7 as follows. First, ULTF 158 may process each UL Transport message based on an included indication of priority and/or QoS. For example, a first UL Transport message with a higher priority or lower QoS maximum delay may be processed by ULTF 158 before a second UL Transport message with a lower priority or higher QoS maximum delay even when the second UL Transport message was received before the first UL Transport message by ULTF 158. As one example, ULTF 158 could maintain a prioritized queuing system in which an UL Transport message received at stage 7 enters a particular queue associated with a priority and/or QoS value for the UL Transport message and with ULTF 158 processing all messages in higher priority queues before processing messages in lower priority queues. When performing processing, ULTF 158 may identify the UE, which originally transmitted the UPS for which information is included in the UL Transport message, using the included UE ID. In this example, the UPS would have been transmitted by UE 105 at stage 5 and ULTF 158 may identify UE 105 (e.g. may obtain the global ID for UE 105) by verifying that the received UE ID was previously assigned by ULTF 158 to UE 105 at stage 7 in FIG. 7. ULTF 158 may next use the ciphering key determined for UE 105 at stage 7 in FIG. 7 to verify the included AC which may authenticate the received UE ID. At the same time (e.g. if part of authentication) or subsequently, ULTF 158 may decipher any DL location measurements included in the UL Transport message (e.g. included in an NRPPa message contained in the UL Transport message) if this is ciphered (e.g. if the UL Transport message or NRPPa message includes an indication of ciphering). ULTF 158 may also verify at stage 8 that an indication of priority and/or QoS included in the UL Transport message received at stage 7 matches an indication of priority and/or QoS received from LMF 152 at stage 6 in FIG. 7—e.g. in order to verify that UE 105 is using the correct priority and/or QoS. ULTF 158 may also determine LMF 152 (e.g. from information stored by ULTF 158 at stage 7 in FIG. 7).

At stage 9, ULTF 158 sends an UL Transport message to LMF 152 containing the location related information for UE 105 that was received at stage 8 (e.g. an NRPPa message, UL location measurements, DL location measurements and/or a location estimate), the global ID for UE 105 determined at stage 8, an indication of priority and/or QoS (e.g. if received at stage 7), and an indication of whether UL high efficiency location has now ended due to use by UE 105 of all the UE IDs originally assigned to UE 105 at stage 7 in FIG. 7. When ULTF 158 receives multiple UL Transport messages for UE 105 at stage 8 from gNB 110-1 and one or more other gNBs 110, ULTF 158 may send the multiple UL Transport messages to LMF 152 at stage 9 in the order received and without attempting to combine the UL Transport messages (e.g. as long as each UL Transport message indicates the same priority or QoS) and/or with a sequence number in each UL Transport message to indicate its sequential order to LMF 152.

At stage 10, LMF 152 determines or verifies a location estimate for UE 105 based on the location related information contained in the UL Transport message received at stage 9. When gNB 110-1 and one or more other gNBs 110 have, or may have, sent UL Transport messages to ULTF 158 at stage 7 containing location related information for UE 105, LMF 152 may first wait for a short period (e.g. 5 to 10 seconds) after receiving the first UL Transport message for UE 105 at stage 9 to determine whether additional UL Transport messages for UE 105 will be received at stage 9. When additional UL Transport messages are received for UE 105 at stage 9, LMF 152 may combine all of the location related information received in these UL Transport messages for UE 105 as part of stage 10 in order to determine a location estimate for UE 105. LMF may also determine the location event (e.g. a periodic or triggered event or a codeword based reporting event) being reported by UE 105 based on the information in one or more of the received UL Transport messages. For example, in the case of codeword based reporting, UE 105 may include a codeword (e.g. different to the codeword sent to UE 105) in the UPS transmission at stage 5 indicating the event being reported, which may be passed on by LMF 152 without interpretation to external client 130 at stage 11. LMF 152 may also prioritize location determination for different UEs based on an indication of priority and/or QoS, e.g. if received at stage 9. For example, and as described for ULTF 158 at stage 8 (e.g. using a prioritized queuing system), LMF 152 may perform stage 10 for a first UL Transport message with a higher priority or a QoS with lower maximum delay before performing stage 10 for a second UL Transport message with a lower priority or a QoS with higher maximum delay, even when the second UL Transport message was received before the first UL Transport message by LMF 152.

At stage 11, LMF 152 sends a location report to external client 130 (e.g. via VGMLC 155 and/or GMLC 145) containing the location estimate and an indication of the location event being reported for UE 105, as determined or obtained by LMF 152 at stage 10.

At stage 12, UE 105 may continue to monitor for and to detect and report events as at stages 2-11 in FIG. 8 until: (i) all the UE IDs received at stage 8 in FIG. 7 are exhausted; (ii) the UL high efficiency transport criteria received at stage 8 in FIG. 7 indicate use of signaling as in FIG. 9 and not as in FIG. 8; or (iii) UE 105 receives further instructions from LMF 152 (e.g. as described later for FIG. 9) or from ULTF 158 to cease or modify the location reporting.

FIG. 9 shows a signaling flow exemplifying how UE 105 may return a periodic or triggered location event report after periodic or triggered location has been instigated in UE 105 according to the signaling flow described previously for FIG. 7. The stages shown in FIG. 9 may occur after all of the UE IDs assigned by ULTF 158 for UL high efficiency location at stage 7 in FIG. 7 have been exhausted by UE 105 in transmitting UPS signals for UL high efficiency location as described previously for FIG. 8. The stages shown in FIG. 9 may also or instead occur when any UL high efficiency location criteria included by LMF 152 in the LPP PLI sent at stage 6 in FIG. 7 indicate that a particular type of location event detected by UE 105 shall be reported using a signaling connection and NAS transport. The stages shown in FIG. 9 may also occur when UE 105 needs to send a location event report and is already in a connected state for other reasons. The significance of sending a location event report using a signaling connection and NAS transport, as in FIG. 9, may be that it can enable LMF 152 to send a response to UE 105—e.g. to modify or cancel the triggered or periodic location request sent earlier at stage 8 of FIG. 7 or to provide assistance data to UE 105 to enable continued location event reporting. In addition or instead, LMF 152 may use the reachability of UE 105 enabled by the signaling in FIG. 9 to restart UL high efficiency location from UE 105 for future location event reports (e.g. if UL high efficiency location from UE 105 has ended due to exhaustion of all UE IDs assigned by ULTF 158 to UE 105 at stage 7 in FIG. 7). LMF 152 signaling access to UE 105 to support these functions may not be possible when UE 105 uses UL high efficiency location as in FIG. 8 to send a location event report because UE 105 may not be reachable from LMF 152 during and after this transfer.

Stage 1 of FIG. 9 may occur sometime after stage 10 of FIG. 7 (e.g. a few seconds or few minutes afterwards). At stage 1, UE 105 enters an idle state in which there is no signaling connection to NG-RAN 112 or VPLMN 5GC 150.

Stage 1 may also occur as stage 1 of FIG. 8 and may not occur as part of the signaling flow for FIG. 9.

At stage 2, while in idle state, UE 105 monitors for the occurrence of a periodic or triggered location event associated with location reporting as requested in the LPP RLI received at stage 8 in FIG. 7. When UE 105 detects a periodic or triggered location event at stage 2, UE 105 proceeds to stage 3.

At stage 3, UE 105 obtains location information (e.g. if requested at stage 8 of FIG. 7 and as described for stage 9 of FIG. 5 and stage 4 of FIG. 6).

At stage 4, UE 105 determines to send any location information obtained at stage 3, and to report the location event, using a signaling connection and NAS transport as opposed to transmitting a UPS signal for UL high efficiency location. For example, the determination to use a signaling connection and NAS transport may be based on the UL high efficiency location criteria received at stage 8 in FIG. 7. Alternatively, the determination to use a signaling connection and NAS transport may be based on exhaustion by UE 105 of all the UE IDs assigned by ULTF 158 for UL high efficiency location at stage 7 in FIG. 7 due to sending location events reports by transmitting a UPS signal for UL high efficiency location as shown in FIG. 8. In some embodiments, the determination to use a signaling connection and NAS transport may be based at least in part on the location information obtained at stage 3. For example, the UL high efficiency location criteria received at stage 8 in FIG. 7 may indicate certain locations (e.g. a certain geographic area) within which or outside of which UE 105 is required to send a location event report using a signaling connection and NAS transport. In addition, the determination to use a signaling connection and NAS transport may be based on UE 105 already being in a connected state for other reasons, in which case UE 105 may skip the rest of stage 4.

Based on the determination to use a signaling connection and NAS transport at stage 4 and assuming that UE 105 is not already in a connected state, UE 105 determines a suitable serving cell and associated serving gNB, which in this example is gNB 110-1 (though could be any other gNB 110), and requests and obtains a signaling connection to gNB 110-1 and an AMF (which in this example is AMF 154 though could be any other AMF in VPLMN 5GC 150). The procedure to request and obtain the signaling connection may be a procedure defined in 3GPP TS 23.502. As a result of obtaining the signaling connection at stage 4, UE 105 enters a connected state.

At stage 5, UE 105 uses the signaling connection obtained at stage 4 (or obtained prior to stage 4) to send a NAS transport message containing an LPP PLI message to serving AMF 154 via the serving gNB 110-1. The NAS transport message may include the identity of LMF 152 (e.g. as part of a routing ID parameter) and as obtained at stage 8 in FIG. 7. The LPP PLI message may include any location information obtained at stage 3 and an indication of the location event detected by UE 105 at stage 2.

At stage 6, AMF 154 forwards the LPP PLI message received at stage 5 to LMF 152 due to an indication of LMF 152 in the NAS transport message received at stage 5. The LPP PLI may be transported to LMF 152 using some lower layer transport protocol.

At stage 7, LMF 152 determines or verifies a location estimate for UE 105 based on any location information contained in the LPP PLI received at stage 6. LMF 152 may also determine or obtain the location event (e.g. a periodic or triggered event or a codeword based reporting event) being reported by UE 105 based on the received LPP PLI message.

At stage 8, LMF 152 sends a location report to external client 130 (e.g. via VGMLC 155 and/or GMLC 145) containing the location estimate and an indication of the location event for UE 105 determined or obtained by LMF 152 at stage 7.

At stage 9, if LMF 152 has location related information to send to UE 105, LMF 152 may send an LPP message to AMF 154 for forwarding to UE 105. For example, the location related information may include or comprise a request to modify or abort the periodic or triggered location session instigated at stages 6 and 8 in FIG. 7. Alternatively, the location related information may comprise assistance data to assist UE 105 to continue location event reporting and/or may comprise a request for more location information from UE 105. The LPP message sent at stage 9 may be an LPP RLI message to modify the periodic or triggered location session or to request more location information from UE 105, or may be an LPP Abort message to abort the periodic or triggered location session.

At stage 10, AMF 154 forwards the LPP message received at stage 9 to UE 105 via serving gNB 110-1 in a NAS transport message.

At stage 11, stages 5 and 6 and possibly stages 7 and 8 may be repeated by UE 105 to send additional LPP messages to LMF 152 (e.g. additional LPP PLI messages) and/or stages 9 and 10 may be repeated by LMF 152 to send additional LPP messages to UE 105.

At stage 12, if LMF 152 is aware that UL high efficiency location will no longer be used by UE 105 (e.g. due to receiving an indication from ULTF 158 at stage 9 of FIG. 8 that UL high efficiency location for UE 105 has ended), LMF 152 may request additional location event reports from UE 105 using UL high efficiency location by repeating stages 6-11 of FIG. 7. In this repetition, LMF 152 may include an LPP RLI message in the repetition of stages 6 and 8 of FIG. 7 or may include another LPP message (e.g. an LPP Provide Assistance Data) or may not include any LPP message. The repetition of stages 6-11 in FIG. 7 may provide a new set of UE IDs to UE 105 from ULTF 158 which may enable UE 105 to resume transmitting UPS signals for UL high efficiency location as described for FIG. 8.

At stage 13, if stage 12 has occurred or if UE 105 performed the procedure in FIG. 9 due to the UL high efficiency transport criteria received at stage 8 in FIG. 7, UE 105 may start or resume sending future location events reports using UL high efficiency location as described for FIG. 8.

Process Flows

Figure 10:
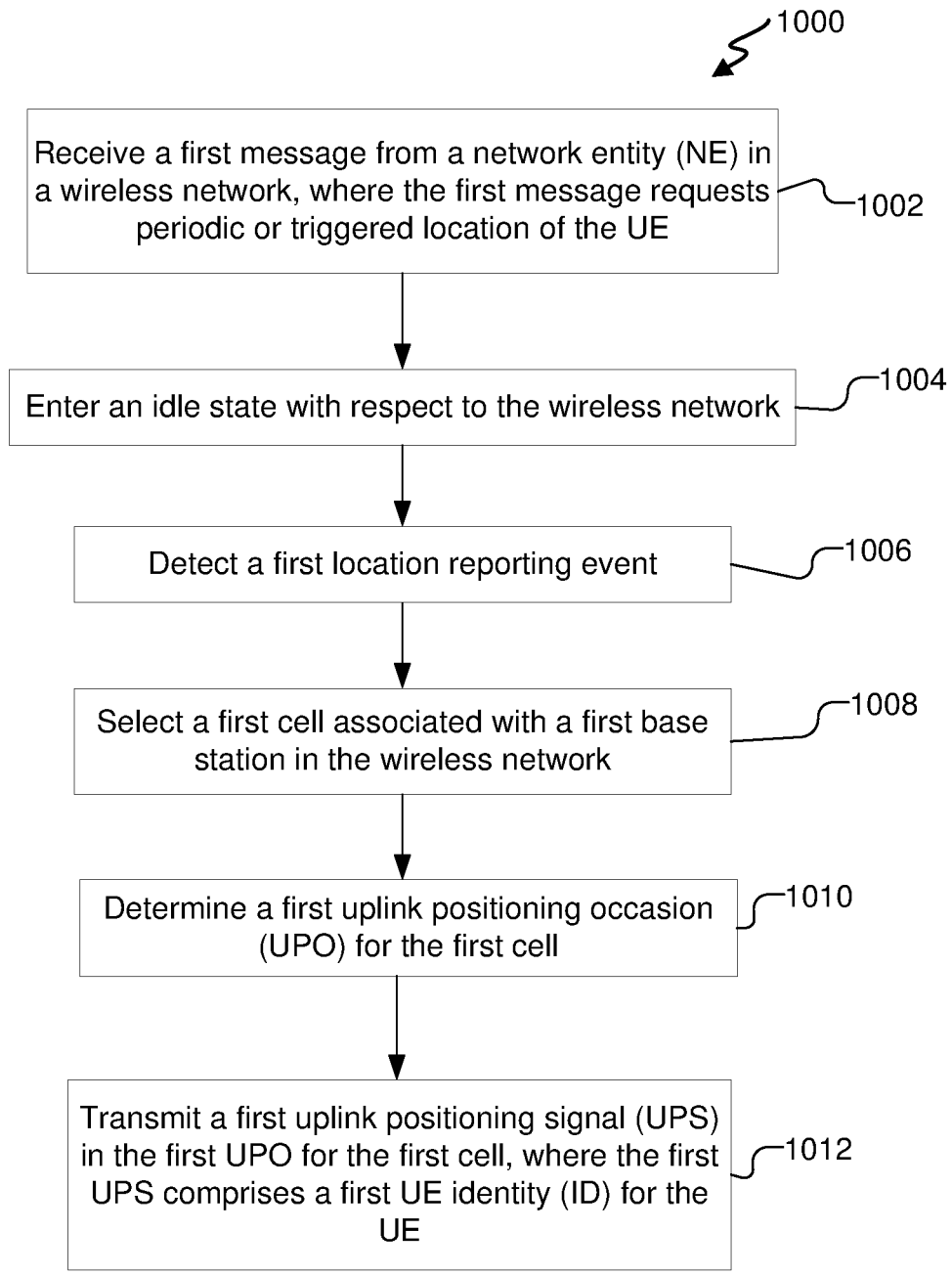
FIG. 10 is a process flow illustrating a method performed by a UE for UL high efficiency location for a 5G network.

FIG. 10 is a process flow 1000 illustrating a method performed by a UE (e.g. UE 105) for supporting location according to the techniques described herein. The UE may start process flow 1000 at block 1002 by receiving a first message from a network entity (NE) in a wireless network, where the first message requests periodic or triggered location of the UE. For example, block 1002 may correspond to stage 4 in FIG. 5 or stage 8 in FIG. 7.

In an aspect, the NE comprises a base station. The base station may be a New Radio (NR) NodeB (gNB) (e.g. a gNB 110) or a next generation evolved NodeB (ng-eNB) and the first message may be a message for a Radio Resource Control (RRC) protocol.

In another aspect, the NE comprises an Access and Mobility Management Function (AMF) (e.g., AMF 154) and the first message may be a message for a Non-Access Stratum (NAS) protocol or a Supplementary Services (SS) protocol.

In another aspect, the NE comprises a location server. The location server may be a Location Management Function (LMF) (e.g. LMF 152) and the first message may be a message for a Long Term Evolution Positioning Protocol (LPP) or a New Radio Positioning Protocol (NPP).

In another aspect, the NE comprises an Uplink Transport Function (ULTF) (e.g. ULTF 158).

At block 1004, the UE enters an idle state with respect to the wireless network. For example, block 1004 may correspond to stage 7 in FIG. 5 or stage 1 in FIG. 8.

At block 1006, the UE detects a first location reporting event. For example, block 1006 may correspond to stage 8 in FIG. 5 or stage 2 in FIG. 8.

At block 1008, the UE selects a first cell associated with a first base station in the wireless network. In an aspect, the first base station is a New Radio (NR) NodeB (gNB) (e.g. a gNB 110 such as gNB 110-1) or a next generation evolved NodeB (ng-eNB). For example, block 1008 may correspond to part of stage 2 in FIG. 6 or part of stage 4 in FIG. 8.

At block 1010, the UE determines a first uplink positioning occasion (UPO) for the first cell. In an aspect, information for a plurality of UPOs is broadcast by the first base station in the first cell and the UE determines the first UPO as a UPO from the plurality of UPOs. In a further aspect, the information for the plurality of UPOs is broadcast by the first base station in a System Information Block (SIB) in the first cell. For example, block 1010 may correspond to stage 3 or stage 10 in FIG. 6 or part of stage 5 in FIG. 8.

At block 1012, the UE transmits a first uplink positioning signal (UPS) in the first UPO for the first cell, where the first UPS comprises a first UE identity (ID) for the UE. For example, block 1012 may correspond to stage 5, 6 or 10 in FIG. 6 or stage 5 in FIG. 8.

In some embodiments, the process flow 1000 may comprise additional actions. For example, in a first embodiment, the first UPS comprises UPS parameters, where the UPS parameters comprise at least one of a transmission power, bandwidth, carrier frequency, frequency shift, duration, number of consecutive subframes, frequency hopping sequence, code sequence, encoding type for UPS data or some combination of these. In this first embodiment, the UE may obtain a measurement of a signal strength, signal power or signal quality for the first cell and may determine at least one of the transmission power and the encoding type for UPS data based at least in part on the measurement. In this first embodiment, the UE may receive information for a plurality of orthogonal UPSs, where the information may be broadcast in a System Information Block (SIB) by the first base station in the first cell, and may determine the UPS parameters based at least in part on the information, where the first UPS comprises an orthogonal UPS in the plurality of orthogonal UPSs. In this first embodiment, the first UE ID may comprise the frequency shift or code sequence or both the frequency shift and code sequence. For example, the frequency shift and/or code sequence for the first UPS may be assigned to the UE by the NE in the first message or may be provided by the first base station to the UE and may be different to a frequency shift and/or code sequence used by any other UE to transmit a UPS in the same local area (e.g. in the same cell) as the UE.

In a first aspect of the first embodiment described above (e.g. as described for method M3 above), the UE transmits a request for the first UPS to the first base station on a Random Access Channel (RACH) for the first cell (e.g. as at stage 7 in FIG. 6), and receives a response from the first base station, where the response comprises the UPS parameters and an indication of the first UPO (e.g. as at stage 9 in FIG. 6), where the determination of the first UPO is based on the indication. In this first aspect, the response may be received in a System Information Block (SIB) broadcast by the first base station in the first cell.

In a second aspect of the first embodiment described above, the UE determines first UPS data, where the first UPS data comprises at least one of the first UE ID, an ID for the NE, an indication of a priority, an indication of a Quality of Service (QoS), a preamble, a cyclic redundancy check (CRC), forward error correction (FEC) bits, or some combination of these, The UE then encodes the first UPS data within the first UPS transmitted in the first UPO for the first cell, where the encoding is based on the encoding type. In this second aspect, the first message may comprise at least one of the indication of the priority or the indication of the QoS. In this second aspect, the UE may obtain downlink (DL) location measurements (e.g. as at stage 4 in FIG. 6), where the first UPS data further comprises at least a first portion of the DL location measurements. The DL location measurements may comprise at least one of an ID for the first cell, a Reference Signal Time Difference (RSTD), an Receive-Transmit (Rx-Tx) time difference, an Angle of Arrival (AOA), a Round Trip signal propagation Time (RTT), an Angle of Departure (AOD), a Received Signal Strength Indication (RSSI), a Reference Signal Received Power (RSRP), a Reference Signal Received Quality (RSRQ), a pseudorange for a Global Navigation Satellite System (GNSS), a code phase for a GNSS, a carrier phase for a GNSS, or a measurement for a wireless local area network (WLAN) access point, or some combination of these. The UE may also receive assistance data for the DL location measurements (e.g. to assist the UE to obtain the DL location measurements), where the assistance data is broadcast from a base station (e.g. a gNB 110) in the wireless network, and where the base station may be the first base station. The UE may determine an authentication code (AC) for the first UE ID, where the first UPS data further comprises the AC. The first message may comprise an indication of a ciphering key and the UE may determine the AC based at least in part on the first UE ID and the ciphering key. The UE may further cipher the DL location measurements or the first portion of the DL downlink location measurements based on the ciphering key. The first UPS data may further comprise a more data indication and the UE may then: (i) determine second UPS data, where the second UPS data comprises a second portion of the DL location measurements, and where the second portion of the DL location measurements is different from the first portion of the DL location measurements (e.g. where the second portion comprises DL location measurements that could not be included in the first UPS data); (ii) determine a second UPO for the first cell; and (iii) transmit a second UPS in the second UPO for the first cell, where the second UPS data is encoded within the second UPS.

In another embodiment (e.g. as applicable to methods M4 and M5 described above), the UE receives a System Information Block (SIB) broadcast by the first base station in the first cell, determines whether the SIB includes or excludes an acknowledgment for the first UPS, and retransmits the first UPS in a second UPO for the first cell based on the inclusion or exclusion of the acknowledgment.

In another embodiment, the first message comprises a first plurality of one or more UE IDs, where the first UE ID is a UE ID from the first plurality of UE IDs. In this embodiment, the UE may detect a second location reporting event, select a second cell associated with a second base station for the wireless network, determine a second UPO for the second cell, and transmit a second UPS in the second UPO for the second cell, where the second UPS comprises a second UE ID for the UE, where the second UE ID is a UE ID from the first plurality of UE IDs, and where the second UE ID is different to the first UE ID. In this embodiment, the UE may further receive a second plurality of UE IDs from the NE after all UE IDs in the first plurality of UE IDs have been included by the UE in UPS transmissions according to block 1012.

Figure 11:
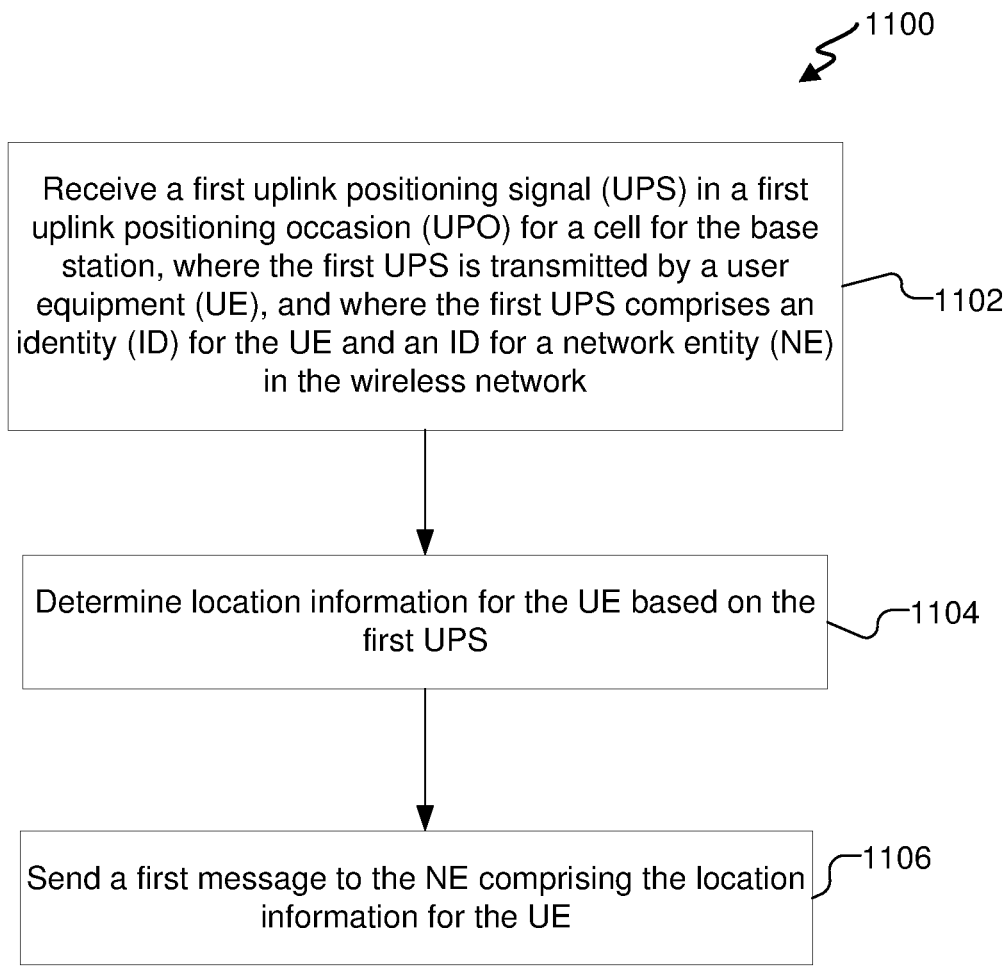
FIG. 11 is a process flow illustrating a method performed by a base station for UL high efficiency location for a 5G network.

FIG. 11 is a process flow 1100 illustrating a method performed by a base station in a wireless network for support of UL high efficiency location. The wireless network may be a Fifth Generation (5G) or New Radio (NR) wireless network such as NG-RAN 112 and VPLMN 5GC 150 in FIG. 1. The base station may be a New Radio (NR) NodeB (gNB) such as gNB 110-1 in FIG. 1 or a Next Generation evolved NodeB (ng-eNB) such as an ng-eNB in NG-RAN 112 in FIG. 1.

The base station may start process flow 1100 at block 1102 by receiving a first uplink positioning signal (UPS) in a first uplink positioning occasion (UPO) for a cell for the base station, where the first UPS is transmitted by a UE (e.g. UE 105), and where the first UPS comprises an identity (ID) for the UE and an ID for a network entity (NE) in the wireless network. The NE may comprise a base station (e.g. an ng-eNB or a gNB 110) or a ULTF (e.g. ULTF 158). The NE may instead comprise an AMF (e.g. AMF 154), and the first message may then be a message for a Next Generation Access Protocol (NG-AP). The NE may also comprise a location server, where the location server may comprise an LMF (e.g., LMF 152) and the first message may then be a message for a New Radio Positioning Protocol A (NRPPa). For example, block 1102 may correspond to part of stage 5, 6 or 10 in FIG. 6 or stage 5 in FIG. 8.

At block 1104, the base station determines location information for the UE based on the first UPS. In an aspect, the location information is based on an identity for the cell or an identity for the base station (e.g. is associated with cell ID location of the UE). For example, block 1104 may correspond to stage 10 in FIG. 5 or stage 6 in FIG. 8.

At block 1106, the base station sends a first message to the NE comprising the location information for the UE. For example, block 1106 may correspond to stage 11 in FIG. 5 or stage 7 in FIG. 8.

In further aspects, the process flow 1100 may include additional actions. For example, in a first aspect, the base station may obtain at least one uplink (UL) location measurement for the UE based on the first UPS (e.g. as at stage 10 in FIG. 5 or stage 6 in FIG. 8), where the location information determined at block 1104 is based at least in part on the at least one UL location measurement. The at least one UL location measurement may comprise an UL Time of Arrival (TOA), an UL Receive-Transmit (Rx-Tx) time difference, a Received Signal Strength Indication (RRSI), a Reference Signal Received Power (RSRP), a Reference Signal Received Quality (RSRQ), or an angle of arrival (AOA). The base station may determine a location estimate for the UE (e.g. as at stage 10 in FIG. 5), where the location estimate is based at least in part on the at least one UL location measurement, and where the location information determined for the UE at block 1104 comprises the location estimate.

In a second aspect, the base station broadcasts information for a plurality of UPOs in the cell, where the first UPO is a UPO from the plurality of UPOs (e.g. selected by the UE from the plurality of UPOs). The information for the plurality of UPOs may be broadcast by the base station in a System Information Block (SIB) in the cell (e.g. a PSIB).

In a third aspect, the first UPS comprises UPS parameters, where the UPS parameters comprise at least one of a transmission power, bandwidth, carrier frequency, frequency shift, duration, number of consecutive subframes, frequency hopping sequence, code sequence, or encoding type for UPS data, or some combination of these. In this aspect, the transmission power and/or the encoding type may be based at least in part on a measurement by the UE of a signal strength, signal power or signal quality for the cell. In this aspect, the base station may broadcast information in a System Information Block (SIB) (e.g. a PSIB) for a plurality of orthogonal UPSs, where the first UPS is an orthogonal UPS in the plurality of orthogonal UPSs (e.g. randomly selected by the UE from the plurality of orthogonal UPSs). In this aspect (e.g. as described above for methods M4 and M5), the base station may broadcast a System Information Block (SIB) in the first cell, where the SIB comprises an acknowledgment for the first UPS received at block 1102, where the acknowledgment comprises the UE ID. The acknowledgment may further comprise a request for a retransmission of the first UPS by the UE or a request for a transmission of a second UPS by the UE, and the base station may then receive the retransmission of the first UPS or the transmission of a second UPS from the UE, where the location information determined at block 1104 is further based at least in part on the retransmission of the first UPS or the transmission of the second UPS. The acknowledgment may further comprise the request for the transmission of the second UPS, and the second UPS may then comprise downlink (DL) location measurements, where the DL location measurements are obtained by the UE, and where the location information determined at block 1104 is further based at least in part on the DL location measurements. The UE ID may comprise the frequency shift or the code sequence for the UPS parameters or both the frequency shift and the code sequence. For example, the frequency shift and/or the code sequence for the first UPS may be assigned to the UE by the NE or may be provided by the base station to the UE and may be different to a frequency shift and/or code sequence used by any other UE to transmit a UPS in the same local area (e.g. the same cell) as the UE.

In the third aspect described above, the base station may receive a request from the UE for UPS transmission (e.g. as described above for method M3), where the request is transmitted by the UE on a Random Access Channel (RACH) for the cell. The base station may then determine the first UPO and the UPS parameters and may send a response to the UE, where the response comprises the UPS parameters and an indication of the first UPO. The response may be broadcast in a System Information Block (SIB) in the first cell (e.g. in a PSIB). In this third aspect, the base station may obtain at least one measurement of signal strength, signal power or signal quality for the request received from the UE, and may determine the UPS parameters based at least in part on the at least one measurement. For example, the base station may determine at least one of the transmission power and the encoding type for UPS data for the UPS parameters based at least in part on the at least one measurement.

In the third aspect described above, the base station may decode first UPS data, where the first UPS data comprises at least one of the UE ID, an ID for the NE, an authentication code (AC), an indication of a priority, an indication of a Quality of Service (QoS), a preamble, a cyclic redundancy check (CRC), forward error correction (FEC) bits, or some combination of these. The first UPS may comprise the first UPS data, and the first UPS data may be encoded (e.g. by the UE) in the first UPS based on the encoding type for UPS data. The base station may then include at least one of the UE ID, the AC, the indication of the priority, or the indication of the QoS in the first message sent to the NE at block 1106. The base station may send the first message to the NE with low delay when the indication of the priority indicates high priority or the indication of the QoS indicates low delay. The first UPS data may further comprise first downlink (DL) location measurements (e.g. obtained by the UE). In this case, determining the location information for the UE at block 1104 may be based at least in part on the first DL location measurements. The first DL location measurements may comprise at least one of an ID for the cell, a Reference Signal Time Difference (RSTD), a Receive-Transmit (Rx-Tx) time difference, an Angle of Arrival (AOA), a Round Trip signal propagation Time (RTT), an Angle of Departure (ACM), a Received Signal Strength Indication (RSSI), a Reference Signal Received Power (RSRP), a Reference Signal Received Quality (RSRQ), a pseudorange for a Global Navigation Satellite System (GNSS), a code phase for a GNSS, a carrier phase for a GNSS, or a measurement for a wireless local area network (WLAN) access point, or some combination of these. The base station may further broadcast assistance data in the cell, where the first DL location measurements may be obtained by the UE based at least in part on the assistance data.

In a further extension of the third aspect, the first UPS data may further comprise a more data indication and the base station may then receive a second UPS from the UE in a second UPO for the cell, where the second UPS comprises second UPS data, and where the second UPS data comprises second DL location measurements. In this extension, the base station may decode the second UPS data and may determine the location information for the UE at block 1104 based at least in part on the second DL location measurements.

Figure 12:
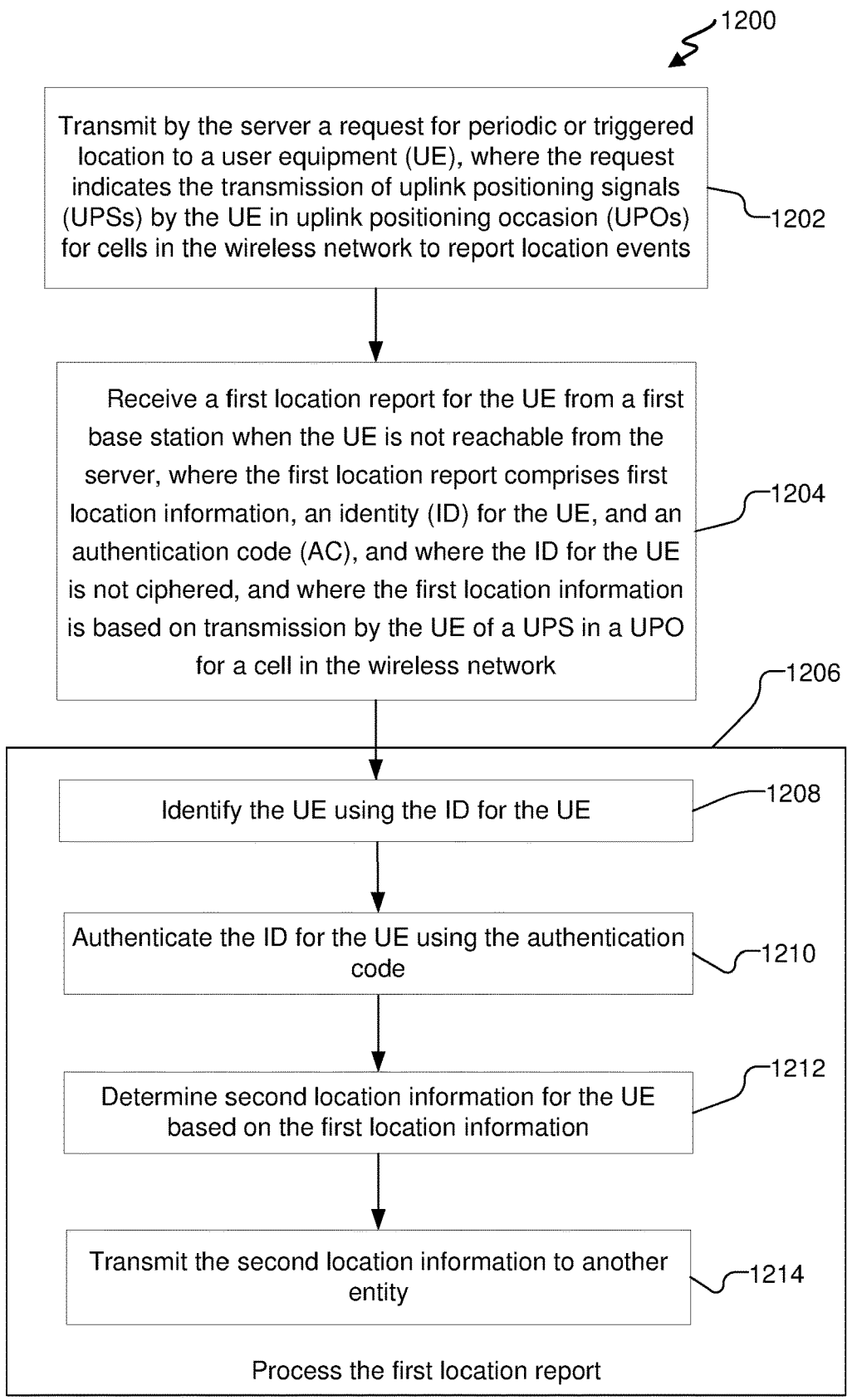
FIG. 12 is a process flow illustrating a method performed by a server for UL high efficiency location for a 5G network.

FIG. 12 is a process flow 1200 illustrating a method performed by a server in a wireless network for support of UL high efficiency location. The wireless network may be a Fifth Generation (5G) or New Radio (NR) wireless network such as NG-RAN 112 and VPLMN 5GC 150 in FIG. 1. The server may be an LMF (e.g. LMF 152), an AMF (e.g. AMF 154), a ULTF (e.g. ULTF 158) or a base station (e.g. a gNB 110 or an ng-eNB in NG-RAN 112).

The server may start process flow 1200 at block 1202 by transmitting a request for periodic or triggered location to a user equipment (UE) (e.g. UE 105), where the request indicates or requests the transmission of uplink positioning signals (UPSs) by the UE in uplink positioning occasion (UPOs) for cells in the wireless network to report location events. In an aspect, the request for the periodic or triggered location is ciphered (e.g. by the server, by a serving AMF for the UE such as AMF 154 or by a serving base station for the UE such as gNB 110-1). For example, block 1202 may correspond to stage 4 in FIG. 5 or stage 8 in FIG. 7.

At block 1204, the server receives a first location report for the UE from a first base station when the UE is not reachable from the server, where the first location report comprises first location information, an identity (ID) for the UE, and an authentication code (AC). The first base station may be a gNB (e.g. a gNB 110) or an ng-eNB (e.g. an ng-eNB in NG-RAN 112). The ID for the UE may not be ciphered and the first location information may be based on transmission by the UE of a UPS in a UPO for a cell in the wireless network. The UPS may comprise UPS data encoded in the UPS by the UE, where the UPS data comprises the UE ID, the AC and an ID for the server. The first location information may comprise at least one of a cell ID (e.g. the ID of the cell), IDs for other cells visible to the UE, downlink location measurements obtained by the UE for cells in the wireless network, downlink location measurements obtained by the UE for wireless local area network (WLAN) access points, downlink location measurements obtained by the UE for a Global Navigation Satellite System (GNSS), a location estimate for the UE (e.g. computed by the first base station), uplink location measurements obtained by the first base station for the UPS, or a combination thereof. For example, block 1204 may correspond to stage 11 in FIG. 5 or stage 7 in FIG. 8.

At block 1206, the server processes the first location report received at block 1204. The processing at block 1206 may comprise the actions shown in FIG. 12 and described below for blocks 1208, 1210, 1212 and 1214.

At block 1208, the server identifies the UE using the ID for the UE received at block 1204.

At block 1210, the server authenticates the ID for the UE using the authentication code. For example, block 1210 may correspond to stage 12 in FIG. 5 or stage 8 in FIG. 8.

At block 1212, the server determines second location information for the UE based on the first location information. For example, block 1212 may correspond to part of stage 12 in FIG. 5 or to stage 10 in FIG. 8.

At block 1214, the server transmits the second location information to another entity. The other entity may comprise an LMF (e.g. LMF 152), a GMLC (e.g. VGMLC 155), an AMF (e.g. AMF 154) or an external client (e.g. External Client 130). The second location information may comprise the first location information (e.g. when the other entity is a location server). For example, block 1214 may correspond to stage 13 in FIG. 5 or stage 9 in FIG. 8.

Process flow 1200 may include additional actions in some further aspects. In one further aspect, the processing at block 1206 further comprises computing or verifying a location of the UE based on the first location information (e.g. as at stage 12 in FIG. 5). Here, the second location information may comprise the location. In this aspect, the other entity may be an external client (e.g. External Client 130) or a GMLC (e.g. VGMLC 155).

In another aspect, the server transmits to the UE at block 1202 along with the request for the periodic or triggered location at least one of an ID for the server, a first plurality of one or more IDs for the UE, an indication of a ciphering key, authentication related information, an indication of a priority, an indication of a Quality of Service (QoS), or a combination thereof. In this aspect, at least part of the first location information may be ciphered (e.g. by the UE) using the ciphering key. For example, the first location information may include DL location measurements obtained by the UE which may be ciphered by the UE using the ciphering key. In this aspect, the ID for the UE may be an ID from the first plurality of one or more IDs for the UE. In this aspect, the server may transmit a second plurality of IDs for the UE to the UE after all IDs in the first plurality of one or more IDs for the UE have been included by the UE in location reports (e.g. as described previously for stage 12 of FIG. 9). In this aspect, the first location report may comprise at least one of the indication of the priority or the indication of the QoS. In this aspect, the server may process the location report at block 1206 with low delay when the indication of the priority indicates high priority or the indication of the QoS indicates low delay.

In another aspect and as exemplified by stage 12 in FIG. 5, the server receives a second location report for the UE from a second base station within a threshold period of time of receiving the first location report for the UE, where the second location report comprises third location information, the ID for the UE, and the AC, and where the ID for the UE is not ciphered. The third location information may be based on transmission by the UE of the UPS in the UPO for the cell in the wireless network. The server may then determine the second location information based at least in part on the third location information. For example, if the first location information comprises DL location measurements obtained by the UE and first UL location measurements obtained by the first base station, and if the third location information comprises the same DL location measurements obtained by the UE and second UL location measurements obtained by the second base station, the server may equate the second location information to the DL location measurements, the first UL location measurements and the second UL location measurements. Alternatively, the server may compute a location for the UE based on the DL location measurements, the first UL location measurements and the second UL location measurements, and may equate the second location information to the computed location estimate.

In another aspect, the first location report for the UE is received at block 1204 from the first base station in a message, where the message may contain a location report for at least one other UE. The message may be a message for a New Radio Positioning Protocol A (NRPPa) in one aspect.

Figure 13:
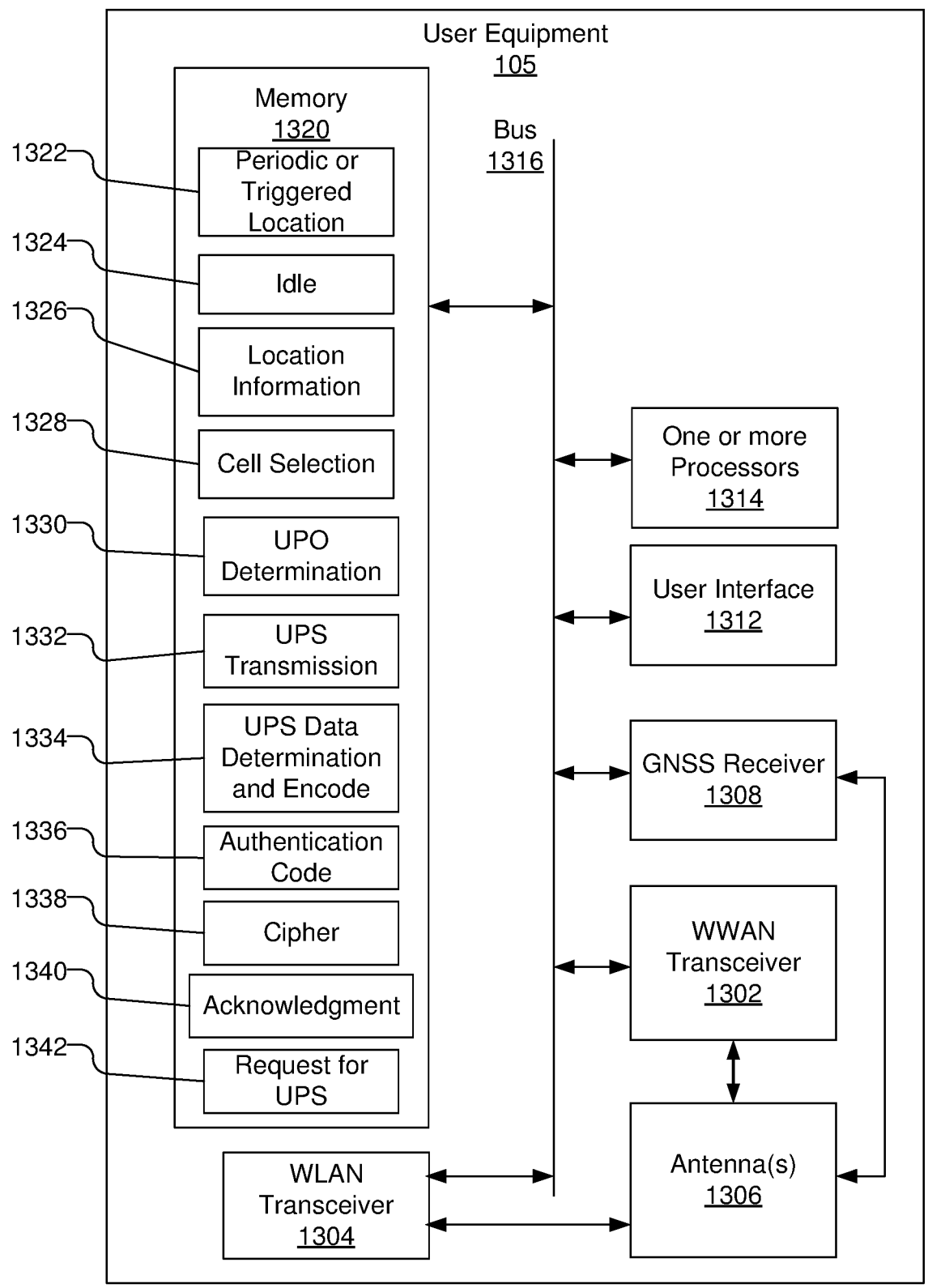
FIG. 13 is a diagram illustrating an example of a hardware implementation of a UE.

FIG. 13 is a diagram illustrating an example of a hardware implementation of the UE 105. The hardware elements shown in FIG. 13 may provide a means for supporting process flow 1000 by UE 105. The UE 105 may include a WWAN transceiver 1302 to wirelessly communicate with, e.g., cellular transceivers such as gNB 110-1. The UE 105 may also include a WLAN transceiver 1304 to wirelessly communicate with local transceivers (e.g. WiFi APs or BT APs). The UE 105 may include one or more antennas 1306 that may be used with the WWAN transceiver 1302 and WLAN transceiver 1304. The UE 105 may further include a GNSS receiver 1308 for receiving and measuring signals from GNSS SVs 190 (e.g. as shown in FIG. 1). The UE 105 may further include a user interface 1312 that may include e.g., a display, a keypad, a microphone, a speaker, or other input or output device, such as a virtual keypad on the display, through which a user may interface with the UE 105.

The UE 105 further includes one or more processors 1314 and memory 1320, which may be coupled together with bus 1316. The one or more processors 1314 and other components of the UE 105 may similarly be coupled together with bus 1316, a separate bus, or may be directly connected together or coupled using a combination of the foregoing. The memory 1320 may contain executable code or software instructions that when executed by the one or more processors 1314 cause the one or more processors 1314 to operate as a special purpose computer programmed to perform the techniques disclosed herein. As illustrated in FIG. 13, the memory 1320 may include one or more components or modules that may be implemented by the one or more processors 1314 to perform the methodologies described herein. While the components or modules are illustrated as software in memory 1320 that is executable by the one or more processors 1314, it should be understood that the components or modules may be dedicated firmware or hardware either in the one or more processors 1314 or off the processors.

The memory 1320 may include a periodic or triggered location unit 1322 that when implemented by the one or more processors 1314 configures the one or more processors 1314 to receive messages with periodic or triggered location requests and monitor for periodic or triggering events. The memory 1320 further includes an idle unit 1324 that when implemented by the one or more processors 1314 configures the one or more processors 1314 to enter an idle state. A location information unit 1326 when implemented by the one or more processors 1314 configures the one or more processors 1314 to obtain location information, such as a serving cell ID, IDs for visible cells, downlink location measurements for cells in a wireless network, downlink location measurements for WLAN APs, downlink location measurements for a GNSS, a location estimate for the UE 105, or a combination thereof, which may be used to detect a location reporting event. A cell selection unit 1328 and a UPO determination unit 1330 when implemented by the one or more processors 1314 configure the one or more processors 1314 to select a nearby first cell and to determine a UPO for the selected first cell in which to transmit a UPS. A UPS transmission unit 1332 when implemented by the one or more processors 1314 configures the one or more processors 1314 to cause the WWAN transceiver 1302 to transmit a UPS in the determined UPO for the first cell, wherein the UPS may comprise an ID for the UE 105. A UPS data determination and encode unit 1334 when implemented by the one or more processors 1314 configures the one or more processors 1314 to determine first UPS data, wherein the first UPS data comprises at least one of a first UE ID, an ID for an NE, an indication of a priority, an indication of a Quality of Service (QoS), a preamble, a cyclic redundancy check (CRC), forward error correction (FEC) bits, or some combination of these, and encode the first UPS data within the UPS transmitted in the determined UPO for the first cell, wherein the encoding is based on an encoding type. The UPS may comprise UPS parameters, wherein the UPS parameters may comprise at least one of a transmission power, bandwidth, carrier frequency, frequency shift, duration, number of consecutive subframes, frequency hopping sequence, code sequence, encoding type for UPS data or some combination of these. The first UE ID, for example, may comprise the frequency shift or the code sequence or both the frequency shift and the code sequence. The location information unit 1326 when implemented by the one or more processors 1314 may configure the one or more processors 1314 to obtain a measurement of a signal strength, signal power or signal quality for the first cell, wherein at least one of the transmission power and the encoding type for the UPS data is based at least in part on the measurement. The UPS Transmission unit 1332 when implemented by the one or more processors 1314 may further configure the one or more processors 1314 to receive information for a plurality of orthogonal UPSs, the information broadcast in a System Information Block (SIB) by a first base station for the first cell, where the UPS parameters are determined based at least in part on the information, wherein the first UPS comprises an orthogonal UPS in the plurality of orthogonal UPSs. An acknowledgement unit 1340 when implemented by the one or more processors 1314 configures the one or more processors 1314 to receive a System Information Block (SIB) broadcast by the first base station in the first cell and determine whether the SIB includes or excludes an acknowledgment for the first UPS, and retransmit the first UPS in a second UPO for the first cell based on the inclusion or exclusion of the acknowledgment. A request for UPS unit 1342 when implemented by the one or more processors 1314 configures the one or more processors 1314 to transmit a request for the first UPS to the first base station on a Random Access Channel (RACH) for the first cell, and receive a response from the first base station, the response comprising the UPS parameters and an indication of the first UPO, wherein the determination of the first UPO is based on the indication. The response, for example, may be received in a System Information Block (SIB) broadcast by the first base station in the first cell.

A received message (e.g. for a periodic or triggered location request) may comprise a first plurality of one or more UE IDs, where the first UE ID is a UE ID from the first plurality of one or more UE IDs. The one or more processors 1314 may be configured, e.g., by location information unit 1326, cell selection unit 1328, UPO determination unit 1330, and/or UPS transmission unit 1332 to detect a second location reporting event, select a second cell associated with a second base station for the wireless network, determine a second UPO for the second cell, and transmit a second UPS in the second UPO for the second cell, where the second UPS comprises a second UE ID for the UE, where the second UE ID is a UE ID from the first plurality of one or more UE IDs, where the second UE ID is different to the first UE ID. The one or more processors 1314 may be further configured to receive a second plurality of UE IDs from the NE after all UE IDs in the first plurality of one or more UE IDs have been included in UPS transmissions.

The location information unit 1326 when implemented by the one or more processors 1314 may configure the one or more processors 1314 to obtain downlink (DL) location measurements, wherein the transmitted UPS data further comprises at least a first portion of the DL location measurements. The DL location measurements may comprise at least one of an ID for the first cell, a Reference Signal Time Difference (RSTD), a Receive-Transmit (Rx-Tx) time difference, an Angle of Arrival (AOA), a Round Trip signal propagation Time (RTT), an Angle of Departure (AOD), a Received Signal Strength Indication (RSSI), a Reference Signal Received Power (RSRP), a Reference Signal Received Quality (RSRQ), a pseudorange for a Global Navigation Satellite System (GNSS), a code phase for a GNSS, a carrier phase for a GNSS, or a measurement for a wireless local area network (WLAN) access point, or some combination of these. The location information unit 1326 when implemented by the one or more processors 1314 may further configure the one or more processors 1314 to receive assistance data for the DL location measurements, wherein the assistance data is broadcast from a base station in the wireless network. An authentication unit 1340 when implemented by the one or more processors 1314 may configure the one or more processors 1314 to determine an authentication code (AC) for the UE ID, wherein the transmitted UPS data further comprises the AC. The received message with a periodic or triggered location request may, for example, include an indication of a ciphering key and the one or more processors 1314 may be configured to determine the AC based at least in part on the first UE ID and the ciphering key. A cipher unit 1338 when implemented by the one or more processors 1314 may configure the one or more processors 1314 to cipher the DL location measurements or the first portion of the DL location measurements based on the ciphering key. The UPS data may further comprise a more data indication, and the one or more processors 1314 may be further configured to determine second UPS data, wherein the second UPS data comprises a second portion of the DL location measurements, wherein the second portion of the DL location measurements is different from the first portion of the DL location measurements, determine a second UPO for the first cell, and transmit a second UPS in the second UPO for the first cell, wherein the second UPS data is encoded within the second UPS.

The methodologies described herein may be implemented by various means depending upon the application. For example, these methodologies may be implemented in hardware, firmware, software, or any combination thereof. For a hardware implementation, the one or more processors 1314 may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For an implementation of UE 105 involving firmware and/or software, the methodologies may be implemented with modules (e.g., procedures, functions, and so on) that perform the separate functions described herein. Any machine-readable medium tangibly embodying instructions may be used in implementing the methodologies described herein. For example, software codes may be stored in a memory (e.g. memory 1320) and executed by one or more processors 1314, causing the one or more processors 1314 to operate as a special purpose computer programmed to perform the techniques disclosed herein. Memory may be implemented within the one or processors 1314 or external to the one or more processors 1314. As used herein the term "memory" refers to any type of long term, short term, volatile, nonvolatile, or other memory and is not to be limited to any particular type of memory or number of memories, or type of media upon which memory is stored.

If implemented in firmware and/or software, the functions performed by UE 105 may be stored as one or more instructions or code on a non-transitory computer-readable storage medium such as memory 1320. Examples of storage media include computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage, semiconductor storage, or other storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

In addition to storage on computer-readable storage medium, instructions and/or data for UE 105 may be provided as signals on transmission media included in a communication apparatus. For example, a communication apparatus comprising part or all of UE 105 may include a transceiver having signals indicative of instructions and data. The instructions and data are stored on non-transitory computer readable media, e.g., memory 1320, and are configured to cause the one or more processors 1314 to operate as a special purpose computer programmed to perform the techniques disclosed herein. That is, the communication apparatus includes transmission media with signals indicative of information to perform disclosed functions. At a first time, the transmission media included in the communication apparatus may include a first portion of the information to perform the disclosed functions, while at a second time the transmission media included in the communication apparatus may include a second portion of the information to perform the disclosed functions.

In certain implementations, a UE 105 for supporting location may include a means for receiving a first message from a network entity (NE) in a wireless network, the first message requesting periodic or triggered location of the UE 105, which may be, e.g., the WWAN transceiver 1302 and one or more processors 1314 with dedicated hardware or implementing executable code or software instructions in memory 1320 such as the periodic or triggered location unit 1322. A means for entering an idle state with respect to the wireless network may be, e.g., one or more processors 1314 with dedicated hardware or implementing executable code or software instructions in memory 1320 such as the idle unit 1324. A means for detecting a first location reporting event may be, e.g., one or more processors 1314 with dedicated hardware or implementing executable code or software instructions in memory 1320 such as the location information unit 1326. A means for selecting a first cell associated with a first base station in the wireless network may be, e.g., one or more processors 1314 with dedicated hardware or implementing executable code or software instructions in memory 1320 such as the cell selection unit 1328. A means for determining a first uplink positioning occasion (UPO) for the first cell may be, e.g., one or more processors 1314 with dedicated hardware or implementing executable code or software instructions in memory 1320 such as the UPO determination unit 1330. A means for transmitting a first uplink positioning signal (UPS) in the first UPO for the first cell, wherein the first UPS comprises a first UE identity (ID) for the UE 105 may be, e.g., the WWAN transceiver 1302 and one or more processors 1314 with dedicated hardware or implementing executable code or software instructions in memory 1320 such as the UPS transmission unit 1332.

The first UPS may comprise UPS parameters, wherein the UPS parameters comprise at least one of a transmission power, bandwidth, carrier frequency, frequency shift, duration, number of consecutive subframes, frequency hopping sequence, code sequence, encoding type for UPS data or some combination of these. The UE 105 may include a means for obtaining a measurement of a signal strength, signal power or signal quality for the first cell, which may be, e.g., the one or more processors 1314 with dedicated hardware or implementing executable code or software instructions in memory 1320 such as the location information unit 1326; and a means for determining at least one of the transmission power and the encoding type for the UPS data based at least in part on the measurement, which may be, e.g., the one or more processors 1314 with dedicated hardware or implementing executable code or software instructions in memory 1320 such as the location information unit 1326. The UE 105 may include means for receiving information for a plurality of orthogonal UPSs, the information broadcast in a System Information Block (SIB) by the first base station in the first cell, and means for determining the UPS parameters based at least in part on the information, wherein the first UPS comprises an orthogonal UPS in the plurality of orthogonal UPSs, which may be, e.g., the WWAN transceiver 1302 and one or more processors 1314 with dedicated hardware or implementing executable code or software instructions in memory 1320 such as the UPS transmission unit 1332. The UE 105 may include means for receiving a System Information Block (SIB) broadcast by the first base station in the first cell, means for determining whether the SIB includes or excludes an acknowledgment for the first UPS, and means for retransmitting the first UPS in a second UPO for the first cell based on the inclusion or exclusion of the acknowledgment, which may be, e.g., the WWAN transceiver 1302 and one or more processors 1314 with dedicated hardware or implementing executable code or software instructions in memory 1320, such as the Acknowledgement unit 1340. The UE 105 may include means for transmitting a request for the first UPS to the first base station on a Random Access Channel (RACH) for the first cell; and means for receiving a response from the first base station, the response comprising the UPS parameters and an indication of the first UPO, wherein the determination of the first UPO is based on the indication, which may be, e.g., the WWAN transceiver 1302 and one or more processors 1314 with dedicated hardware or implementing executable code or software instructions in memory 1320, such as the Request for UPS unit 1342. The UE 105 may include a means for determining first UPS data, wherein the first UPS data comprises at least one of the first UE ID, an ID for the NE, an indication of a priority, an indication of a Quality of Service (QoS), a preamble, a cyclic redundancy check (CRC), forward error correction (FEC) bits, or some combination of these; and a means for encoding the first UPS data within the first UPS transmitted in the first UPO for the first cell, which may be, e.g., the one or more processors 1314 with dedicated hardware or implementing executable code or software instructions in memory 1320, such as the UPS data determination and encode unit 1334. The UE 105 may include a means for obtaining downlink (DL) location measurements, wherein the first UPS data further comprises at least a first portion of the DL location measurements, which may be, e.g., the WWAN transceiver 1302, the WLAN transceiver 1304, the GNSS receiver 1308 and/or the one or more processors 1314 with dedicated hardware or implementing executable code or software instructions in memory 1320, such as the location information unit 1326. The UE 105 may include a means for receiving assistance data for the DL location measurements, wherein the assistance data is broadcast from a base station in the wireless network, which may be the WWAN transceiver 1302 and one or more processors 1314 with dedicated hardware or implementing executable code or software instructions in memory 1320, such as the location information unit 1326. The UE 105 may include a means for determining an authentication code (AC) for the first UE ID, wherein the first UPS data further comprises the AC, which may be, e.g., the one or more processors 1314 with dedicated hardware or implementing executable code or software instructions in memory 1320, such as the authentication code unit 1336. The first message may include an indication of a ciphering key, where the UE 105 further includes a means for determining the AC based at least in part on the first UE ID and the ciphering key, which may be, e.g., the one or more processors 1314 with dedicated hardware or implementing executable code or software instructions in memory 1320, such as the authentication code unit 1336. The UE 105 may further include a means for ciphering the DL location measurements based on the ciphering key, which may be, e.g., the one or more processors 1314 with dedicated hardware or implementing executable code or software instructions in memory 1320, such as the cipher unit 1338. The first UPS data may further comprise a more data indication and the UE 105 may further include a means for determining second UPS data, wherein the second UPS data comprises a second portion of the DL location measurements, a means for determining a second UPO for the first cell; and a means for transmitting a second UPS in the second UPO for the first cell, wherein the second UPS data is encoded within the second UPS, which may be, e.g., the WWAN transceiver 1302 and the one or more processors 1314 with dedicated hardware or implementing executable code or software instructions in memory 1320, such as the location information unit 1326, UPO determination unit 1330, and/or UPS transmission unit 1332.

The first message may comprise a first plurality of one or more UE IDs, wherein the first UE ID is a UE ID from the first plurality of one or more UE IDs. The UE 105 may include a means for detecting a second location reporting event; a means for selecting a second cell associated with a second base station for the wireless network; a means for determining a second UPO for the second cell; and a means for transmitting a second UPS in the second UPO for the second cell, wherein the second UPS comprises a second UE ID for the UE 105, wherein the second UE ID is a UE ID from the first plurality of one or more UE IDs, wherein the second UE ID is different to the first UE ID, which may be, e.g., the WWAN transceiver 1302 and one or more processors 1314 with dedicated hardware or implementing executable code or software instructions in memory 1320, such as the location information unit 1326, UPO determination unit 1330, and/or UPS transmission unit 1332.

Figure 14:
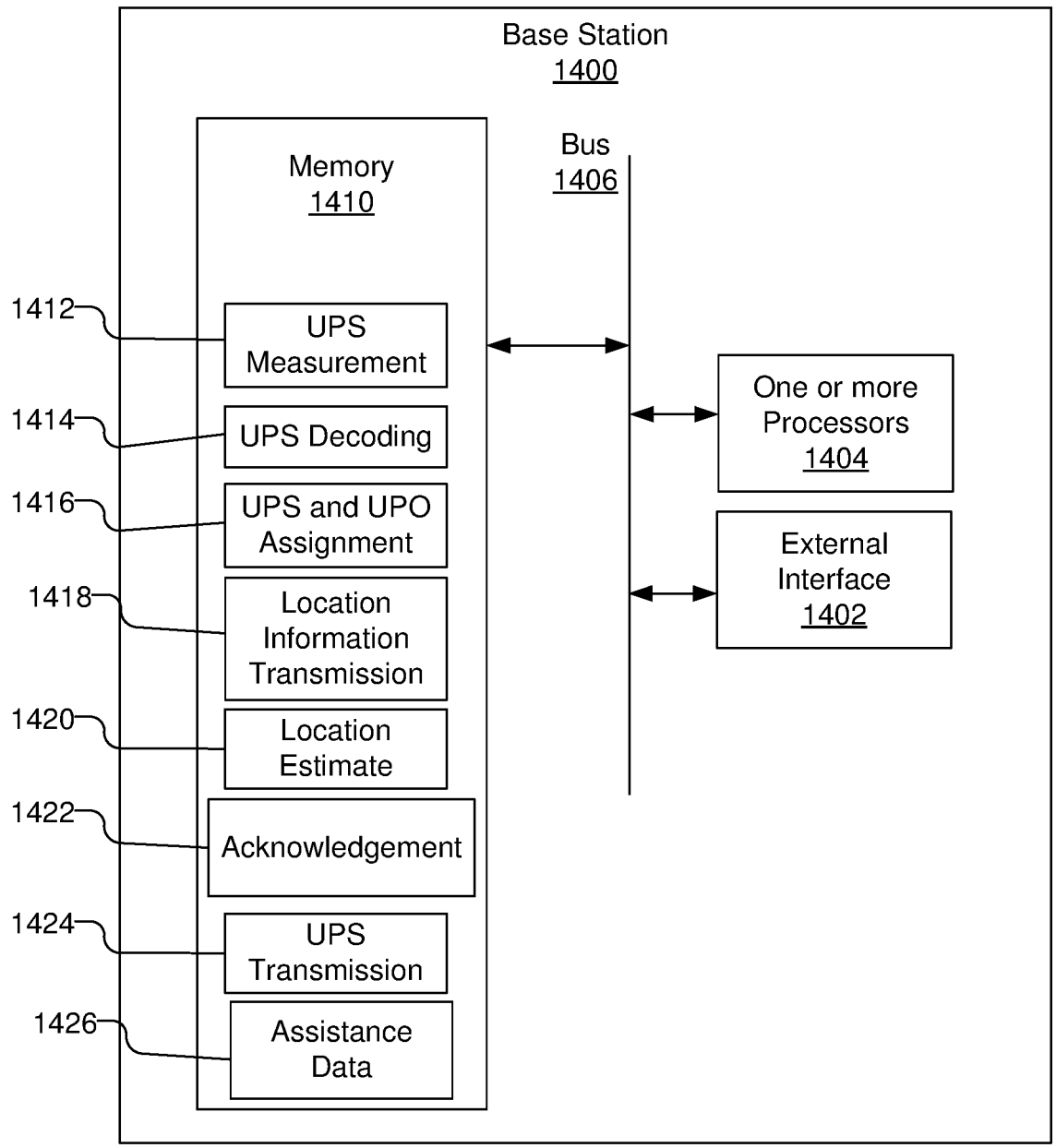
FIG. 14 is a diagram illustrating an example of a hardware implementation of a base station.

FIG. 14 is a diagram illustrating an example of a hardware implementation of the base station 1400. The base station 1400 may be, e.g., a New Radio (NR) NodeB (gNB) such as a gNB 110 or a Next Generation evolved NodeB (ng-eNB). The base station 1400 may perform the process flow 1100 of FIG. 11. The base station 1400 includes, e.g., hardware components such as an external interface 1402, which may include a wireless interface and optionally a wireline interface capable of transmitting wireless signals to and/or receiving wireless signals from UE 105 (e.g. using an antenna not shown in FIG. 14) and communicating with one or more network entities (e.g. AMF 154, LMF 152, ULTF 158) directly or indirectly (e.g. through one or more intermediate networks and/or one or more intermediate network entities). The base station 1400 includes one or more processors 1404 and memory 1410, which may be coupled together with bus 1406. The memory 1410 may contain executable code or software instructions that when executed by the one or more processors 1404 cause the one or more processors to operate as a special purpose computer programmed to perform the techniques disclosed herein. As illustrated in FIG. 14, the memory 1410 may include one or more components or modules that may be implanted by the one or more processors 1404 to perform the methodologies as described herein. While the components or modules are illustrated as software in memory 1410 that is executable by the one or more processors 1404, it should be understood that the components or modules may be dedicated firmware or hardware either in the one or more processors 1404 or off the processors.

For example, the memory 1410 may include a UPS measurement unit 1412 that when implemented by the one or more processors 1404 configures the one or more processors 1404 to receive an uplink positioning signal (UPS) in an uplink positioning occasion (UPO) for a cell for the base station, the UPS transmitted by a user equipment (UE), and to optionally obtain at least one UL location measurement for the UE based on the UPS. The UPS may include, e.g., an identity (ID) for the UE (UE ID) and an ID for a network entity (NE) in the wireless network. A UPS decoding unit 1414 when implemented by the one or more processors 1404 configures the one or more processors 1404 to decode UPS data encoded in the UPS transmitted by the UE and obtain one or more of the UE ID, the ID for the NE (NE ID), an authentication code, an indication of a priority and/or QoS, or DL location measurements from the decoded UPS data. A UPS and UPO assignment unit 1416 when implemented by the one or more processors 1404 configures the one or more processors 1404 to assign UPS parameters and a UPO to enable UPS transmission by the UE. A location information transmission unit 1418 when implemented by the one or more processors 1404 configures the one or more processors 1404 to cause the external interface 1402 to transmit location information to the NE. A location estimate unit 1420 when implemented by the one or more processors 1404 configures the one or more processors 1404 to estimate a location for the UE, e.g., based at least in part on at least one UL location measurement for the UE. An acknowledgment unit 1422 when implemented by the one or more processors 1404 configures the one or more processors 1404 to acknowledge the UPS, which may include the UE ID, and broadcast in a System Information Block (SIB) in the cell. The acknowledgment may also include a request for a retransmission of the UPS or a request for a transmission of a second UPS. An UPS transmission unit 1424 when implemented by the one or more processors 1404 configures the one or more processors 1404 to receive, via the external interface 1402, a request from the UE for UPS transmission, the request transmitted by the UE on a Random Access Channel (RACH) for the cell and to send a response to the UE that may include UPS parameters and an indication of the UPO. The UPS transmission unit 1424 when implemented by the one or more processors 1404 may further configure the one or more processors 1404 to obtain at least one measurement of signal strength, signal power or signal quality for the request for UPS transmission. An assistance data unit 1426 when implemented by the one or more processors 1404 configures the one or more processors 1404 to obtain and broadcast assistance data via the external interface 1402.

The methodologies described herein may be implemented by various means depending upon the application. For example, these methodologies may be implemented in hardware, firmware, software, or any combination thereof. For a hardware implementation, the one or more processors 1404 may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For an implementation of base station 1400 involving firmware and/or software, the methodologies may be implemented with modules (e.g., procedures, functions, and so on) that perform the separate functions described herein. Any machine-readable medium tangibly embodying instructions may be used in implementing the methodologies described herein. For example, software codes may be stored in a memory (e.g. memory 1410) and executed by one or more processors 1404, causing the one or more processors 1404 to operate as a special purpose computer programmed to perform the techniques disclosed herein. Memory may be implemented within the one or processors 1404 or external to the one or more processors 1404. As used herein the term "memory" refers to any type of long term, short term, volatile, nonvolatile, or other memory and is not to be limited to any particular type of memory or number of memories, or type of media upon which memory is stored.

If implemented in firmware and/or software, the functions performed by base station 1400 may be stored as one or more instructions or code on a non-transitory computer-readable storage medium such as memory 1410. Examples of storage media include computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage, semiconductor storage, or other storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

In addition to storage on computer-readable storage medium, instructions and/or data for base station 1400 may be provided as signals on transmission media included in a communication apparatus. For example, a communication apparatus comprising part or all of base station 1400 may include a transceiver having signals indicative of instructions and data. The instructions and data are stored on non-transitory computer readable media, e.g., memory 1410, and are configured to cause the one or more processors 1404 to operate as a special purpose computer programmed to perform the techniques disclosed herein. That is, the communication apparatus includes transmission media with signals indicative of information to perform disclosed functions. At a first time, the transmission media included in the communication apparatus may include a first portion of the information to perform the disclosed functions, while at a second time the transmission media included in the communication apparatus may include a second portion of the information to perform the disclosed functions.

In one implementation, a base station 1400 in a wireless network supports location and includes a means for receiving a first uplink positioning signal (UPS) in a first uplink positioning occasion (UPO) for a cell for the base station 1400, the first UPS transmitted by a user equipment (UE) (e.g. the UE 105), the first UPS comprising an identity (ID) for the UE and an ID for a network entity (NE) in the wireless network which may be, e.g., the external interface 1402 and one or more processors 1404 with dedicated hardware or implementing executable code or software instructions in memory 1410 such as the UPS measurement unit 1412. A means for determining location information for the UE based on the first UPS may be, e.g., the external interface 1402 and one or more processors 1404 with dedicated hardware or implementing executable code or software instructions in memory 1410 such as the UPS measurement unit 1412. A means for sending a first message to the NE comprising the location information for the UE may be, e.g., the external interface 1402 and one or more processors 1404 with dedicated hardware or implementing executable code or software instructions in memory 1410 such as the location information transmission unit 1418.

A means for obtaining at least one uplink (UL) location measurement for the UE based on the first UPS, wherein the location information is based at least in part on the at least one UL location measurement may be, e.g., the external interface 1402 and one or more processors 1404 with dedicated hardware or implementing executable code or software instructions in memory 1410 such as the UPS measurement unit 1412. A means for determining a location estimate for the UE, the location estimate based at least in part on the at least one UL location measurement, the location information for the UE comprising the location estimate may be, e.g., the one or more processors 1404 with dedicated hardware or implementing executable code or software instructions in memory 1410 such as the location estimate unit 1420.

A means for broadcasting information for a plurality of UPOs in the cell, the first UPO being a UPO from the plurality of UPOs may be, e.g., the external interface 1402 and one or more processors 1404 with dedicated hardware or implementing executable code or software instructions in memory 1410 such as the location information transmission unit 1418. The information for the plurality of UPOs may be broadcast in a System Information Block (SIB) in the cell.

The first UPS may comprise UPS parameters, wherein the UPS parameters comprise at least one of a transmission power, bandwidth, carrier frequency, frequency shift, duration, number of consecutive subframes, frequency hopping sequence, code sequence, or encoding type for UPS data, or some combination of these. A means for broadcasting information in a System Information Block (SIB) for a plurality of orthogonal UPSs, the first UPS being an orthogonal UPS in the plurality of orthogonal UPSs may be, e.g., the external interface 1402 and one or more processors 1404 with dedicated hardware or implementing executable code or software instructions in memory 1410 such as the location information transmission unit 1418. A means for broadcasting a System Information Block (SIB) in the first cell, the SIB comprising an acknowledgment for the first UPS, the acknowledgment comprising the UE ID may be, e.g., the external interface 1402 and one or more processors 1404 with dedicated hardware or implementing executable code or software instructions in memory 1410 such as the location information transmission unit 1418 and acknowledgment unit 1422. The acknowledgment may further comprises a request for a retransmission of the first UPS or a request for a transmission of a second UPS, and the base station 1400 may further include a means for receiving the retransmission of the first UPS or the transmission of the second UPS, wherein the location information is further based at least in part on the retransmission of the first UPS or the transmission of the second UPS, which may be, e.g., the external interface 1402 and one or more processors 1404 with dedicated hardware or implementing executable code or software instructions in memory 1410 such as the UPS measurement unit 1412. A means for receiving a request from the UE for UPS transmission, the request transmitted by the UE on a Random Access Channel (RACH) for the cell, a means for determining the first UPO and the UPS parameters, and a means for sending a response to the UE, the response comprising the UPS parameters and an indication of the first UPO may be, e.g., the external interface 1402 and one or more processors 1404 with dedicated hardware or implementing executable code or software instructions in memory 1410 such as the UPS transmission unit 1424 and the UPS and UPO assignment unit 1416. A means for obtaining at least one measurement of signal strength, signal power or signal quality for the request, wherein the determining the UPS parameters is based at least in part on the at least one measurement, may be, e.g., the external interface 1402 and one or more processors 1404 with dedicated hardware or implementing executable code or software instructions in memory 1410 such as the UPS transmission unit 1424 and the UPS and UPO assignment unit 1416. The means for determining the UPS parameters, wherein the determination may include determining at least one of the transmission power and the encoding type for UPS data based at least in part on the at least one measurement, may be the one or more processors 1404 with dedicated hardware or implementing executable code or software instructions in memory 1410 such as the UPS transmission unit 1424 and the UPS and UPO assignment unit 1416. A means for decoding first UPS data, the first UPS data comprising at least one of the UE ID, an ID for the NE, an authentication code (AC), an indication of a priority, an indication of a Quality of Service (QoS), a preamble, a cyclic redundancy check (CRC), forward error correction (FEC) bits, or some combination of these, wherein the first UPS comprises the first UPS data, wherein the first UPS data is encoded in the first UPS based on the encoding type for UPS data may be, e.g., the one or more processors 1404 with dedicated hardware or implementing executable code or software instructions in memory 1410 such as the UPS decoding unit 1414. A means for broadcasting assistance data in the cell, wherein first DL location measurements are obtained by the UE based at least in part on the assistance data may be, e.g., the external interface 1402 and one or more processors 1404 with dedicated hardware or implementing executable code or software instructions in memory 1410 such as the assistance data unit 1426. The first UPS data may further comprise a more data indication and the base station 1400 may further include a means for receiving a second UPS in a second UPO for the cell, wherein the second UPS comprises second UPS data, wherein the second UPS data comprises second DL location measurements; and decoding the second UPS data, wherein determining the location information for the UE is based at least in part on the second DL location measurements, which may be, e.g., the external interface 1402 and one or more processors 1404 with dedicated hardware or implementing executable code or software instructions in memory 1410 such as the UPS measurement unit 1412 and UPS decoding unit 1414.

Figure 15:
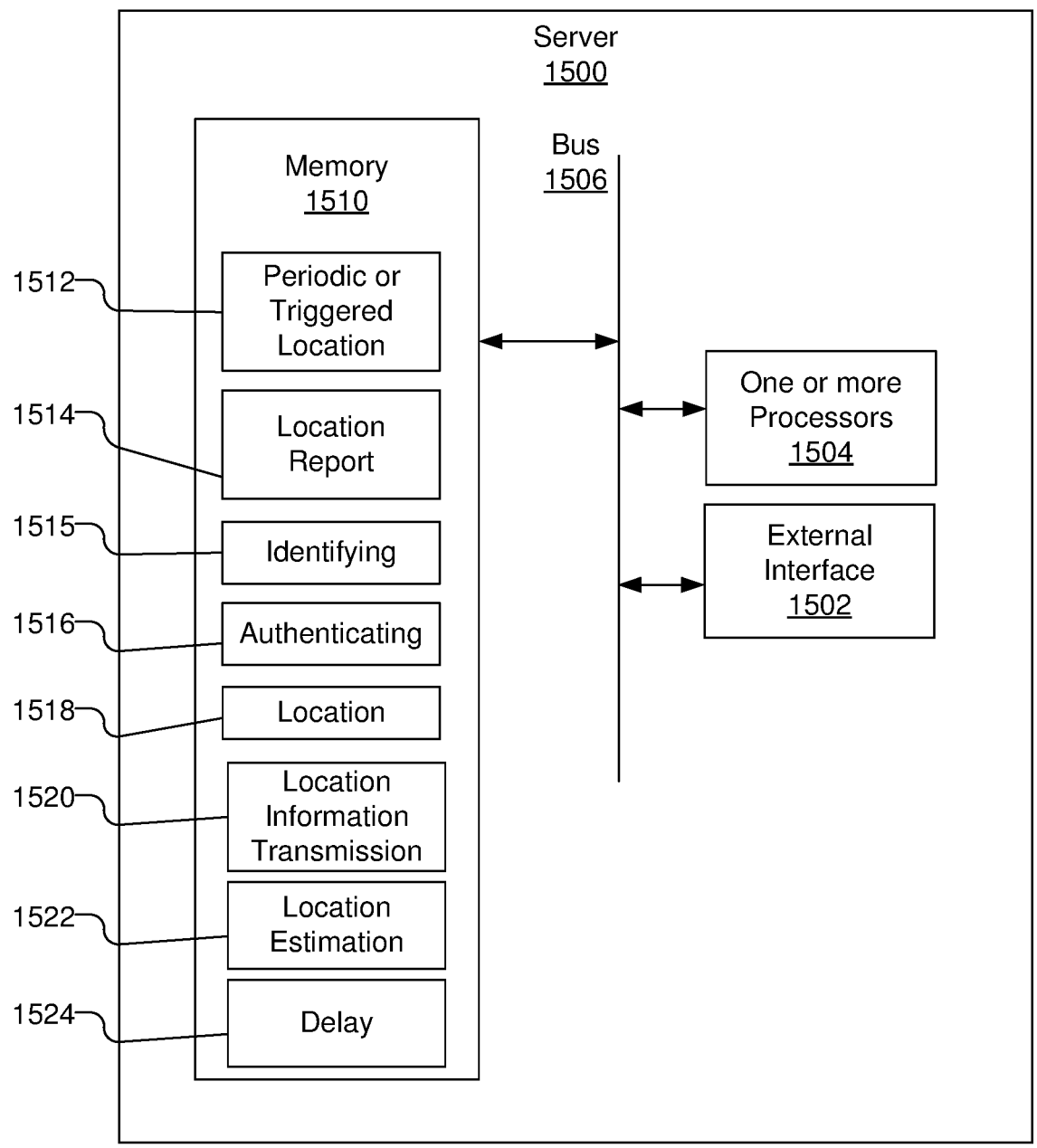
FIG. 15 is a diagram illustrating an example of a hardware implementation of a server.

FIG. 15 is a diagram illustrating an example of a hardware implementation of a server 1500. The server 1500 may be, e.g., a Location Management Function (LMF) such as LMF 152, an Access and Mobility Management Function (AMF), such as AMF 154 illustration in FIG. 1, or an Uplink Transport Function (ULTF) such as ULTF 158 in FIG. 1. The server 1500 includes, e.g., hardware components such as an external interface 1502, which may be a wired or wireless interface capable of connecting to and communicating with a UE (e.g. UE 105) and one or more other entities such as an ULTF 158, AMF 154, gNBs 110, VGMLC 155 and/or an external client 130 directly or through one or more intermediary networks and/or one or more network entities. The server 1500 includes one or more processors 1504 and memory 1510, which may be coupled together with bus 1506. The memory 1510 may contain executable code or software instructions that when executed by the one or more processors 1504 cause the one or more processors to operate as a special purpose computer programmed to perform the techniques disclosed herein. As illustrated in FIG. 15, the memory 1510 may include one or more components or modules that may be implanted by the one or more processors 1504 to perform the methodologies as described herein. While the components or modules are illustrated as software in memory 1510 that is executable by the one or more processors 1504, it should be understood that the components or modules may be dedicated firmware or hardware either in the one or more processors 1504 or off the processors.

For example, the memory 1510 may include a periodic or triggered location unit 1512 that when implemented by the one or more processors 1504 configures the one or more processors 1504 to cause the external interface 1502 to transmit a request for a periodic or triggered location to a user equipment (UE) (e.g. the UE 105), where the request indicates the transmission of uplink positioning signals (UPSs) by the UE in uplink positioning occasion (UPOs) for cells in the wireless network to report location events. A location report unit 1514 when implemented by the one or more processors 1504 configures the one or more processors 1504 to receive a first location report from a base station (e.g. a gNB 110) when the UE is not reachable from the server, where the location report comprises first location information, an identity (ID) for the UE and an authentication code (AC), where the ID for the UE is not ciphered, and where the first location information is based on transmission by the UE of a UPS in a UPO for a cell in the wireless network. An identifying unit 1515 when implemented by the one or more processors 1504 configures the one or more processors 1504 to identify the UE using the ID for the UE received in the first location report. An authenticating unit 1516 when implemented by the one or more processors 1504 configures the one or more processors 1504 to authenticate the ID for the UE using the AC. A location unit 1518 when implemented by the one or more processors 1504 configures the one or more processors 1504 to determine second location information for the UE based on the first location information. A location information transmission unit 1520 when implemented by the one or more processors 1504 configures the one or more processors 1504 to cause the external interface 1502 to transmit the second location information to another entity (e.g. an LMF 152, a VGMLC 155 or an external client 130). A location estimation unit 1522 when implemented by the one or more processors 1504 configures the one or more processors 1504 to compute or verify a location of the UE based on the first location information. A delay unit 1524 when implemented by the one or more processors 1504 configures the one or more processors 1504 to process the first location report with low delay when an indication of priority indicates high priority or an indication of QoS indicates low delay, e.g., where the first location report may include at least one of the indication of the priority or the indication of the QoS.

The methodologies described herein may be implemented by various means depending upon the application. For example, these methodologies may be implemented in hardware, firmware, software, or any combination thereof. For a hardware implementation, the one or more processors 1504 may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For an implementation of server 1500 involving firmware and/or software, the methodologies may be implemented with modules (e.g., procedures, functions, and so on) that perform the separate functions described herein. Any machine-readable medium tangibly embodying instructions may be used in implementing the methodologies described herein. For example, software codes may be stored in a memory (e.g. memory 1510) and executed by one or more processors 1504, causing the one or more processors 1504 to operate as a special purpose computer programmed to perform the techniques disclosed herein. Memory may be implemented within the one or processors 1504 or external to the one or more processors 1504. As used herein the term "memory" refers to any type of long term, short term, volatile, nonvolatile, or other memory and is not to be limited to any particular type of memory or number of memories, or type of media upon which memory is stored.

If implemented in firmware and/or software, the functions performed by server 1500 may be stored as one or more instructions or code on a non-transitory computer-readable storage medium such as memory 1510. Examples of storage media include computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage, semiconductor storage, or other storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

In addition to storage on computer-readable storage medium, instructions and/or data for server 1500 may be provided as signals on transmission media included in a communication apparatus. For example, a communication apparatus comprising part or all of server 1500 may include a transceiver having signals indicative of instructions and data. The instructions and data are stored on non-transitory computer readable media, e.g., memory 1510, and are configured to cause the one or more processors 1504 to operate as a special purpose computer programmed to perform the techniques disclosed herein. That is, the communication apparatus includes transmission media with signals indicative of information to perform disclosed functions. At a first time, the transmission media included in the communication apparatus may include a first portion of the information to perform the disclosed functions, while at a second time the transmission media included in the communication apparatus may include a second portion of the information to perform the disclosed functions.

In one implementation, a server 1500 in a wireless network may include means for transmitting by the server 1500 a request for periodic or triggered location to a user equipment (UE) (e.g. the UE 105), the request indicating the transmission of uplink positioning signals (UPSs) by the UE in uplink positioning occasion (UPOs) for cells in the wireless network to report location events, which may be, e.g., the external interface 1502 and one or more processors 1504 with dedicated hardware or implementing executable code or software instructions in memory 1510 such as the periodic or triggered location unit 1512. A means for receiving a first location report for the UE from a first base station (e.g. a gNB 110) when the UE is not reachable from the server 1500, wherein the first location report comprises first location information, an identity (ID) for the UE, and an authentication code (AC), wherein the ID for the UE is not ciphered, wherein the first location information is based on transmission by the UE of a UPS in a UPO for a cell in the wireless network may be, e.g., the external interface 1502 and one or more processors 1504 with dedicated hardware or implementing executable code or software instructions in memory 1510 such as the location report unit 1514. The server 1500 may process the first location report with, e.g., a means for identifying the UE using the ID for the UE, a means for authenticating the ID for the UE using the AC, a means for determining second location information for the UE based on the first location information, and means for transmitting the second location information to another entity. The means for identifying the UE using the ID for the UE may be, e.g., one or more processors 1504 with dedicated hardware or implementing executable code or software instructions in memory 1510 such as the identifying unit 1515. The means for authenticating the ID for the UE using the AC may be, e.g., one or more processors 1504 with dedicated hardware or implementing executable code or software instructions in memory 1510 such as the authenticating unit 1516. The means for determining second location information for the UE based on the first location information may be, e.g., one or more processors 1504 with dedicated hardware or implementing executable code or software instructions in memory 1510 such as the location unit 1518. The means for transmitting the second location information to another entity may be, e.g., the external interface 1502 and one or more processors 1504 with dedicated hardware or implementing executable code or software instructions in memory 1510 such as the location information transmission unit 1520.

The server 1500 may include a means for receiving a second location report for the UE from a second base station within a threshold period of time of receiving the first location report for the UE, wherein the second location report comprises third location information, the ID for the UE, and the AC, wherein the ID for the UE is not ciphered, wherein the third location information is based on transmission by the UE of the UPS in the UPO for the cell in the wireless network, which may be, e.g., the external interface 1502 and one or more processors 1504 with dedicated hardware or implementing executable code or software instructions in memory 1510 such as the location report unit 1514. A means for determining the second location information based at least in part on the third location information may be, e.g., the one or more processors 1504 with dedicated hardware or implementing executable code or software instructions in memory 1510 such as the location unit 1518.

The server 1500 may further process the first location report with a means for computing or verifying a location of the UE based on the first location information, wherein the second location information comprises the location, wherein the other entity is an external client or a gateway mobile location center (GMLC), which may be, e.g., a location estimation unit 1522.

A means for transmitting to the UE along with the request for the periodic or triggered location at least one of an ID for the server, a first plurality of one or more IDs for the UE, an indication of a ciphering key, authentication related information, an indication of a priority, an indication of a Quality of Service (QoS), or a combination thereof may be, e.g., the external interface 1502 and one or more processors 1504 with dedicated hardware or implementing executable code or software instructions in memory 1510 such as the periodic or triggered location unit 1512. A means for transmitting a second plurality of IDs for the UE to the UE after all IDs in the first plurality of one or more IDs for the UE have been included by the UE in location reports may be, e.g., the external interface 1502 and one or more processors 1504 with dedicated hardware or implementing executable code or software instructions in memory 1510 such as the identifying unit 1515.

The first location report may include at least one of the indication of the priority or the indication of the QoS, and the server 1500 may further include means for processing the first location report with low delay when the indication of the priority indicates high priority or the indication of the QoS indicates low delay, which may be the one or more processors 1504 with dedicated hardware or implementing executable code or software instructions in memory 1510 such as the delay unit 1524.

Reference throughout this specification to "one example", "an example", "certain examples", or "exemplary implementation" means that a particular feature, structure, or characteristic described in connection with the feature and/or example may be included in at least one feature and/or example of claimed subject matter. Thus, the appearances of the phrase "in one example", "an example", "in certain examples" or "in certain implementations" or other like phrases in various places throughout this specification are not necessarily all referring to the same feature, example, and/or limitation. Furthermore, the particular features, structures, or characteristics may be combined in one or more examples and/or features.

Some portions of the detailed description included herein are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular operations pursuant to instructions from program software. Algorithmic descriptions or symbolic representations are examples of techniques used by those of ordinary skill in the signal processing or related arts to convey the substance of their work to others skilled in the art. An algorithm is here, and generally, is considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals, or the like. It should be understood, however, that all of these or similar terms are to be associated with appropriate physical quantities and are merely convenient labels. Unless specifically stated otherwise, as apparent from the discussion herein, it is appreciated that throughout this specification discussions utilizing terms such as "processing," "computing," "calculating," "determining" or the like refer to actions or processes of a specific apparatus, such as a special purpose computer, special purpose computing apparatus or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

In the preceding detailed description, numerous specific details have been set forth to provide a thorough understanding of claimed subject matter. However, it will be understood by those skilled in the art that claimed subject matter may be practiced without these specific details. In other instances, methods and apparatuses that would be known by one of ordinary skill have not been described in detail so as not to obscure claimed subject matter.

The terms, "and", "or", and "and/or" as used herein may include a variety of meanings that also are expected to depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein may be used to describe any feature, structure, or characteristic in the singular or may be used to describe a plurality or some other combination of features, structures or characteristics. Though, it should be noted that this is merely an illustrative example and claimed subject matter is not limited to this example.

While there has been illustrated and described what are presently considered to be example features, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein.

In one implementation, a method of supporting location, performed by a base station in a wireless network, comprises: receiving a first uplink positioning signal (UPS) in a first uplink positioning occasion (UPO) for a cell for the base station, the first UPS transmitted by a user equipment (UE), the first UPS comprising an identity (ID) for the UE and an ID for a network entity (NE) in the wireless network; determining location information for the UE based on the first UPS; and sending a first message to the NE comprising the location information for the UE.

In some implementations of the above method, the method further comprises obtaining at least one uplink (UL) location measurement for the UE based on the first UPS, wherein the location information is based at least in part on the at least one UL location measurement.

In some implementations of the above method, the at least one UL location measurement comprises an UL Time of Arrival (TOA), an UL Receive-Transmit (Rx-Tx) time difference, a Received Signal Strength Indication (RSSI), a Reference Signal Received Power (RSRP), a Reference Signal Received Quality (RSRQ), or an angle of arrival (AOA).

In some implementations of the above method, the method further comprises determining a location estimate for the UE, the location estimate based at least in part on the at least one UL location measurement, the location information for the UE comprising the location estimate.

In some implementations of the above method, the location information is based on an identity for the cell or an identity for the base station.

In some implementations of the above method, the base station is a New Radio (NR) NodeB (gNB) or a next generation evolved NodeB (ng-eNB).

In some implementations of the above method, the method further comprises broadcasting information for a plurality of UPOs in the cell, the first UPO being a UPO from the plurality of UPOs.

In some implementations of the above method, the information for the plurality of UPOs is broadcast in a System Information Block (SIB) in the cell.

In some implementations of the above method, the first UPS comprises UPS parameters, wherein the UPS parameters comprise at least one of a transmission power, bandwidth, carrier frequency, frequency shift, duration, number of consecutive subframes, frequency hopping sequence, code sequence, or encoding type for UPS data, or some combination of these.

In some implementations of the above method, at least one of the transmission power or the encoding type is based at least in part on a measurement by the UE of a signal strength, signal power or signal quality for the cell.

In some implementations of the above method, the method further comprises broadcasting information in a System Information Block (SIB) for a plurality of orthogonal UPSs, the first UPS being an orthogonal UPS in the plurality of orthogonal UPSs.

In some implementations of the above method, the method further comprises broadcasting a System Information Block (SIB) in the first cell, the SIB comprising an acknowledgment for the first UPS, the acknowledgment comprising the UE ID.

In some implementations of the above method, the acknowledgment further comprises a request for a retransmission of the first UPS or a request for a transmission of a second UPS, and further comprising receiving the retransmission of the first UPS or the transmission of the second UPS, wherein the location information is further based at least in part on the retransmission of the first UPS or the transmission of the second UPS.

In some implementations of the above method, the acknowledgment comprises the request for the transmission of the second UPS, wherein the second UPS comprises downlink (DL) location measurements, the DL location measurements obtained by the UE, wherein the location information is further based at least in part on the DL location measurements.

In some implementations of the above method, the method further comprises receiving a request from the UE for UPS transmission, the request transmitted by the UE on a Random Access Channel (RACH) for the cell; determining the first UPO and the UPS parameters; sending a response to the UE, the response comprising the UPS parameters and an indication of the first UPO.

In some implementations of the above method, the response is broadcast in a System Information Block (SIB) in the first cell.

In some implementations of the above method, the method further comprises obtaining at least one measurement of signal strength, signal power or signal quality for the request, wherein the determining the UPS parameters is based at least in part on the at least one measurement.

In some implementations of the above method, the determining the UPS parameters comprises determining at least one of the transmission power and the encoding type for UPS data based at least in part on the at least one measurement.

In some implementations of the above method, the UE ID comprises the frequency shift or the code sequence or both the frequency shift and the code sequence.

In some implementations of the above method, the method further comprises decoding first UPS data, the first UPS data comprising at least one of the UE ID, an ID for the NE, an authentication code (AC), an indication of a priority, an indication of a Quality of Service (QoS), a preamble, a cyclic redundancy check (CRC), forward error correction (FEC) bits, or some combination of these, wherein the first UPS comprises the first UPS data, wherein the first UPS data is encoded in the first UPS based on the encoding type for UPS data.

In some implementations of the above method, the method further comprises including at least one of the UE ID, the AC, the indication of the priority, or the indication of the QoS in the first message sent to the NE.

In some implementations of the above method, the method further comprises sending the first message to the NE with low delay when the indication of the priority indicates high priority or the indication of the QoS indicates low delay.

In some implementations of the above method, the first UPS data further comprises first downlink (DL) location measurements, wherein the determining the location information for the UE is based at least in part on the first DL location measurements.

In some implementations of the above method, the first DL location measurements comprise at least one of an ID for the cell, a Reference Signal Time Difference (RSTD), a Receive-Transmit (Rx-Tx) time difference, an Angle of Arrival (AOA), a Round Trip signal propagation Time (RTT), an Angle of Departure (AOD), a Received Signal Strength Indication (RSSI), a Reference Signal Received Power (RSRP), a Reference Signal Received Quality (RSRQ), a pseudorange for a Global Navigation Satellite System (GNSS), a code phase for a GNSS, a carrier phase for a GNSS, or a measurement for a wireless local area network (WLAN) access point, or some combination of these.

In some implementations of the above method, the method further comprises broadcasting assistance data in the cell, wherein the first DL location measurements are obtained by the UE based at least in part on the assistance data.

In some implementations of the above method, the first UPS data further comprises a more data indication and the method further comprises: receiving a second UPS in a second UPO for the cell, wherein the second UPS comprises second UPS data, wherein the second UPS data comprises second DL location measurements; and decoding the second UPS data, wherein determining the location information for the UE is based at least in part on the second DL location measurements.

In some implementations of the above method, the NE comprises a base station or an Uplink Transport Function (ULTF).

In some implementations of the above method, the NE comprises an Access and Mobility Management Function (AMF), wherein the first message is a message for a Next Generation Access Protocol (NG-AP).

In some implementations of the above method, the NE comprises a location server.

In some implementations of the above method, the location server comprises a Location Management Function (LMF) and the first message is a message for a New Radio Positioning Protocol A (NRPPa).

In one implementation, a base station in a wireless network that supports location, comprises: an external interface capable of connecting to a user equipment (UE) and one or more network entities; at least one processor coupled to the external interface and configured to receive a first uplink positioning signal (UPS) in a first uplink positioning occasion (UPO) for a cell for the base station, the first UPS transmitted by a user equipment (UE), the first UPS comprising an identity (ID) for the UE and an ID for a network entity (NE) in the wireless network, determine location information for the UE based on the first UPS, and send a first message to the NE comprising the location information for the UE.

In some implementations of the above base station, the at least one processor is further configured to obtain at least one uplink (UL) location measurement for the UE based on the first UPS, wherein the location information is based at least in part on the at least one UL location measurement.

In some implementations of the above base station, the at least one UL location measurement comprises an UL Time of Arrival (TOA), an UL Receive-Transmit (Rx-Tx) time difference, a Received Signal Strength Indication (RSSI), a Reference Signal Received Power (RSRP), a Reference Signal Received Quality (RSRQ), or an angle of arrival (AOA).

In some implementations of the above base station, the at least one processor is further configured to determine a location estimate for the UE, the location estimate based at least in part on the at least one UL location measurement, the location information for the UE comprising the location estimate.

In some implementations of the above base station, the location information is based on an identity for the cell or an identity for the base station.

In some implementations of the above base station, the base station is a New Radio (NR) NodeB (gNB) or a next generation evolved NodeB (ng-eNB).

In some implementations of the above base station, the at least one processor is further configured to cause the external interface to broadcast information for a plurality of UPOs in the cell, the first UPO being a UPO from the plurality of UPOs.

In some implementations of the above base station, the information for the plurality of UPOs is broadcast in a System Information Block (SIB) in the cell.

In some implementations of the above base station, the first UPS comprises UPS parameters, wherein the UPS parameters comprise at least one of a transmission power, bandwidth, carrier frequency, frequency shift, duration, number of consecutive subframes, frequency hopping sequence, code sequence, or encoding type for UPS data, or some combination of these.

In some implementations of the above base station, at least one of the transmission power or the encoding type is based at least in part on a measurement by the UE of a signal strength, signal power or signal quality for the cell.

In some implementations of the above base station, the at least one processor is further configured to cause the external interface to broadcast information in a System Information Block (SIB) for a plurality of orthogonal UPSs, the first UPS being an orthogonal UPS in the plurality of orthogonal UPSs.

In some implementations of the above base station, the at least one processor is further configured to broadcast a System Information Block (SIB) in the first cell, the SIB comprising an acknowledgment for the first UPS, the acknowledgment comprising the UE ID.

In some implementations of the above base station, the acknowledgment further comprises a request for a retransmission of the first UPS or a request for a transmission of a second UPS, and further comprising receiving the retransmission of the first UPS or the transmission of a second UPS, wherein the location information is further based at least in part on the retransmission of the first UPS or the transmission of the second UPS.

In some implementations of the above base station, the acknowledgment comprises the request for the transmission of the second UPS, wherein the second UPS comprises downlink (DL) location measurements, the DL location measurements obtained by the UE, wherein the location information is further based at least in part on the DL location measurements.

In some implementations of the above base station, the at least one processor is further configured to receive a request from the UE for UPS transmission, the request transmitted by the UE on a Random Access Channel (RACH) for the cell, determine the first UPO and the UPS parameters, and send a response to the UE, the response comprising the UPS parameters and an indication of the first UPO.

In some implementations of the above base station, the response is broadcast in a System Information Block (SIB) in the first cell.

In some implementations of the above base station, the at least one processor is further configured to obtain at least one measurement of signal strength, signal power or signal quality for the request, wherein the at least one processor determines the UPS parameters based at least in part on the at least one measurement.

In some implementations of the above base station, the at least one processor is configured to determine the UPS parameters by being configured to determine at least one of the transmission power and the encoding type for UPS data based at least in part on the at least one measurement.

In some implementations of the above base station, the UE ID comprises the frequency shift or the code sequence or both the frequency shift and the code sequence.

In some implementations of the above base station, the at least one processor is further configured to decode first UPS data, the first UPS data comprising at least one of the UE ID, an ID for the NE, an authentication code (AC), an indication of a priority, an indication of a Quality of Service (QoS), a preamble, a cyclic redundancy check (CRC), forward error correction (FEC) bits, or some combination of these, wherein the first UPS comprises the first UPS data, wherein the first UPS data is encoded in the first UPS based on the encoding type for UPS data.

In some implementations of the above base station, the at least one processor is further configured to include at least one of the UE ID, the AC, the indication of priority, or the indication of the QoS in the first message sent to the NE.

In some implementations of the above base station, the at least one processor is further configured to send the first message to the NE with low delay when the indication of the priority indicates high priority or the indication of the QoS indicates low delay.

In some implementations of the above base station, the first UPS data further comprises first downlink (DL) location measurements, wherein the at least one processor is further configured to determine the location information for the UE based at least in part on the first DL location measurements.

In some implementations of the above base station, the first DL location measurements comprise at least one of an ID for the cell, a Reference Signal Time Difference (RSTD), a Receive-Transmit (Rx-Tx) time difference, an Angle of Arrival (AOA), a Round Trip signal propagation Time (RTT), an Angle of Departure (AOD), a Received Signal Strength Indication (RSSI), a Reference Signal Received Power (RSRP), a Reference Signal Received Quality (RSRQ), a pseudorange for a Global Navigation Satellite System (GNSS), a code phase for a GNSS, a carrier phase for a GNSS, or a measurement for a wireless local area network (WLAN) access point, or some combination of these.

In some implementations of the above base station, the at least one processor is further configured to cause the external interface to broadcast assistance data in the cell, wherein the first DL location measurements are obtained by the UE based at least in part on the assistance data.

In some implementations of the above base station, the first UPS data further comprises a more data indication and wherein the at least one processor is further configured to receive a second UPS in a second UPO for the cell, wherein the second UPS comprises second UPS data, wherein the second UPS data comprises second DL location measurements, and decode the second UPS data, wherein determining the location information for the UE is based at least in part on the second DL location measurements.

In some implementations of the above base station, the NE comprises a base station or an Uplink Transport Function (ULTF).

In some implementations of the above base station, the NE comprises an Access and Mobility Management Function (AMF), wherein the first message is a message for a Next Generation Access Protocol (NG-AP).

In some implementations of the above base station, the NE comprises a location server.

In some implementations of the above base station, the location server comprises a Location Management Function (LMF) and the first message is a message for a New Radio Positioning Protocol A (NRPPa).

In one implementation, a method performed by a server in a wireless network comprises: transmitting by the server a request for periodic or triggered location to a user equipment (UE), the request indicating the transmission of uplink positioning signals (UPSs) by the UE in uplink positioning occasions (UPOs) for cells in the wireless network to report location events; receiving a first location report for the UE from a first base station when the UE is not reachable from the server, wherein the first location report comprises first location information, an identity (ID) for the UE, and an authentication code (AC), wherein the ID for the UE is not ciphered, wherein the first location information is based on transmission by the UE of a UPS in a UPO for a cell in the wireless network; and processing the first location report, wherein the processing comprises: identifying the UE using the ID for the UE; authenticating the ID for the UE using the authentication code; determining second location information for the UE based on the first location information; and transmitting the second location information to another entity.

In one implementation of the above method, the UPS comprises UPS data encoded in the UPS, the UPS data comprising the UE ID, the AC and an ID for the server.

In one implementation of the above method, the method further comprises receiving a second location report for the UE from a second base station within a threshold period of time of receiving the first location report for the UE, wherein the second location report comprises third location information, the ID for the UE, and the AC, wherein the ID for the UE is not ciphered, wherein the third location information is based on transmission by the UE of the UPS in the UPO for the cell in the wireless network; and determining the second location information based at least in part on the third location information.

In one implementation of the above method, the method further comprises computing or verifying a location of the UE based on the first location information, wherein the second location information comprises the location, wherein the other entity is an external client or a gateway mobile location center (GMLC).

In one implementation of the above method, the server is a Location Management Function (LMF).

In one implementation of the above method, the second location information comprises the first location information, wherein the other entity is a location server.

In one implementation of the above method, the server is an Access and Mobility Management Function (AMF) or an Uplink Transport Function.

In one implementation of the above method, the method further comprises transmitting to the UE along with the request for the periodic or triggered location at least one of an ID for the server, a first plurality of one or more IDs for the UE, an indication of a ciphering key, authentication related information, an indication of a priority, an indication of a Quality of Service (QoS), or a combination thereof.

In one implementation of the above method, at least part of the first location information is ciphered using the ciphering key.

In one implementation of the above method, the ID for the UE is an ID from the first plurality of one or more IDs for the UE.

In one implementation of the above method, the method further comprises transmitting a second plurality of IDs for the UE to the UE after all IDs in the first plurality of one or more IDs for the UE have been included by the UE in location reports.

In one implementation of the above method, the first location report comprises at least one of the indication of the priority or the indication of the QoS, and the method further comprises processing the first location report with low delay when the indication of the priority indicates high priority or the indication of the QoS indicates low delay.

In one implementation of the above method, the request for the periodic or triggered location is ciphered.

In one implementation of the above method, the first location information comprises at least one of a cell ID, IDs for visible cells, downlink location measurements obtained by the UE for cells in the wireless network, downlink location measurements obtained by the UE for wireless local area network (WLAN) access points, downlink location measurements obtained by the UE for a Global Navigation Satellite System (GNSS), a location estimate for the UE, uplink location measurements obtained by the first base station for the UPS, or a combination thereof.

In one implementation of the above method, the wireless network is a Fifth Generation (5G) wireless network.

In one implementation of the above method, the first base station is a New Radio (NR) NodeB (gNB) or a Next Generation evolved NodeB (ng-eNB).

In one implementation of the above method, the first location report for the UE is received from the first base station in a message, wherein the message contains a location report for at least one other UE.

In one implementation of the above method, the message is a message for a New Radio Positioning Protocol A (NRPPa).

In one implementation, a server in a wireless network supporting location comprises: an external interface capable of connecting to a user equipment (UE) and an external client directly or through at least one of one or more intermediary networks and one or more network entities; at least one processor coupled to the external interface and configured to cause the external interface to transmit a request for periodic or triggered location to the UE, the request indicating the transmission of uplink positioning signals (UPSs) by the UE in uplink positioning occasions (UPOs) for cells in the wireless network to report location events, receive a first location report for the UE from a first base station when the UE is not reachable from the server, wherein the first location report comprises first location information, an identity (ID) for the UE, and an authentication code (AC), wherein the ID for the UE is not ciphered, wherein the first location information is based on transmission by the UE of a UPS in a UPO for a cell in the wireless network, and process the first location report, wherein the at least one processor is configured to process the first location report by being configured to identify the UE using the ID for the UE, authenticate the ID for the UE using the authentication code, determine second location information for the UE based on the first location information, and cause the external interface to transmit the second location information to another entity.

In some implementations of the above server, the UPS comprises UPS data encoded in the UPS, the UPS data comprising the UE ID, the AC and an ID for the server.

In some implementations of the above server, the at least one processor is further configured to receive a second location report for the UE from a second base station within a threshold period of time of receiving the first location report for the UE, wherein the second location report comprises third location information, the ID for the UE, and the AC, wherein the ID for the UE is not ciphered, wherein the third location information is based on transmission by the UE of the UPS in the UPO for the cell in the wireless network; and determine the second location information based at least in part on the third location information.

In some implementations of the above server, the at least one processor is configured to process the first location report by being further configured to compute or verify a location of the UE based on the first location information, wherein the second location information comprises the location, wherein the other entity is an external client or a gateway mobile location center (GMLC).

In some implementations of the above server, the server is a Location Management Function (LMF).

In some implementations of the above server, the second location information comprises the first location information, wherein the other entity is a location server.

In some implementations of the above server, the server is an Access and Mobility Management Function (AMF) or an Uplink Transport Function.

In some implementations of the above server, the at least one processor is further configured to cause the external interface to transmit to the UE along with the request for the periodic or triggered location at least one of an ID for the server, a first plurality of one or more IDs for the UE, an indication of a ciphering key, authentication related information, an indication of a priority, an indication of a Quality of Service (QoS), or a combination thereof.

In some implementations of the above server, at least part of the first location information is ciphered using the ciphering key.

In some implementations of the above server, the ID for the UE is an ID from the first plurality of one or more IDs for the UE.

In some implementations of the above server, the at least one processor is further configured to cause the external interface to transmit a second plurality of IDs for the UE to the UE after all IDs in the first plurality of one or more IDs for the UE have been included by the UE in location reports.

In some implementations of the above server, the first location report comprises at least one of the indication of the priority or the indication of the QoS, and wherein the at least one processor is configured to process the first location report with low delay when the indication of the priority indicates high priority or the indication of the QoS indicates low delay.

In some implementations of the above server, the request for the periodic or triggered location is ciphered.

In some implementations of the above server, the first location information comprises at least one of a cell ID, IDs for visible cells, downlink location measurements obtained by the UE for cells in the wireless network, downlink location measurements obtained by the UE for wireless local area network (WLAN) access points, downlink location measurements obtained by the UE for a Global Navigation Satellite System (GNSS), a location estimate for the UE, uplink location measurements obtained by the first base station for the UPS, or a combination thereof.

In some implementations of the above server, the wireless network is a Fifth Generation (5G) wireless network.

In some implementations of the above server, the first base station is a New Radio (NR) NodeB (gNB) or a Next Generation evolved NodeB (ng-eNB).

In some implementations of the above server, the first location report for the UE is received from the first base station in a message, wherein the message contains a location report for at least one other UE.

In some implementations of the above server, the message is a message for a New Radio Positioning Protocol A (NRPPa).

Therefore, it is intended that claimed subject matter not be limited to the particular examples disclosed, but that such claimed subject matter may also include all aspects falling within the scope of appended claims, and equivalents thereof.

What is claimed is:

1. A method of supporting location, performed by a base station in a wireless network, comprising:
   receiving a first uplink positioning signal (UPS) in a first uplink positioning occasion (UPO) for a cell for the base station, the first UPS transmitted by a user equipment (UE), the first UPS comprising an identity (ID) for the UE and an ID for a network entity (NE) in the wireless network;
   determining location information for the UE based on the first UPS; and
   sending a first message to the NE comprising the location information for the UE.

2. The method of claim 1, further comprising obtaining at least one uplink (UL) location measurement for the UE based on the first UPS, wherein the location information is based at least in part on the at least one UL location measurement.

3. The method of claim 2, wherein the at least one UL location measurement comprises an UL Time of Arrival (TOA), an UL Receive-Transmit (Rx-Tx) time difference, a Received Signal Strength Indication (RSSI), a Reference Signal Received Power (RSRP), a Reference Signal Received Quality (RSRQ), or an angle of arrival (AOA).

4. The method of claim 2, further comprising determining a location estimate for the UE, the location estimate based at least in part on the at least one UL location measurement, the location information for the UE comprising the location estimate.

5. The method of claim 1, wherein the location information is based on an identity for the cell or an identity for the base station.

6. The method of claim 1, wherein the base station is a New Radio (NR) NodeB (gNB) or a next generation evolved NodeB (ng-eNB).

7. The method of claim 1, further comprising broadcasting information for a plurality of UPOs in the cell, the first UPO being a UPO from the plurality of UPOs.

8. The method of claim 7, wherein the information for the plurality of UPOs is broadcast in a System Information Block (SIB) in the cell.

9. The method of claim 1, wherein the first UPS comprises UPS parameters, wherein the UPS parameters comprise at least one of a transmission power, bandwidth, carrier frequency, frequency shift, duration, number of consecutive subframes, frequency hopping sequence, code sequence, or encoding type for UPS data, or some combination of these.

10. The method of claim 9, wherein at least one of the transmission power or the encoding type is based at least in part on a measurement by the UE of a signal strength, signal power or signal quality for the cell.

11. The method of claim 9, further comprising broadcasting information in a System Information Block (SIB) for a plurality of orthogonal UPSs, the first UPS being an orthogonal UPS in the plurality of orthogonal UPSs.

12. The method of claim 9, further comprising:
broadcasting a System Information Block (SIB) in the first cell, the SIB comprising an acknowledgment for the first UPS, the acknowledgment comprising the UE ID.

13. The method of claim 12, wherein the acknowledgment further comprises a request for a retransmission of the first UPS or a request for a transmission of a second UPS, and further comprising receiving the retransmission of the first UPS or the transmission of the second UPS, wherein the location information is further based at least in part on the retransmission of the first UPS or the transmission of the second UPS.

14. The method of claim 13, wherein the acknowledgment comprises the request for the transmission of the second UPS, wherein the second UPS comprises downlink (DL) location measurements, the DL location measurements obtained by the UE, wherein the location information is further based at least in part on the DL location measurements.

15. The method of claim 9, further comprising:
receiving a request from the UE for UPS transmission, the request transmitted by the UE on a Random Access Channel (RACH) for the cell;
determining the first UPO and the UPS parameters;
sending a response to the UE, the response comprising the UPS parameters and an indication of the first UPO.

16. The method of claim 15, wherein the response is broadcast in a System Information Block (SIB) in the first cell.

17. The method of claim 15, further comprising:
obtaining at least one measurement of signal strength, signal power or signal quality for the request, wherein the determining the UPS parameters is based at least in part on the at least one measurement.

18. The method of claim 17, wherein the determining the UPS parameters comprises determining at least one of the transmission power and the encoding type for UPS data based at least in part on the at least one measurement.

19. The method of claim 9, wherein the UE ID comprises the frequency shift or the code sequence or both the frequency shift and the code sequence.

20. The method of claim 9, further comprising decoding first UPS data, the first UPS data comprising at least one of the UE ID, an ID for the NE, an authentication code (AC), an indication of a priority, an indication of a Quality of Service (QoS), a preamble, a cyclic redundancy check (CRC), forward error correction (FEC) bits, or some combination of these, wherein the first UPS comprises the first UPS data, wherein the first UPS data is encoded in the first UPS based on the encoding type for UPS data.

21. The method of claim 20, further comprising including at least one of the UE ID, the AC, the indication of the priority, or the indication of the QoS in the first message sent to the NE.

22. The method of claim 20, further comprising sending the first message to the NE with low delay when the indication of the priority indicates high priority or the indication of the QoS indicates low delay.

23. The method of claim 20, wherein the first UPS data further comprises first downlink (DL) location measurements, wherein the determining the location information for the UE is based at least in part on the first DL location measurements.

24. The method of claim 23, wherein the first DL location measurements comprise at least one of an ID for the cell, a Reference Signal Time Difference (RSTD), a Receive-Transmit (Rx-Tx) time difference, an Angle of Arrival (AOA), a Round Trip signal propagation Time (RTT), an Angle of Departure (AOD), a Received Signal Strength Indication (RSSI), a Reference Signal Received Power (RSRP), a Reference Signal Received Quality (RSRQ), a pseudorange for a Global Navigation Satellite System (GNSS), a code phase for a GNSS, a carrier phase for a GNSS, or a measurement for a wireless local area network (WLAN) access point, or some combination of these.

25. The method of claim 23, further comprising broadcasting assistance data in the cell, wherein the first DL location measurements are obtained by the UE based at least in part on the assistance data.

26. The method of claim 20, wherein the first UPS data further comprises a more data indication and further comprising:
receiving a second UPS in a second UPO for the cell, wherein the second UPS comprises second UPS data, wherein the second UPS data comprises second DL location measurements; and
decoding the second UPS data, wherein determining the location information for the UE is based at least in part on the second DL location measurements.

27. The method of claim 1, wherein the NE comprises a base station or an Uplink Transport Function (ULTF).

28. The method of claim 1, wherein the NE comprises an Access and Mobility Management Function (AMF), wherein the first message is a message for a Next Generation Access Protocol (NG-AP).

29. The method of claim 1, wherein the NE comprises a location server.

30. The method of claim 29, wherein the location server comprises a Location Management Function (LMF) and the first message is a message for a New Radio Positioning Protocol A (NRPPa).

31. A base station in a wireless network that supports location, comprising:
an external interface capable of connecting to a user equipment (UE) and one or more network entities;
at least one memory; and
at least one processor coupled to the external interface and the at least one memory, wherein the at least one processor is configured to:
receive, via the external interface, a first uplink positioning signal (UPS) in a first uplink positioning occasion (UPO) for a cell for the base station, the first UPS transmitted by a user equipment (UE), the first UPS comprising an identity (ID) for the UE and an ID for a network entity (NE) in the wireless network;
determine location information for the UE based on the first UPS; and
send, via the external interface, a first message to the NE comprising the location information for the UE.

32. The base station of claim 31, wherein the at least one processor is further configured to obtain at least one uplink (UL) location measurement for the UE based on the first UPS, wherein the location information is based at least in part on the at least one UL location measurement.

33. The base station of claim 32, wherein the at least one UL location measurement comprises an UL Time of Arrival (TOA), an UL Receive-Transmit (Rx-Tx) time difference, a Received Signal Strength Indication (RSSI), a Reference Signal Received Power (RSRP), a Reference Signal Received Quality (RSRQ), or an angle of arrival (AOA).

34. The base station of claim 32, wherein the at least one processor is further configured to determine a location estimate for the UE, the location estimate based at least in part on the at least one UL location measurement, the location information for the UE comprising the location estimate.

35. The base station of claim 31, wherein the location information is based on an identity for the cell or an identity for the base station.

36. The base station of claim 31, wherein the base station is a New Radio (NR) NodeB (gNB) or a next generation evolved NodeB (ng-eNB).

37. The base station of claim 31, wherein the at least one processor is further configured to cause the external interface to broadcast information for a plurality of UPOs in the cell, the first UPO being a UPO from the plurality of UPOs.

38. The base station of claim 37, wherein the information for the plurality of UPOs is broadcast in a System Information Block (SIB) in the cell.

39. The base station of claim 31, wherein the first UPS comprises UPS parameters, wherein the UPS parameters comprise at least one of a transmission power, bandwidth, carrier frequency, frequency shift, duration, number of consecutive subframes, frequency hopping sequence, code sequence, or encoding type for UPS data, or some combination of these.

40. The base station of claim 39, wherein at least one of the transmission power or the encoding type is based at least in part on a measurement by the UE of a signal strength, signal power or signal quality for the cell.

41. The base station of claim 39, wherein the at least one processor is further configured to cause the external interface to broadcast information in a System Information Block (SIB) for a plurality of orthogonal UPSs, the first UPS being an orthogonal UPS in the plurality of orthogonal UPSs.

42. The base station of claim 39, wherein the at least one processor is further configured to broadcast a System Information Block (SIB) in the first cell, the SIB comprising an acknowledgment for the first UPS, the acknowledgment comprising the UE ID.

43. The base station of claim 42, wherein the acknowledgment further comprises a request for a retransmission of the first UPS or a request for a transmission of a second UPS, and further comprising receiving the retransmission of the first UPS or the transmission of a second UPS, wherein the location information is further based at least in part on the retransmission of the first UPS or the transmission of the second UPS.

44. The base station of claim 43, wherein the acknowledgment comprises the request for the transmission of the second UPS, wherein the second UPS comprises downlink (DL) location measurements, the DL location measurements obtained by the UE, wherein the location information is further based at least in part on the DL location measurements.

45. The base station of claim 39, wherein the at least one processor is further configured to receive a request from the UE for UPS transmission, the request transmitted by the UE on a Random Access Channel (RACH) for the cell, determine the first UPO and the UPS parameters, and send a response to the UE, the response comprising the UPS parameters and an indication of the first UPO.

46. The base station of claim 45, wherein the response is broadcast in a System Information Block (SIB) in the first cell.

47. The base station of claim 45, wherein the at least one processor is further configured to obtain at least one measurement of signal strength, signal power or signal quality for the request, wherein the at least one processor determines the UPS parameters based at least in part on the at least one measurement.

48. The base station of claim 47, wherein the at least one processor is configured to determine the UPS parameters by being configured to determine at least one of the transmission power and the encoding type for UPS data based at least in part on the at least one measurement.

49. The base station of claim 39, wherein the UE ID comprises the frequency shift or the code sequence or both the frequency shift and the code sequence.

50. The base station of claim 39, wherein the at least one processor is further configured to decode first UPS data, the first UPS data comprising at least one of the UE ID, an ID for the NE, an authentication code (AC), an indication of a priority, an indication of a Quality of Service (QoS), a preamble, a cyclic redundancy check (CRC), forward error correction (FEC) bits, or some combination of these, wherein the first UPS comprises the first UPS data, wherein the first UPS data is encoded in the first UPS based on the encoding type for UPS data.

51. The base station of claim 50, wherein the at least one processor is further configured to include at least one of the UE ID, the AC, the indication of priority, or the indication of the QoS in the first message sent to the NE.

52. The base station of claim 50, wherein the at least one processor is further configured to send the first message to the NE with low delay when the indication of the priority indicates high priority or the indication of the QoS indicates low delay.

53. The base station of claim 50, wherein the first UPS data further comprises first downlink (DL) location measurements, wherein the at least one processor is further configured to determine the location information for the UE based at least in part on the first DL location measurements.

54. The base station of claim 53, wherein the first DL location measurements comprise at least one of an ID for the cell, a Reference Signal Time Difference (RSTD), a Receive-Transmit (Rx-Tx) time difference, an Angle of Arrival (AOA), a Round Trip signal propagation Time (RTT), an Angle of Departure (AOD), a Received Signal Strength Indication (RSSI), a Reference Signal Received Power (RSRP), a Reference Signal Received Quality (RSRQ), a pseudorange for a Global Navigation Satellite System (GNSS), a code phase for a GNSS, a carrier phase for a GNSS, or a measurement for a wireless local area network (WLAN) access point, or some combination of these.

55. The base station of claim 53, wherein the at least one processor is further configured to cause the external interface to broadcast assistance data in the cell, wherein the first DL location measurements are obtained by the UE based at least in part on the assistance data.

56. The base station of claim 50, wherein the first UPS data further comprises a more data indication and wherein the at least one processor is further configured to receive a second UPS in a second UPO for the cell, wherein the second UPS comprises second UPS data, wherein the second UPS data comprises second DL location measurements, and decode the second UPS data, wherein determining the location information for the UE is based at least in part on the second DL location measurements.

57. The base station of claim 31, wherein the NE comprises a base station or an Uplink Transport Function (ULTF).

58. The base station of claim 31, wherein the NE comprises an Access and Mobility Management Function (AMF), wherein the first message is a message for a Next Generation Access Protocol (NG-AP).

59. The base station of claim 31, wherein the NE comprises a location server.

60. The base station of claim 59, wherein the location server comprises a Location Management Function (LMF) and the first message is a message for a New Radio Positioning Protocol A (NRPPa).

61. A base station in a wireless network that supports location, comprising:
 means for receiving a first uplink positioning signal (UPS) in a first uplink positioning occasion (UPO) for a cell for the base station, the first UPS transmitted by a user equipment (UE), the first UPS comprising an identity (ID) for the UE and an ID for a network entity (NE) in the wireless network;
 means for determining location information for the UE based on the first UPS; and
 means for sending a first message to the NE comprising the location information for the UE.

62. A non-transitory computer readable storage medium including program code stored thereon, the program code is operable to configure at least one processor in a base station in a wireless network to support location, the program code comprising instructions to:
 receive a first uplink positioning signal (UPS) in a first uplink positioning occasion (UPO) for a cell for the base station, the first UPS transmitted by a user equipment (UE), the first UPS comprising an identity (ID) for the UE and an ID for a network entity (NE) in the wireless network;
 determine location information for the UE based on the first UPS; and
 send a first message to the NE comprising the location information for the UE.

\* \* \* \* \*